US012679484B2

(12) United States Patent (10) Patent No.: US 12,679,484 B2

Desmarais et al. (45) Date of Patent: Jul. 14, 2026

(54) TRACK SYSTEM FOR TRACTION OF A VEHICLE

(71) Applicant: CAMSO INC., Magog (CA)

(72) Inventors: Gerard Desmarais, Ghent (BE);
Franck Dervault, Sherbrooke (CA);
Kris De Boe, Ghent (BE)

(73) Assignee: Camso Inc., Magog (CA)

( * ) Notice: Subject to any disclaimer, the term of this patent is extended or adjusted under 35 U.S.C. 154(b) by 563 days.

(21) Appl. No.: 18/021,938

(22) PCT Filed: Aug. 18, 2021

(86) PCT No.: PCT/CA2021/051143

§ 371 (c)(1),
(2) Date: Feb. 17, 2023

(87) PCT Pub. No.: WO2022/036449

PCT Pub. Date: Feb. 24, 2022

(65) Prior Publication Data

US 2023/0347999 A1 Nov. 2, 2023

Related U.S. Application Data

(60) Provisional application No. 63/067,103, filed on Aug. 18, 2020.

(51) Int. Cl.
B62D 55/10 (2006.01)
B62D 55/15 (2006.01)
B62D 55/24 (2006.01)

(52) U.S. Cl.
CPC ............. B62D 55/10 (2013.01); B62D 55/15 (2013.01); B62D 55/244 (2013.01)

(58) Field of Classification Search
CPC ................................. B62D 55/10; B62D 55/15
See application file for complete search history.

(56) References Cited

U.S. PATENT DOCUMENTS 4,953,919 A 9/1990 Langford
5,343,741 A † 9/1994 Nishihara
(Continued)

FOREIGN PATENT DOCUMENTS

CA 3110606 A1 3/2020
CN 103754281 A † 4/2014
CN 110588813 A 12/2019

OTHER PUBLICATIONS

International Search Report and Written Opinion dated Oct. 21, 2021.

*Primary Examiner* — Long T Tran

(74) *Attorney, Agent, or Firm* — Hahn Loeser & Parks LLP

(57) ABSTRACT

A track system for a vehicle on a ground, wherein the track system is reconfigurable, such as by rearranging or otherwise altering one or more components of the track system (e.g., wheels, pivots or other joints, frame members, etc., by changing their position, movability, etc.) and/or by repositioning the track system relative to a frame of the vehicle, which may be useful, for instance, to enhance performance of the vehicle (e.g., maximize or otherwise increase traction and/or pulling force (e.g., drawbar pull); improve steerability; etc.), ride quality (e.g., comfort), effects on the ground (e.g., minimize or otherwise reduce soil compaction and/or soil shear stress; provide headland protection; etc.), and/or other aspects of the track system and/or the vehicle, and/or for various other purposes.

20 Claims, 46 Drawing Sheets

(56)          References Cited

U.S. PATENT DOCUMENTS

| | | | | |
|---|---|---|---|---|
| 9,440,692 B2 † | 9/2016 | Vik | | |
| 10,289,920 B2 † | 5/2019 | Hartmann | | |
| 10,933,929 B1 * | 3/2021 | Sauvageau | ........... | B62D 55/084 |
| 11,052,959 B1 * | 7/2021 | Parker | .................... | B62K 11/02 |
| 11,148,745 B1 * | 10/2021 | Parker | .................... | B62K 11/02 |
| 2001/0030068 A1 * | 10/2001 | Nagorkca | ........... | B62D 55/305 |
| | | | | 305/165 |
| 2003/0161687 A1 | 8/2003 | Kirihata | | |
| 2006/0213700 A1 † | 9/2006 | Hildebrand | | |
| 2014/0035355 A1 † | 2/2014 | He | | |
| 2015/0129329 A1 | 5/2015 | Cox | | |
| 2016/0236733 A1 | 8/2016 | Tiede et al. | | |
| 2017/0036714 A1 | 2/2017 | Lunkenbein | | |
| 2018/0009490 A1 * | 1/2018 | Sauvageau | ........... | B62D 55/104 |
| 2018/0022408 A1 * | 1/2018 | Sauvageau | ........... | B62D 55/112 |
| | | | | 305/142 |
| 2020/0166102 A1 * | 5/2020 | Cisek | ........................ | F16H 1/48 |
| 2021/0253185 A1 * | 8/2021 | Sauvageau | ........... | B62D 55/065 |
| 2021/0309308 A1 * | 10/2021 | Sauvageau | ........... | B62D 55/065 |
| 2023/0038710 A1 * | 2/2023 | Sauvageau | ............. | B60B 19/12 |

\* cited by examiner

† cited by third party

Providing a reconfiguration command to the reconfiguration mechanism 30

Moving a given portion 62 of the track-engaging assembly 21 relative to an adjacent portion 64 of the track-engaging assembly 21

Maintaining the relative position of the portions 62, 64

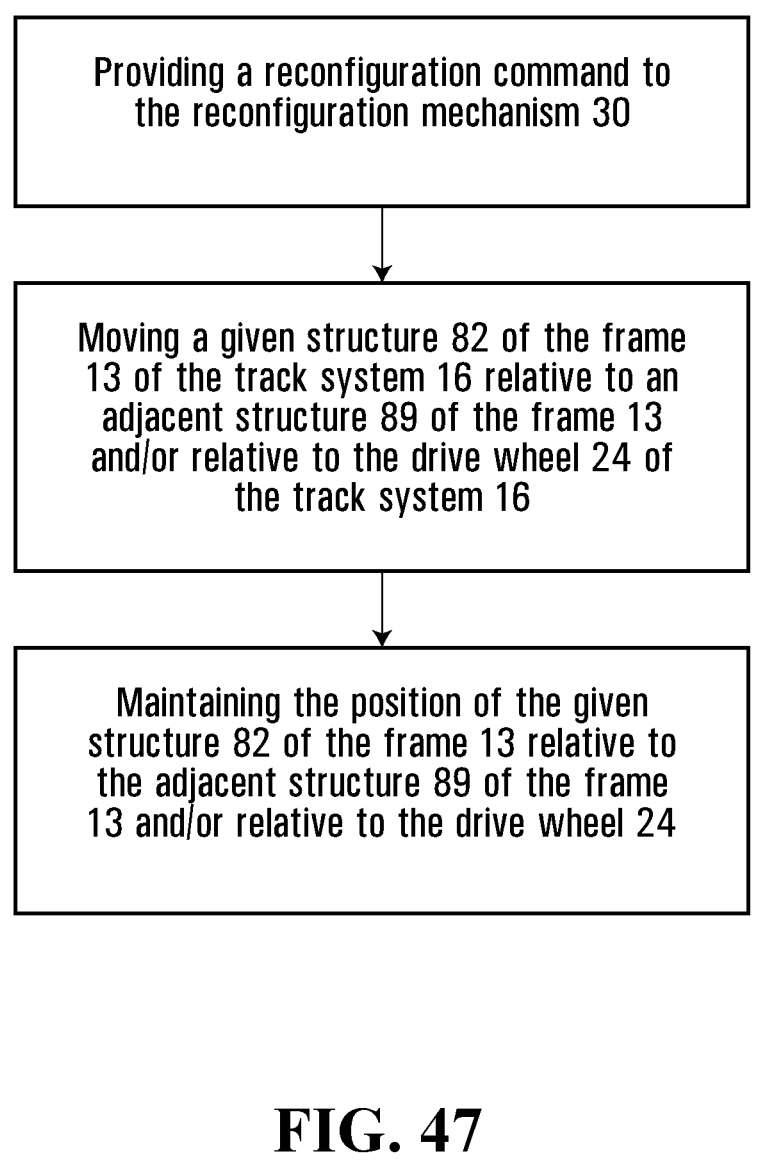

Providing a reconfiguration command to
the reconfiguration mechanism 30

Moving a given structure 82 of the frame
13 of the track system 16 relative to an
adjacent structure 89 of the frame 13
and/or relative to the drive wheel 24 of
the track system 16

Maintaining the position of the given
structure 82 of the frame 13 relative to
the adjacent structure 89 of the frame
13 and/or relative to the drive wheel 24

FIG. 47

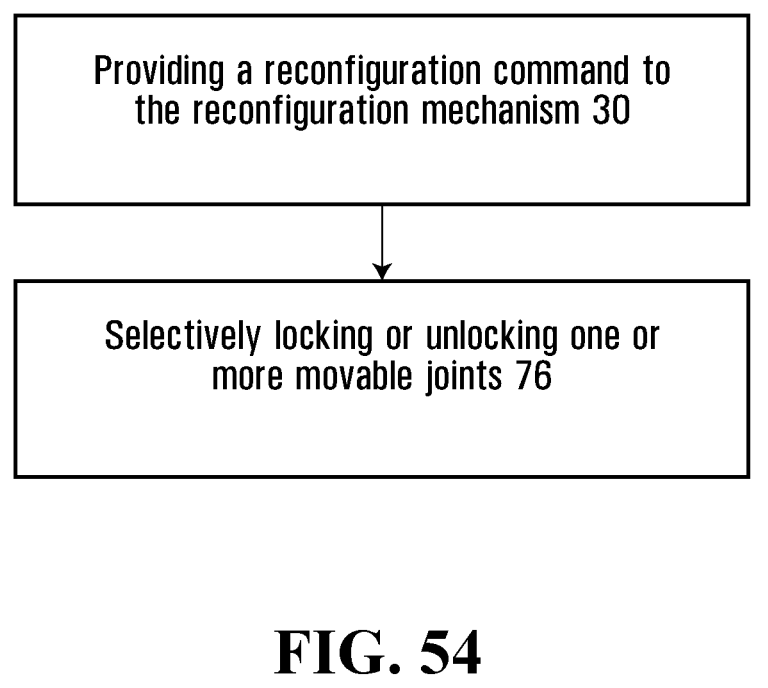

Providing a reconfiguration command to the reconfiguration mechanism 30

Selectively locking or unlocking one or more movable joints 76

FIG. 54

Providing a reconfiguration command to the reconfiguration mechanism 30

Altering behavior of the suspension 74

Maintaining the altered behavior of the suspension 74

Providing a reconfiguration command to the reconfiguration mechanism 30

Altering an orientation of at least part of the track system 16 relative to the frame 12 of the vehicle 10 other than for steering Maintaining the altered orientation of the at least part of the track system 16

TRACK SYSTEM FOR TRACTION OF A VEHICLE

CROSS-REFERENCE TO RELATED APPLICATIONS

This application claims priority from U.S. Provisional Patent Application Ser. No. 63/067,103 filed on Aug. 18, 2020, which is incorporated by reference herein.

FIELD

This disclosure relates generally to vehicles (e.g., agricultural vehicles or other industrial vehicles, etc.) and, more particularly, to track systems for traction of vehicles.

BACKGROUND

Off-road vehicles, including agricultural vehicles (e.g., tractors, harvesters, combines, etc.), construction vehicles (e.g., loaders, excavators, bulldozers, etc.), and forestry vehicles (e.g., feller-bunchers, knuckleboom loaders, etc.), military vehicles (e.g., combat engineering vehicles (CEVs), etc.), snowmobiles, and all-terrain vehicles (ATVs), may comprise track systems to enhance their traction and floatation on soft, slippery, and/or irregular grounds (e.g., soil, mud, etc.).

A vehicle's track system comprises a track-engaging assembly and a track that is driven around the track-engaging assembly, which may include a frame, track-contacting wheels, etc. The track system is typically designed taking into consideration how, where, and when the vehicle will be used (e.g., in agricultural fields, on roads, in trails, at construction sites, etc.). However, operating conditions of the vehicle (e.g., speeds, loads, ground characteristics, uses/applications, etc.) can vary, sometimes significantly, and the track system may not perform optimally under all these conditions (e.g., due to trade-offs and other decisions made during its design).

For these and other reasons, improvements for track systems of vehicles would be welcomed.

SUMMARY

According to various aspects, this disclosure relates to a track system for a vehicle on a ground, wherein the track system is reconfigurable, such as by rearranging or otherwise altering one or more components of the track system (e.g., wheels, pivots or other joints, frame members, etc., by changing their position, movability, etc.) and/or by repositioning the track system relative to a frame of the vehicle, which may be useful, for instance, to enhance performance of the vehicle (e.g., maximize or otherwise increase traction and/or pulling force (e.g., drawbar pull); improve steerability; etc.), ride quality (e.g., comfort), effects on the ground (e.g., minimize or otherwise reduce soil compaction and/or soil shear stress; provide headland protection; etc.), and/or other aspects of the track system and/or the vehicle, and/or for various other purposes.

For example, according to an aspect, this disclosure relates to a track system for a vehicle on a ground. The track system comprises: a track that is elastomeric and comprises a ground-engaging outer surface and an inner surface opposite to the ground-engaging outer surface; a track-engaging assembly configured to drive and guide the track around the track-engaging assembly and comprising a plurality of track-contacting wheels; and a reconfiguration mechanism configured to reconfigure the track system.

According to another aspect, this disclosure relates to a track system for a vehicle on a ground. The track system comprises a track that is elastomeric and comprises a ground-engaging outer surface and an inner surface opposite to the ground-engaging outer surface. The track system comprises a track-engaging assembly configured to drive and guide the track around the track-engaging assembly, the track-engaging assembly comprising a frame and a plurality of track-contacting wheels including: a drive wheel configured to drive the track; a front idler wheel and a rear idler wheel spaced apart in a longitudinal direction of the track system; and a plurality of roller wheels between the front idler wheel and the rear idler wheel in the longitudinal direction of the track system. The track system comprises a reconfiguration mechanism configured to reconfigure the track-engaging assembly, the reconfiguration mechanism being configured to move a given one of the roller wheels relative to the frame of the track-engaging assembly.

According to another aspect, this disclosure relates to a track system for a vehicle on a ground. The track system comprises: a track that is elastomeric and comprises a ground-engaging outer surface and an inner surface opposite to the ground-engaging outer surface; a track-engaging assembly configured to drive and guide the track around the track-engaging assembly, the track-engaging assembly comprising a frame and a plurality of track-contacting wheels; and a reconfiguration mechanism configured to reconfigure the track-engaging assembly, the reconfiguration mechanism being configured to move longitudinally-spaced ones of the track-contacting wheels that are spaced apart in the longitudinal direction of the track system relative to the frame of the track-engaging assembly.

According to another aspect, this disclosure relates to a track system for a vehicle on a ground. The track system comprises: a track that is elastomeric and comprises a ground-engaging outer surface and an inner surface opposite to the ground-engaging outer surface; a track-engaging assembly configured to drive and guide the track around the track-engaging assembly and a plurality of track-contacting wheels, laterally-oscillating ones of the track-contacting wheels being configured to oscillate about an oscillation axis transverse to a widthwise direction of the track system; and a reconfiguration mechanism configured to reconfigure the track-engaging assembly, the reconfiguration mechanism being configured to move to alter a configuration of the laterally-oscillating ones of the track-contacting wheels.

According to another aspect, this disclosure relates to a track system for a vehicle on a ground. The track system comprises: a track that is elastomeric and comprises a ground-engaging outer surface and an inner surface opposite to the ground-engaging outer surface; a track-engaging assembly configured to drive and guide the track around the track-engaging assembly, the track-engaging assembly comprising a frame, a movable joint, and a plurality of track-contacting wheels; and a reconfiguration mechanism configured to reconfigure the track-engaging assembly, the reconfiguration mechanism being configured to move the movable joint relative to the frame of the track-engaging assembly.

According to another aspect, this disclosure relates to a track system for a vehicle on a ground. The track system comprises: a track that is elastomeric and comprises a ground-engaging outer surface and an inner surface opposite to the ground-engaging outer surface; a track-engaging assembly configured to drive and guide the track around the track-engaging assembly, the track-engaging assembly comprising a frame, a plurality of movable joints, and a plurality of track-contacting wheels; and a reconfiguration mechanism configured to reconfigure the track-engaging assembly, the reconfiguration mechanism being configured to move given ones of the movable joints relative to the frame of the track-engaging assembly.

According to another aspect, this disclosure relates to a track system for a vehicle on a ground. The track system comprises: a track that is elastomeric and comprises a ground-engaging outer surface and an inner surface opposite to the ground-engaging outer surface; a track-engaging assembly configured to drive and guide the track around the track-engaging assembly, the track-engaging assembly comprising a frame and a plurality of track-contacting wheels; and a reconfiguration mechanism configured to reconfigure the track-engaging assembly, the reconfiguration mechanism being configured to move a lower one of the structures of the frame that carries respective ones of the track-contacting wheels relative to an upper one of the structures of the frame that is above the lower one of the structures of the frame.

According to another aspect, this disclosure relates to a track system for a vehicle on a ground. The track system comprises a track that is elastomeric and comprises a ground-engaging outer surface and an inner surface opposite to the ground-engaging outer surface. The track system comprises a track-engaging assembly configured to drive and guide the track around the track-engaging assembly, the track-engaging assembly comprising a frame and a plurality of track-contacting wheels including: a drive wheel configured to drive the track; a front idler wheel and a rear idler wheel spaced apart in a longitudinal direction of the track system; and a plurality of roller wheels between the front idler wheel and the rear idler wheel in the longitudinal direction of the track system. The track system comprises a reconfiguration mechanism configured to reconfigure the track-engaging assembly, the reconfiguration mechanism being configured to move a portion of the frame of the track-engaging assembly relative to the drive wheel.

According to another aspect, this disclosure relates to a track system for a vehicle on a ground. The track system comprises a track that is elastomeric and comprises a ground-engaging outer surface and an inner surface opposite to the ground-engaging outer surface. The track system comprises a track-engaging assembly configured to drive and guide the track around the track-engaging assembly, the track-engaging assembly comprising a frame and a plurality of track-contacting wheels including: a drive wheel configured to drive the track; a front idler wheel and a rear idler wheel spaced apart in a longitudinal direction of the track system; and a plurality of roller wheels between the front idler wheel and the rear idler wheel in the longitudinal direction of the track system. The track system comprises a reconfiguration mechanism configured to reconfigure the track-engaging assembly, the reconfiguration mechanism being configured to move a portion of the frame of the track-engaging assembly relative to the drive wheel, the portion of the frame carrying respective ones of the front idler wheel, the rear idler wheel, and the roller wheels.

According to another aspect, this disclosure relates to a track system for a vehicle on a ground. The track system comprises: a track that is elastomeric and comprises a ground-engaging outer surface and an inner surface opposite to the ground-engaging outer surface; a track-engaging assembly configured to drive and guide the track around the track-engaging assembly, the track-engaging assembly comprising a frame, a movable joint, and a plurality of track-contacting wheels; and a reconfiguration mechanism configured to reconfigure the track-engaging assembly, the reconfiguration mechanism being configured to restrict movement of the movable joint relative to the frame of the track-engaging assembly.

According to another aspect, this disclosure relates to a track system for a vehicle on a ground. The track system comprises: a track that is elastomeric and comprises a ground-engaging outer surface and an inner surface opposite to the ground-engaging outer surface; a track-engaging assembly configured to drive and guide the track around the track-engaging assembly, the track-engaging assembly comprising a frame, a plurality of movable joints, and a plurality of track-contacting wheels; and a reconfiguration mechanism configured to reconfigure the track-engaging assembly, the reconfiguration mechanism being configured to restrict movement of the movable joints relative to the frame of the track-engaging assembly.

According to another aspect, this disclosure relates to a track system for a vehicle on a ground. The track system comprises: a track that is elastomeric and comprises a ground-engaging outer surface and an inner surface opposite to the ground-engaging outer surface; a track-engaging assembly configured to drive and guide the track around the track-engaging assembly and comprising a plurality of track-contacting wheels; and a reconfiguration mechanism configured to reconfigure the track-engaging assembly, the reconfiguration mechanism being configured to alter internal loading within the track system.

According to another aspect, this disclosure relates to a track system for a vehicle on a ground. The track system comprises: a track that is elastomeric and comprises a ground-engaging outer surface and an inner surface opposite to the ground-engaging outer surface; a track-engaging assembly configured to drive and guide the track around the track-engaging assembly and comprising a plurality of track-contacting wheels; and a reconfiguration mechanism configured to reconfigure the track-engaging assembly, the reconfiguration mechanism being configured to alter a plurality of loads within the track system.

According to another aspect, this disclosure relates to a track system for a vehicle on a ground. The track system comprises: a track that is elastomeric and comprises a ground-engaging outer surface and an inner surface opposite to the ground-engaging outer surface; a track-engaging assembly configured to drive and guide the track around the track-engaging assembly and comprising a plurality of track-contacting wheels; and a reconfiguration mechanism configured to reconfigure the track-engaging assembly, the reconfiguration mechanism being configured to alter a plurality of loads applied to longitudinally-spaced ones of the track-contacting wheels that are spaced apart in a longitudinal direction of the track system.

According to another aspect, this disclosure relates to a track system for a vehicle on a ground. The track system comprises: a track that is elastomeric and comprises a ground-engaging outer surface and an inner surface opposite to the ground-engaging outer surface; a track-engaging assembly configured to drive and guide the track around the track-engaging assembly, the track-engaging assembly comprising a plurality of track-contacting wheels and a suspension; and a reconfiguration mechanism configured to reconfigure the track-engaging assembly, the reconfiguration mechanism being configured to alter a behavior of the suspension of the track system.

According to another aspect, this disclosure relates to a track system for a vehicle on a ground. The track system comprises: a track that is elastomeric and comprises a ground-engaging outer surface and an inner surface opposite to the ground-engaging outer surface; a track-engaging assembly configured to drive and guide the track around the track-engaging assembly, the track-engaging assembly comprising a plurality of track-contacting wheels and a suspension, the suspension comprising a pivot; and a reconfiguration mechanism configured to reconfigure the track-engaging assembly, the reconfiguration mechanism being configured to alter a rotational behavior of the pivot of the suspension of the track system.

According to another aspect, this disclosure relates to a track system for a vehicle on a ground. The track system comprises: a track that is elastomeric and comprises a ground-engaging outer surface and an inner surface opposite to the ground-engaging outer surface; a track-engaging assembly configured to drive and guide the track around the track-engaging assembly and comprising a plurality of track-contacting wheels; and a reconfiguration mechanism configured to alter an orientation of at least part of the track system relative to a frame of the vehicle other than for steering.

According to another aspect, this disclosure relates to a track system for a vehicle on a ground. The track system comprises: a track that is elastomeric and comprises a ground-engaging outer surface and an inner surface opposite to the ground-engaging outer surface; a track-engaging assembly configured to drive and guide the track around the track-engaging assembly and comprising a plurality of track-contacting wheels; and a reconfiguration mechanism configured to alter an orientation of at least part of the track system relative to a frame of the vehicle about a widthwise axis of the vehicle.

According to another aspect, this disclosure relates to a track system for a vehicle on a ground. The track system comprises: a track that is elastomeric and comprises a ground-engaging outer surface and an inner surface opposite to the ground-engaging outer surface; a track-engaging assembly configured to drive and guide the track around the track-engaging assembly and comprising a plurality of track-contacting wheels; and a reconfiguration mechanism configured to alter an orientation of at least part of the track system relative to a frame of the vehicle about a longitudinal axis of the vehicle.

According to another aspect, this disclosure relates to a track system for a vehicle on a ground. The track system comprises: a track that is elastomeric and comprises a ground-engaging outer surface and an inner surface opposite to the ground-engaging outer surface; a track-engaging assembly configured to drive and guide the track around the track-engaging assembly and comprising a plurality of track-contacting wheels; and a reconfiguration mechanism configured to alter an orientation of at least part of the track system relative to a frame of the vehicle about a widthwise axis of the vehicle and about a longitudinal axis of the vehicle.

According to another aspect, this disclosure relates to a track system for a vehicle on a ground. The track system comprises: a track that is elastomeric and comprises a ground-engaging outer surface and an inner surface opposite to the ground-engaging outer surface; a track-engaging assembly configured to drive and guide the track around the track-engaging assembly and comprising a plurality of track-contacting wheels; and a reconfiguration mechanism configured to alter an angle of attack and a camber of at least part of the track system relative to a frame of the vehicle.

According to another aspect, this disclosure relates to a track system for a vehicle on a ground. The track system comprises: a track that is elastomeric and comprises a ground-engaging outer surface and an inner surface opposite to the ground-engaging outer surface; a track-engaging assembly configured to drive and guide the track around the track-engaging assembly and comprising a plurality of track-contacting wheels; and a reconfiguration mechanism configured to reconfigure the track system based on a pulling force exerted by the vehicle.

According to another aspect, this disclosure relates to a track system for a vehicle on a ground. The track system comprises: a track that is elastomeric and comprises a ground-engaging outer surface and an inner surface opposite to the ground-engaging outer surface; a track-engaging assembly configured to drive and guide the track around the track-engaging assembly and comprising a plurality of track-contacting wheels; and a reconfiguration mechanism configured to reconfigure the track system based on motion of the vehicle.

According to another aspect, this disclosure relates to a track system for a vehicle on a ground. The track system comprises: a track that is elastomeric and comprises a ground-engaging outer surface and an inner surface opposite to the ground-engaging outer surface; a track-engaging assembly configured to drive and guide the track around the track-engaging assembly and comprising a plurality of track-contacting wheels; and a reconfiguration mechanism configured to reconfigure the track system based on a speed of the vehicle.

According to another aspect, this disclosure relates to a track system for a vehicle on a ground. The track system comprises: a track that is elastomeric and comprises a ground-engaging outer surface and an inner surface opposite to the ground-engaging outer surface; a track-engaging assembly configured to drive and guide the track around the track-engaging assembly and comprising a plurality of track-contacting wheels; and a reconfiguration mechanism configured to reconfigure the track system based on a characteristic of the ground.

According to another aspect, this disclosure relates to a track system for a vehicle on a ground. The track system comprises: a track that is elastomeric and comprises a ground-engaging outer surface and an inner surface opposite to the ground-engaging outer surface; a track-engaging assembly configured to drive and guide the track around the track-engaging assembly and comprising a plurality of track-contacting wheels; a reconfiguration mechanism configured to reconfigure the track system based on whether the ground is a field or a road.

These and other aspects of this disclosure will now become apparent to those of ordinary skill in the art upon review of a description of embodiments in conjunction with accompanying drawings.

BRIEF DESCRIPTION OF DRAWINGS

A detailed description of embodiments is provided below, by way of example only, with reference to the accompanying drawings, in which:

FIG. 47 shows a method of implementing the track system;

FIG. 54 shows a method of implementing the track system;

It is to be expressly understood that the description and drawings are only for purposed of illustrating certain embodiments and are an aid for understanding. They are not intended to be and should not be limiting.

DETAILED DESCRIPTION OF EMBODIMENTS

Figure 1:
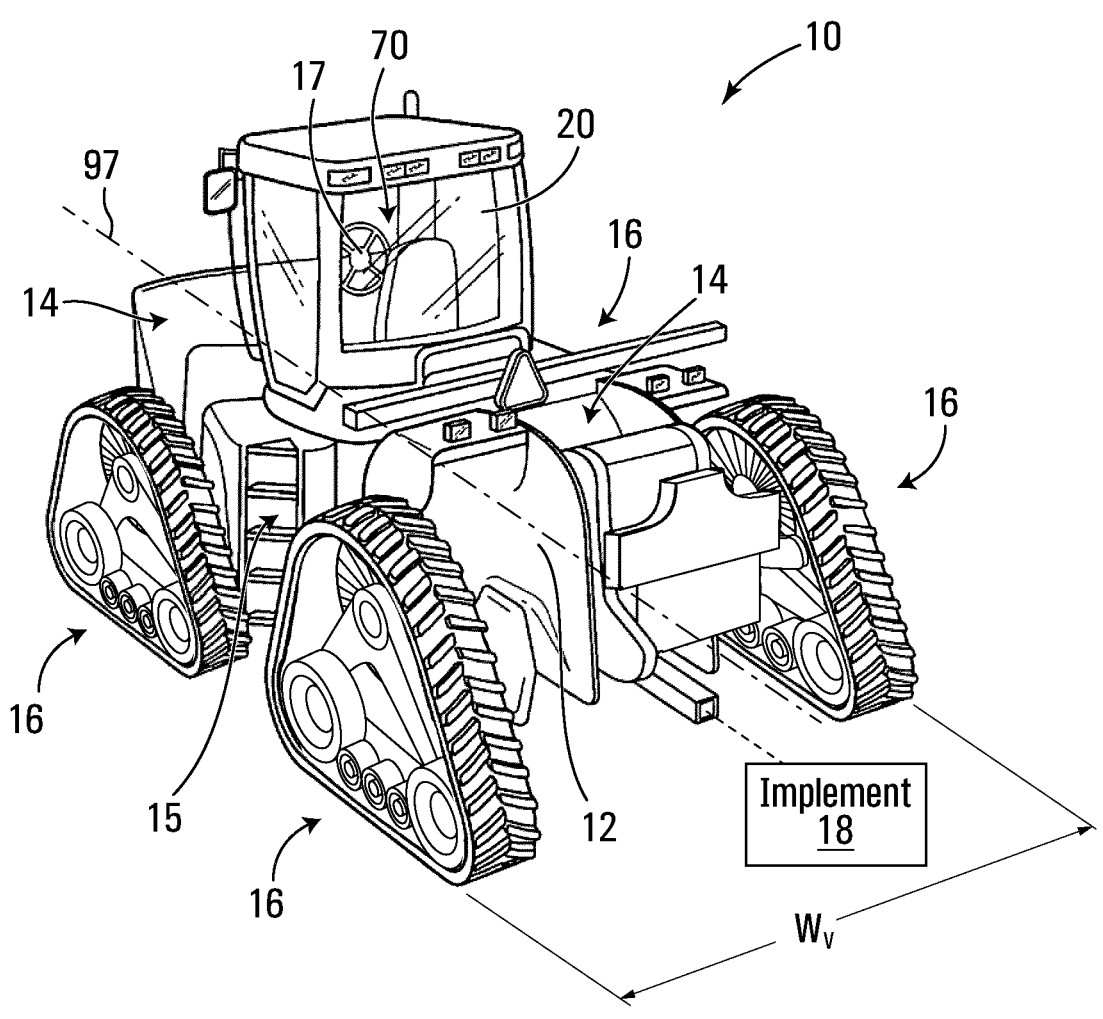
FIG. 1 shows an example of an agricultural vehicle comprising a track system in accordance with an embodiment.

FIG. 1 shows an embodiment of a vehicle 10 comprising track systems 16 including tracks 22 for traction of the vehicle 10 on a ground. In this embodiment, the vehicle 10 is an agricultural vehicle for performing agricultural work on an agricultural field including soil. Specifically, in this example, the agricultural vehicle 10 is a tractor. In other examples, the agricultural vehicle 10 may be a combine harvester, another type of harvester, or any other type of agricultural vehicle.

The agricultural vehicle 10 comprises a frame 12, a powertrain 15, a steering system 17, the track systems 16 (which can be referred to as "undercarriages"), and an operator cabin 20 that enable an operator to move the agricultural vehicle 10 on the ground. The vehicle 10 can travel on the agricultural field to perform agricultural work using a work implement 18. The vehicle 10 can also be "roading", i.e., travelling on a road (i.e., a paved road having a hard surface of asphalt, concrete, gravel, or other pavement), such as between agricultural fields.

As further discussed later, in this embodiment, the track systems 16 are reconfigurable, such as by rearranging or otherwise altering components of the track systems 16 (e.g., wheels, pivots or other joints, frame members, etc., by changing their position, movability, etc.) and/or by repositioning the track systems 16 relative to the frame 12 of the vehicle 10, which may be useful, for instance, to enhance performance of the vehicle 10 (e.g., maximize or otherwise increase traction and/or pulling force (e.g., drawbar pull); improve steerability; etc.), ride quality (e.g., comfort), effects on the ground (e.g., minimize or otherwise reduce soil compaction and/or soil shear stress; provide headland protection; etc.), and/or other aspects of the track system 16 and/or the vehicle 10, and/or for various other purposes.

The powertrain 15 is configured for generating motive power and transmitting motive power to the track systems 16 to propel the agricultural vehicle 10 on the ground. To that end, the powertrain 15 comprises a prime mover 14, which is a source of motive power that comprises one or more motors. For example, in this embodiment, the prime mover 14 comprises an internal combustion engine. In other embodiments, the prime mover 14 may comprise another type of motor (e.g., an electric motor) or a combination of different types of motor (e.g., an internal combustion engine and an electric motor). The prime mover 14 is in a driving relationship with the track systems 16. That is, the powertrain 15 transmits motive power generated by the prime mover 14 to one or more of the track systems 16 in order to drive (i.e., impart motion to) these one or more of the track systems 16. The powertrain 15 may transmit power from the prime mover 14 to the track systems 16 in any suitable way. In this embodiment, the powertrain 15 comprises a transmission between the prime mover 14 and final drive axles 56 for transmitting motive power from the prime mover 14 to the track systems 16. The transmission may be an automatic transmission (e.g., a continuously variable transmission (CVT)) or any other suitable type of transmission.

The work implement 18 is used to perform agricultural work. For example, in some embodiments, the work implement 18 may be a combine head, a cutter, a scraper pan, a tool bar, a planter, or any other type of agricultural work implement.

The operator cabin 20 is where the operator sits and controls the agricultural vehicle 10. More particularly, the operator cabin 20 comprises a user interface 70 including a set of controls that allow the operator to steer the agricultural vehicle 10 on the ground and operate the work implement 18. For example, in this embodiment, the user interface 70 comprises an accelerator, a brake control, and a steering device that are operable by the operator to control motion of the agricultural vehicle 10 on the ground and operation of the work implement 18. The user interface 70 also comprises an instrument panel (e.g., a dashboard) which provides indicators (e.g., a speedometer indicator, a tachometer indicator, etc.) to convey information to the operator.

Figure 2:
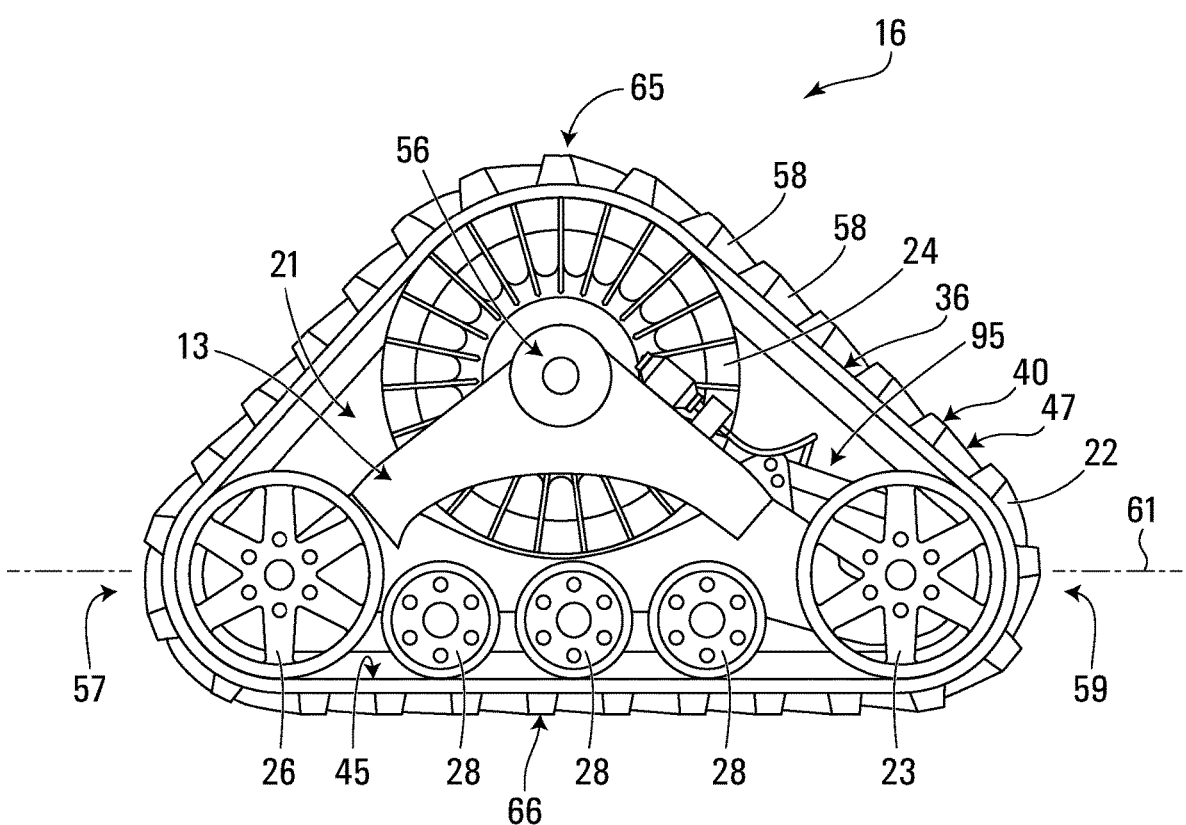
FIGS. 2 and 3 show a perspective view and a side view of the track system.
Figure 3:
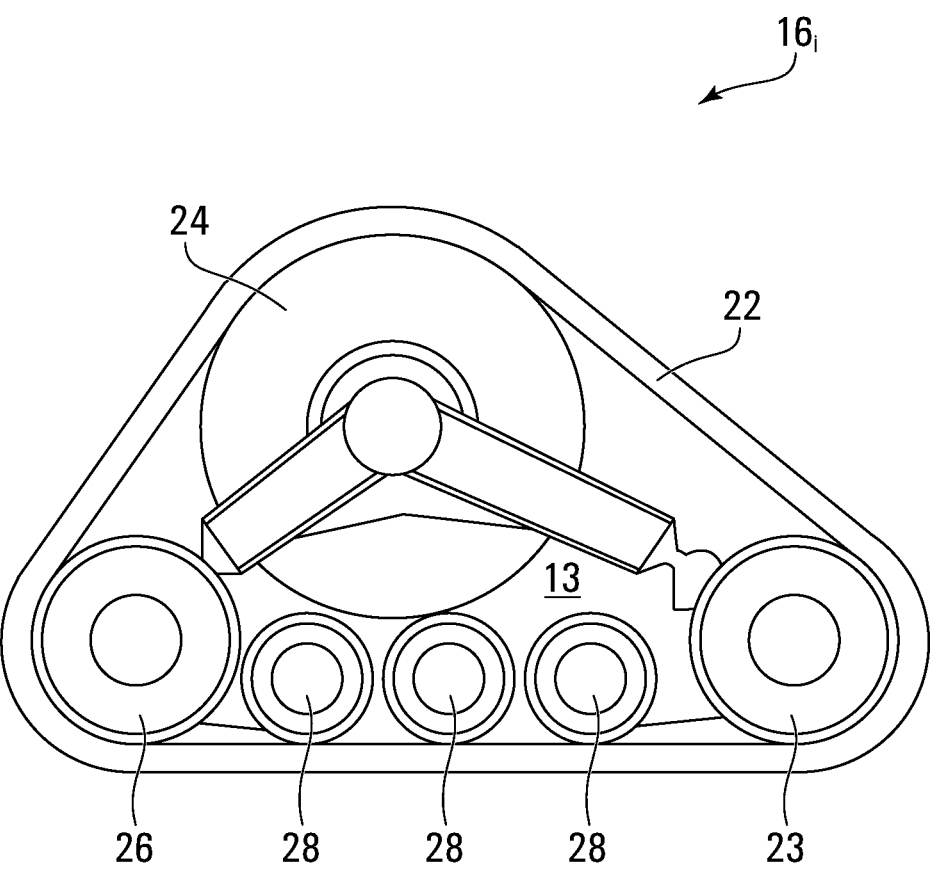
Figures 4, 5:
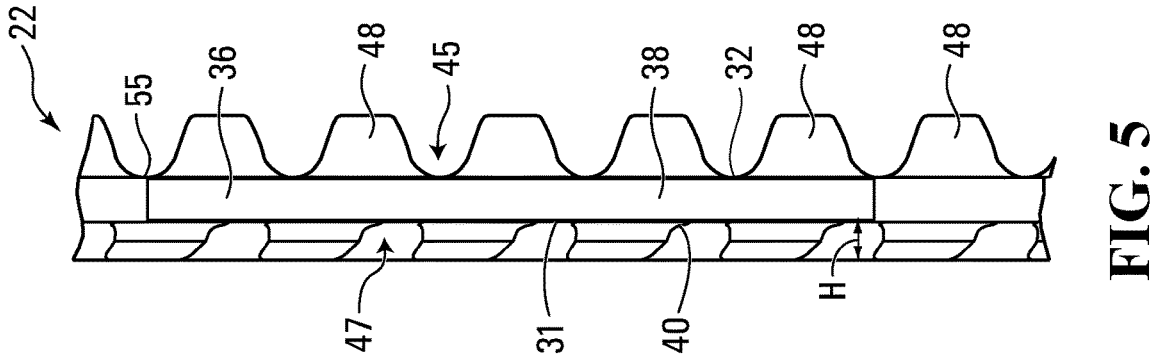
FIGS. 4 and 5 show a plan view and a side view of a track of the track system.
Figure 6:
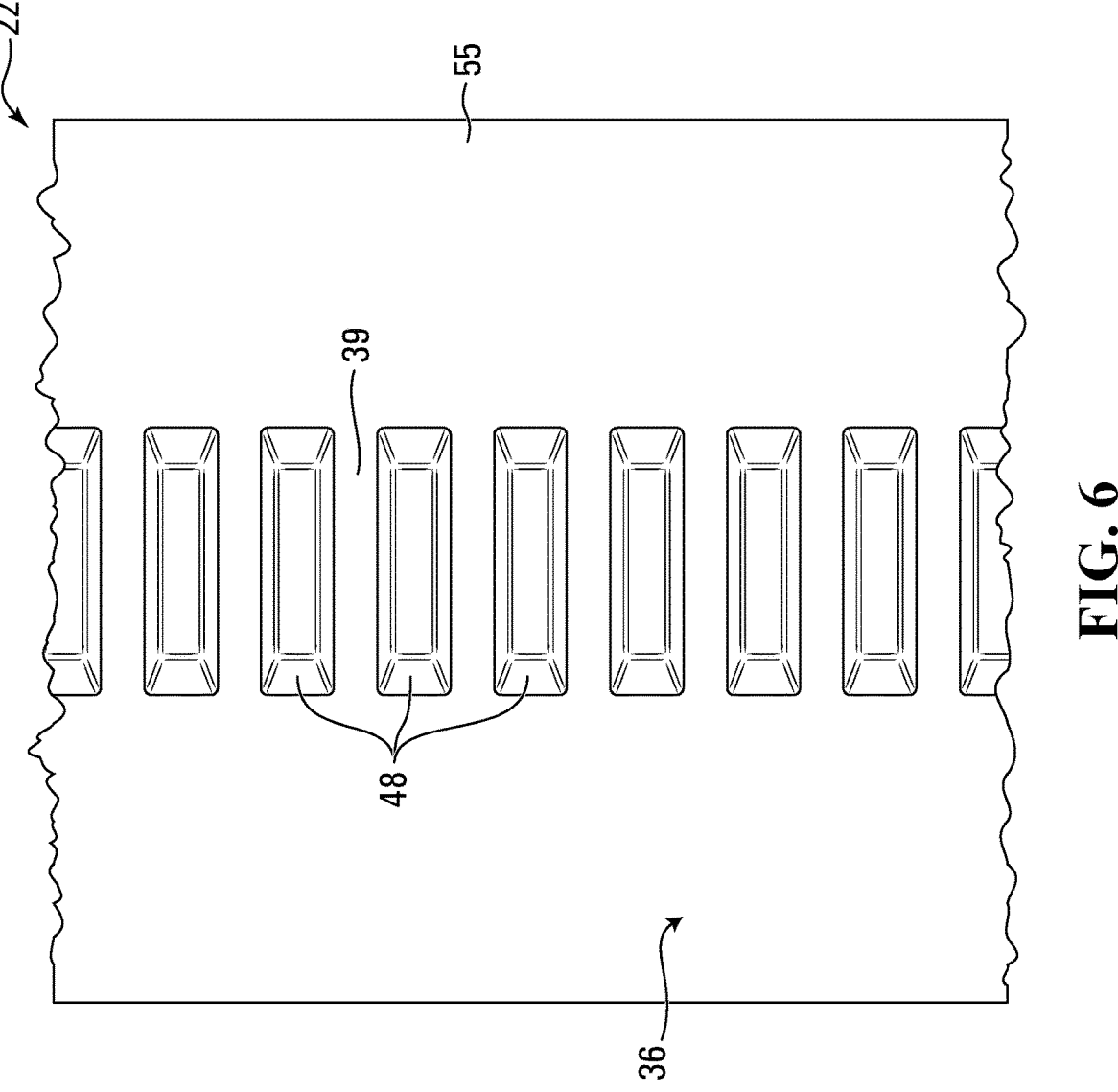
FIG. 6 shows an inside view of the track.
Figure 7:
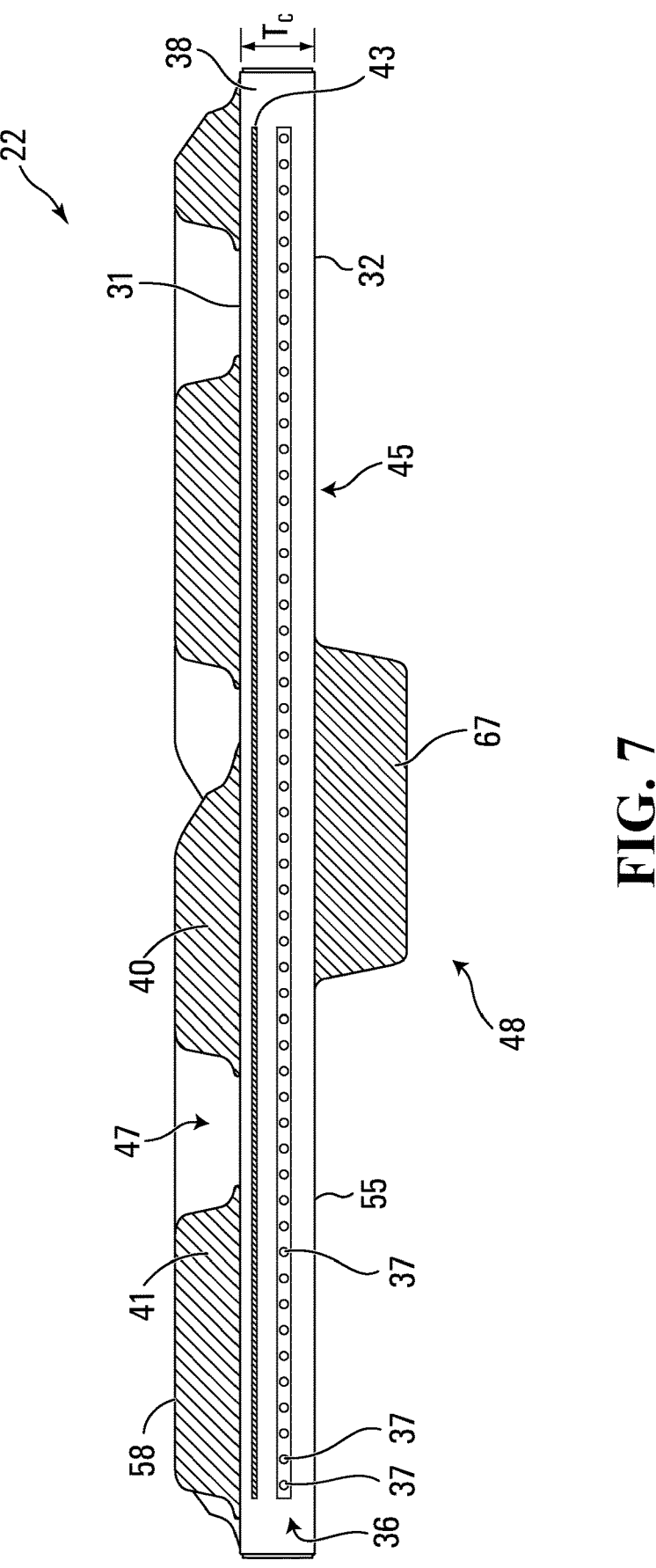
FIG. 7 shows a cross-sectional view of the track.
Figure 8:
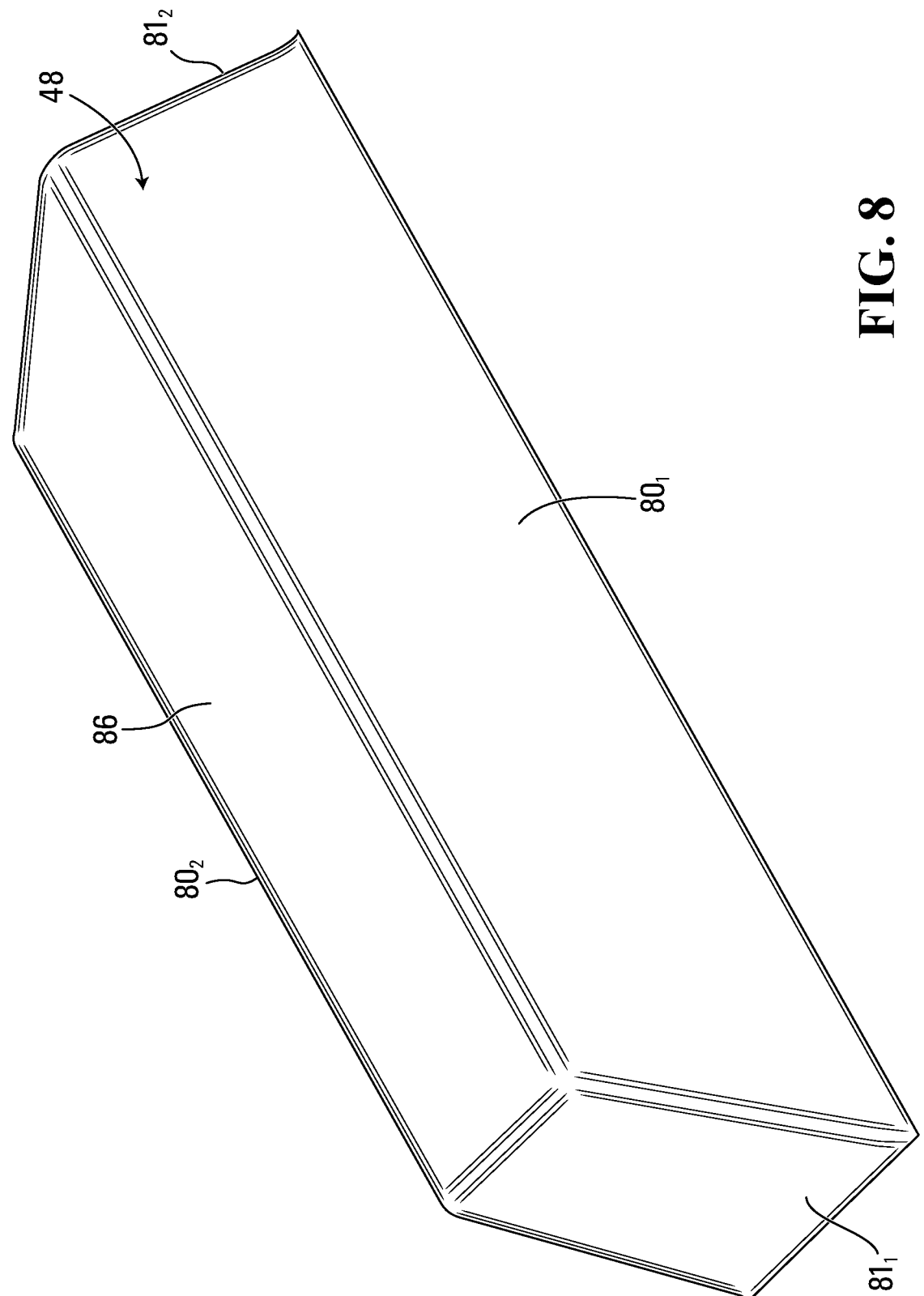
FIG. 8 shows a perspective view of a drive/guide projection of the track.

The track systems 16 engage the ground to propel the agricultural vehicle 10. As shown in FIGS. 2 and 3, each track system 16 comprises a track-engaging assembly 21 and a track 22 disposed around the track-engaging assembly 21. In this embodiment, the track-engaging assembly 21 comprises a plurality of track-contacting wheels which, in this example, includes a drive wheel 24 and a plurality of idler wheels that includes front (i.e., leading) idler wheels 23, rear (i.e., trailing) idler wheels 26, and roller wheels 28. The track-engaging assembly 21 also comprises a frame 13 which supports various components of the track system 16, including the wheels 23, 26, 28. The track system 16 has a longitudinal direction and a first longitudinal end 57 and a second longitudinal end 59 that define a length of the track system 16 along a longitudinal axis 61 that defines the longitudinal direction of the track system 16. The track system 16 has a widthwise direction and a width that is defined by a width W of the track 22. The track system 16 also has a heightwise direction that is normal to its longitudinal direction and its widthwise direction.

In this embodiment, front ones of the track systems 16 are steerable by the steering system 17 of the agricultural vehicle 10 in response to input of the user at the steering device to change an orientation of each of these track systems relative to the frame 12 of the agricultural vehicle 10 in order to steer the agricultural vehicle 10 on the ground. To that end, each of the front ones of the track systems 16 is pivotable about a steering axis 25 of the agricultural vehicle 10. An orientation of the longitudinal axis 61 of each of the front ones of the track systems 16 is thus adjustable relative to a longitudinal axis 97 of the agricultural vehicle 10.

The track 22 engages the ground to provide traction to the agricultural vehicle 10. A length of the track 22 allows the track 22 to be mounted around the track-engaging assembly 21. In view of its closed configuration without ends that allows it to be disposed and moved around the track-engaging assembly 21, the track 22 can be referred to as an "endless" track. With additional reference to FIGS. 3 to 6, the track 22 comprises an inner side 45, a ground-engaging outer side 47, and lateral edges 49. The inner side 45 faces the wheels 23, 24, 26, 28, while the ground-engaging outer side 47 engages the ground. A top run 65 of the track 22 extends between the longitudinal ends 57, 59 of the track system 16 and over the wheels 23, 24, 26, 28, while a bottom run 66 of the track 22 extends between the longitudinal ends 57, 59 of the track system 16 and under the wheels 23, 24, 26, 28. The bottom run 66 of the track 22 defines an area of contact 63 of the track 22 with the ground which generates traction and bears a majority of a load on the track system 16, and which will be referred to as a "contact patch" of the track 22 with the ground. The track 22 has a longitudinal axis 19 which defines a longitudinal direction of the track 22 (i.e., a direction generally parallel to its longitudinal axis) and transversal directions of the track 22 (i.e., directions transverse to its longitudinal axis), including a widthwise direction of the track 22 (i.e., a lateral direction generally perpendicular to its longitudinal axis). The track 22 has a thickness direction normal to its longitudinal and widthwise directions.

The track 22 is elastomeric, i.e., comprises elastomeric material, to be flexible around the track-engaging assembly 21. The elastomeric material of the track 22 can include any polymeric material with suitable elasticity. In this embodiment, the elastomeric material of the track 22 includes rubber. Various rubber compounds may be used and, in some cases, different rubber compounds may be present in different areas of the track 22. In other embodiments, the elastomeric material of the track 22 may include another elastomer in addition to or instead of rubber (e.g., polyurethane elastomer).

More particularly, the track 22 comprises an endless body 36 underlying its inner side 45 and ground-engaging outer side 47. In view of its underlying nature, the body 36 will be referred to as a "carcass". The carcass 36 is elastomeric in that it comprises elastomeric material 38 which allows the carcass 36 to elastically change in shape and thus the track 22 to flex as it is in motion around the track-engaging assembly 21.

In this embodiment, the carcass 36 comprises a plurality of reinforcements embedded in its elastomeric material 38. These reinforcements can take on various forms.

For example, in this embodiment, the carcass 36 comprises a layer of reinforcing cables 37 that are adjacent to one another and extend generally in the longitudinal direction of the track 22 to enhance strength in tension of the track 22 along its longitudinal direction. In this case, each of the reinforcing cables 37 is a cord including a plurality of strands (e.g., textile fibers or metallic wires). In other cases, each of the reinforcing cables 37 may be another type of cable and may be made of any material suitably flexible along the cable's longitudinal axis (e.g., fibers or wires of metal, plastic or composite material).

As another example, in this embodiment, the carcass 36 comprises a layer of reinforcing fabric 43. The reinforcing fabric 43 comprises thin pliable material made usually by weaving, felting, knitting, interlacing, or otherwise crossing natural or synthetic elongated fabric elements, such as fibers, filaments, strands and/or others, such that some elongated fabric elements extend transversally to the longitudinal direction of the track 22 to have a reinforcing effect in a transversal direction of the track 22. For instance, the reinforcing fabric 43 may comprise a ply of reinforcing woven fibers (e.g., nylon fibers or other synthetic fibers).

The carcass 36 may be molded into shape in a molding process during which the rubber 38 is cured. For example, in this embodiment, a mold may be used to consolidate layers of rubber providing the rubber 38 of the carcass 36, the reinforcing cables 37 and the layer of reinforcing fabric 43.

The inner side 45 of the track 22 comprises an inner surface 55 of the carcass 36 and a plurality of wheel-contacting projections 48 that project from the inner surface 55 and are positioned to contact at least some of the wheels 23, 24, 26, 28 to do at least one of driving (i.e., imparting motion to) the track 22 and guiding the track 22. The wheel-contacting projections 48 can be referred to as "wheel-contacting lugs". Furthermore, since each of them is used to do at least one of driving the track 22 and guiding the track 22, the wheel-contacting lugs 48 can be referred to as "drive/guide projections" or "drive/guide lugs". In some examples of implementation, a drive/guide lug 48 may interact with the drive wheel 24 to drive the track 22, in which case the drive/guide lug 48 is a drive lug. In other examples of implementation, a drive/guide lug 48 may interact with the front and rear idler wheels 23, 26 and/or the roller wheels 28 to guide the track 22 to maintain proper track alignment and prevent de-tracking without being used to drive the track 22, in which case the drive/guide lug 48 is a guide lug. In yet other examples of implementation, a drive/guide lug 48 may both (i) interact with the drive wheel 24 to drive the track and (ii) interact with the idler wheels 23, 26 and/or the roller wheels 28 to guide the track 22 to maintain proper track alignment and prevent de-tracking, in which case the drive/guide lug 48 is both a drive lug and a guide lug.

In this embodiment, the drive/guide lugs 48 interact with the drive wheel 24 in order to cause the track 22 to be driven, and also interact with the idler wheels 23, 26 and the roller wheels 28 in order to guide the track 22 as it is driven by the drive wheel 24 to maintain proper track alignment and prevent de-tracking. The drive/guide lugs 48 are thus used to both drive the track 22 and guide the track 22 in this embodiment.

In this example of implementation, the drive/guide lugs 48 are arranged in a single row disposed longitudinally along the inner side 45 of the track 22. The drive/guide lugs 48 may be arranged in other manners in other examples of implementation (e.g., in a plurality of rows that are spaced apart along the widthwise direction of the track 22).

In this embodiment, the drive/guide lugs 48 are configured to pass between respective pairs of the idler wheels 23, 26 and/or the roller wheels 28 when they are aligned with one another, such that lateral surfaces of each drive/guide lug 48 face respecting ones of the idler wheels 23, 26 and/or the roller wheels 28 when they are aligned with one another.

In this embodiment, each drive/guide lug 48 is an elastomeric drive/guide lug in that it comprises elastomeric material 67. The elastomeric material 67 can be any polymeric material with suitable elasticity. More particularly, in this embodiment, the elastomeric material 67 includes rubber. Various rubber compounds may be used and, in some cases, different rubber compounds may be present in different areas of the drive/guide lug 48. In other embodiments, the elastomeric material 67 may include another elastomer in addition to or instead of rubber (e.g., polyurethane elastomer). The drive/guide lugs 48 may be provided on the inner side 45 in various ways. For example, in this embodiment, the drive/guide lugs 48 are provided on the inner side 45 by being molded with the carcass 36.

The ground-engaging outer side 47 comprises a ground-engaging outer surface 31 of the carcass 36 and a tread pattern 40 to enhance traction on the ground. The tread pattern 40 comprises a plurality of traction projections 58 projecting from the ground-engaging outer surface 31, spaced apart in the longitudinal direction of the track 22, and engaging the ground to enhance traction. The traction projections 58 may be referred to as "tread projections" or "traction lugs".

The traction lugs 58 may have any suitable shape. In this embodiment, each of the traction lugs 58 has an elongated shape and is angled, i.e., defines an oblique angle θ (i.e., an angle that is not a right angle or a multiple of a right angle), relative to the longitudinal direction of the track 22. The traction lugs 58 may have various other shapes in other examples (e.g., curved shapes, shapes with straight parts and curved parts, etc.).

In this embodiment, each traction lug 58 is an elastomeric traction lug in that it comprises elastomeric material 41. The elastomeric material 41 can be any polymeric material with suitable elasticity. More particularly, in this embodiment, the elastomeric material 41 includes rubber. Various rubber compounds may be used and, in some cases, different rubber compounds may be present in different areas of the traction lug 58. In other embodiments, the elastomeric material 41 may include another elastomer in addition to or instead of rubber (e.g., polyurethane elastomer). The traction lugs 58 may be provided on the ground-engaging outer side 47 in various ways. For example, in this embodiment, the traction lugs 58 are provided on the ground-engaging outer side 47 by being molded with the carcass 36.

The track 22 may be constructed in various other manners in other embodiments. For example, in some embodiments, the track 22 may have recesses or holes that interact with the drive wheel 24 in order to cause the track 22 to be driven (e.g., in which case the drive/guide lugs 48 may be used only to guide the track 22 without being used to drive the track 22, i.e., they may be "guide lugs" only), and/or the ground-engaging outer side 47 of the track 22 may comprise various patterns of traction lugs.

The drive wheel 24 is rotatable by power derived from the prime mover 14 to drive the track 22. That is, power generated by the prime mover 14 and delivered over the powertrain 15 of the agricultural vehicle 10 can rotate a final drive axle 56, which causes rotation of the drive wheel 24, which in turn imparts motion to the track 22.

Figure 9:
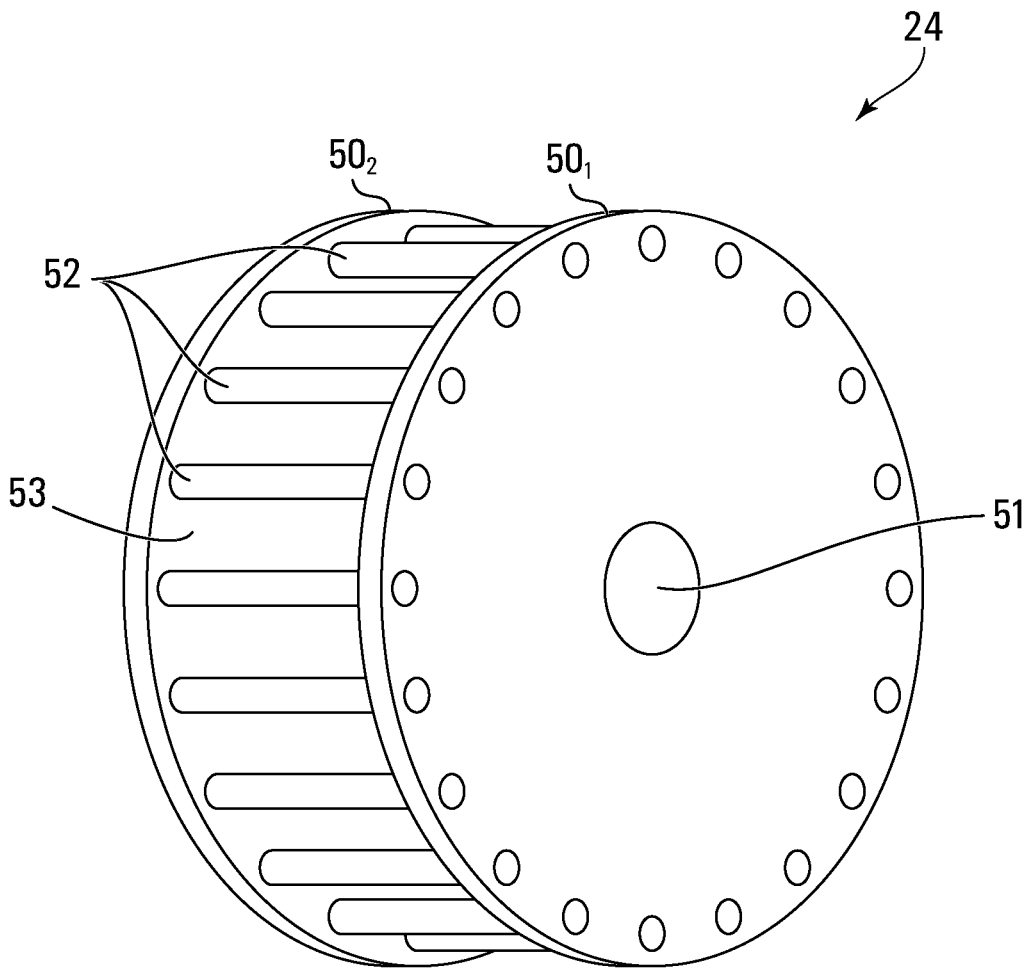
FIG. 9 shows a drive wheel of a track-engaging assembly of the track system.

With additional reference to FIG. 9, in this embodiment, the drive wheel 24 comprises a drive sprocket comprising a plurality of drive members 52 spaced apart along a circular path to engage the drive/guide lugs 48 of the track 22 in order to drive the track 22. The drive wheel 24 and the track 22 thus implement a "positive drive" arrangement. More particularly, in this embodiment, the drive wheel 24 comprises two side discs 50 which are co-centric and turn about a common axle 51 and between which the drive members 52 extend near respective peripheries of the side discs 50. In this example, the drive members 52 are thus drive bars that extend between the side discs 50₁, 50₂. The drive wheel 24 and the track 22 have respective dimensions allowing interlocking of the drive bars 52 of the drive wheel 24 and the drive/guide lugs 48 of the track 22. Adjacent ones of the drive bars 52 define an interior space 53 between them to receive one of the drive/guide lugs 48. Adjacent ones of the drive/guide lugs 48 define an inter-lug space 39 between them to receive one of the drive bars 52. The drive/guide lugs 48 and the drive bars 52 have a regular spacing that allows interlocking of the drive/guide lugs 48 and the drive bars 52 over a certain length of the drive wheel's circumference.

The drive wheel 24 may be configured in various other ways in other embodiments. For example, in other embodiments, the drive wheel 24 may not have any side discs such as the side discs 50. As another example, in other embodiments, instead of being drive bars, the drive members 52 may be drive teeth that are distributed circumferentially along the drive wheel 24 or any other type of drive members. As another example, in embodiments where the track 22 comprises recesses or holes, the drive wheel 24 may have teeth that enter these recesses or holes in order to drive the track 22. As yet another example, in some embodiments, the drive wheel 24 may frictionally engage the inner side 45 of the track 22 in order to frictionally drive the track 22 (i.e., the drive wheel 24 and the track 22 may implement a "friction drive" arrangement).

Figure 10:
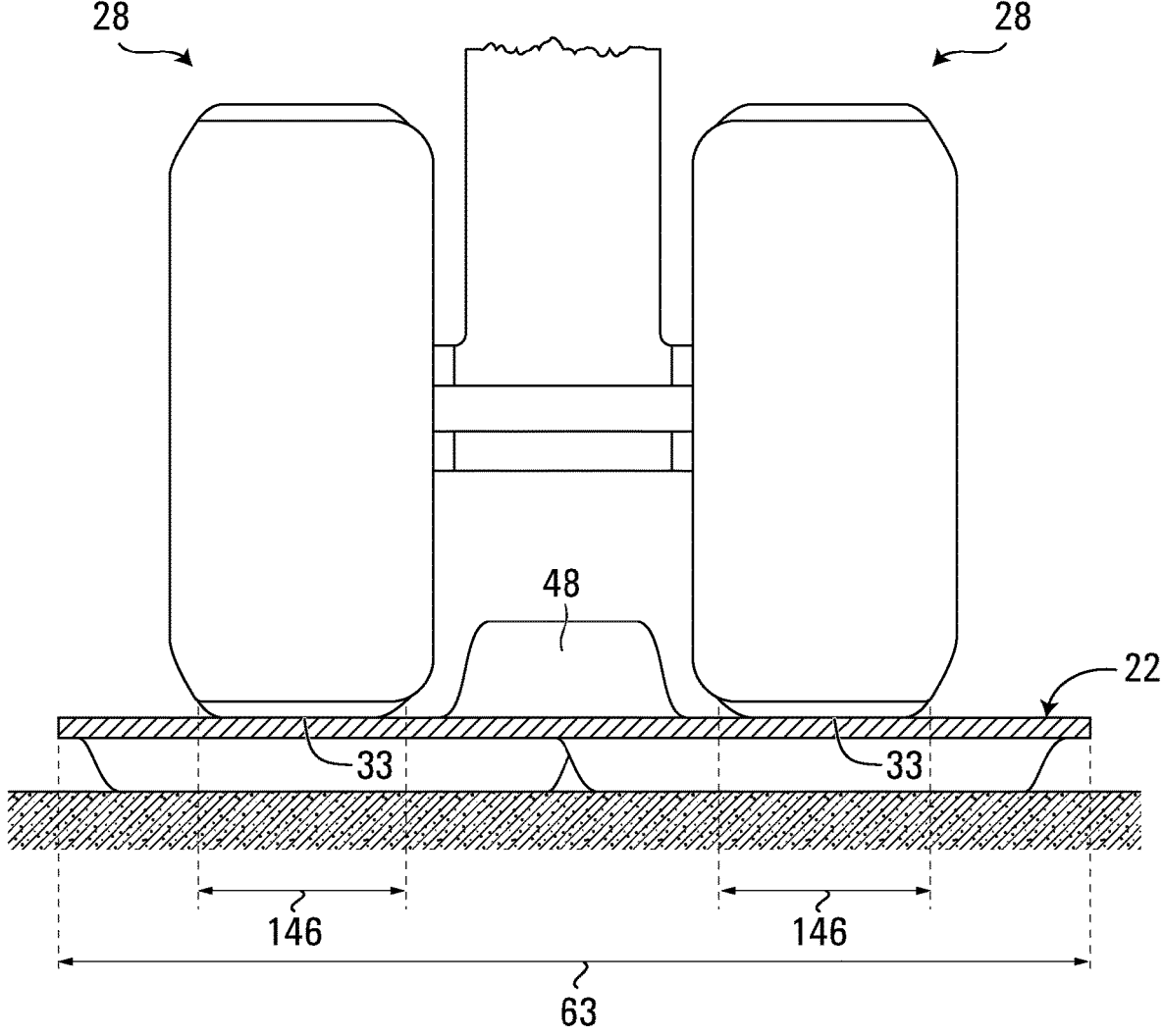
FIG. 10 shows mid-rollers of the track-engaging assembly engaging an inner side the track.

The front idler, rear idler, and roller wheels 23, 26, 28 are not driven by power supplied by the prime mover 14, but are rather used to do at least one of supporting part of the weight of the agricultural vehicle 10 on the ground via the track 22, guiding the track 22 as it is driven by the drive wheel 24, and tensioning the track 22. More particularly, in this embodiment, the front and rear idler wheels 23, 26 maintain the track 22 in tension and help to support part of the weight of the agricultural vehicle 10 on the ground via the track 22. As shown in FIG. 10, the roller wheels 28 roll on a rolling path 33 of the inner side 45 of the track 22 along the bottom run 66 of the track 22 to apply the bottom run 66 on the ground.

In this case, as they are located between frontmost and rearmost ones of the wheels of the track system 16, the roller wheels 28 can be referred to as "mid-rollers".

In this embodiment, each of the front idler, rear idler, and roller wheels 23, 26, 28 may engage a significant extent of the width W of the track 22. For example, in some embodiments, a ratio of a width of a given one of the front idler, rear idler, and roller wheels 23, 26, 28 over the width W of the track 22 may be at least 0.2, in some cases at least 0.3, in some cases at least 0.4, and in some cases even more.

In this example of implementation, the track system 16 comprises a suspension 74 for improving ride quality on the ground and/or absorbing shocks experienced by the track system 16. The suspension 74 comprises one or more movable joints 76 allowing parts of the track system 16, such as respective ones of the wheels 23, 26, 28 and/or portions of the frame 13, to move relative to one another to accommodate uneven terrain or other objects on the ground.

For example, in some embodiments, a movable joint 76 may comprise a pivot 75 allowing respective ones of the wheels 23, 26, 28 and/or portions of the frame 13 to pivot relative to one another. For instance, in some embodiments, two or more of the wheels 23, 26, 28 may be part of a bogie 78 (e.g., a "tandem") that includes a wheel-carrying member 79 which carries these wheels and is pivotable relative to another member of the frame 13.

Figure 11:
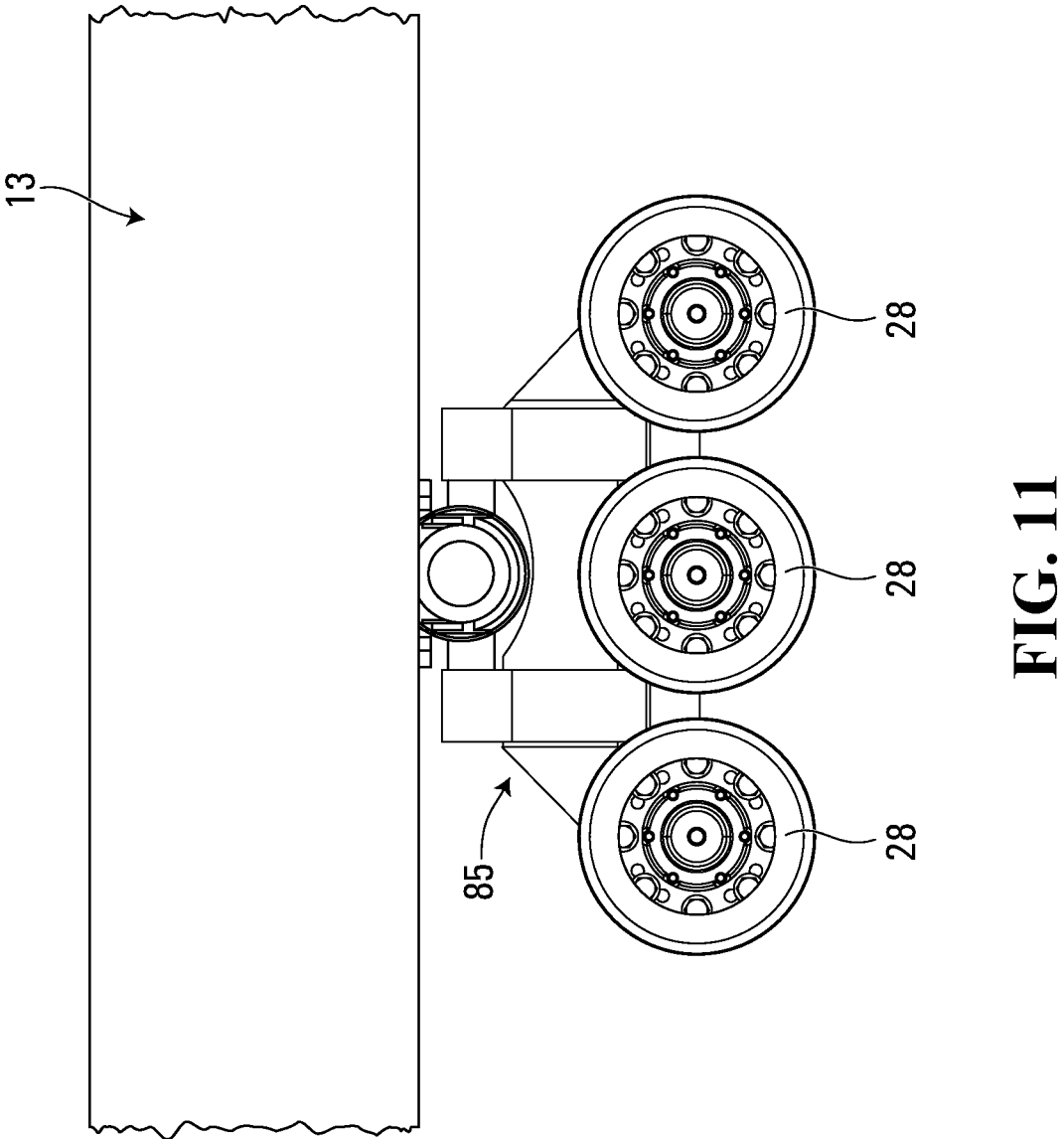
FIGS. 11 to 13 show a bogie of the track system supporting the mid-rollers.
Figure 12:
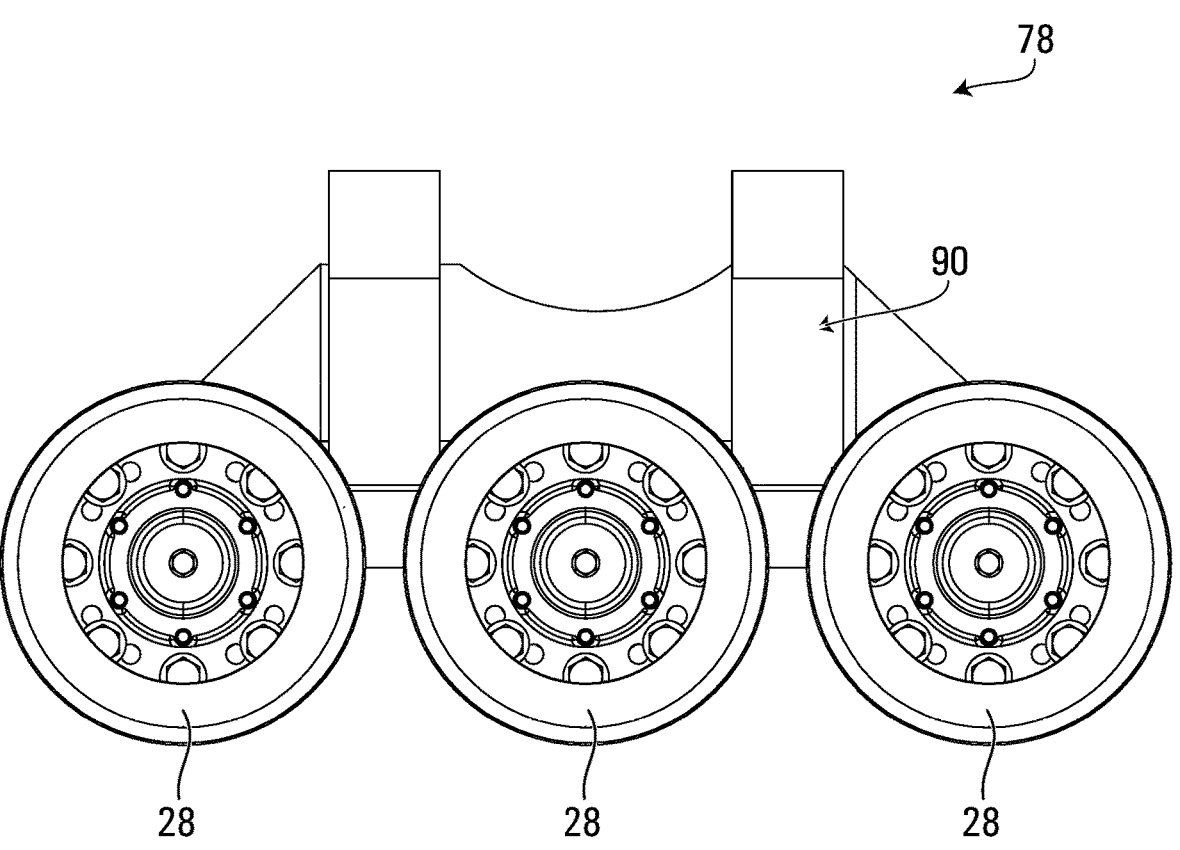
Figure 13:
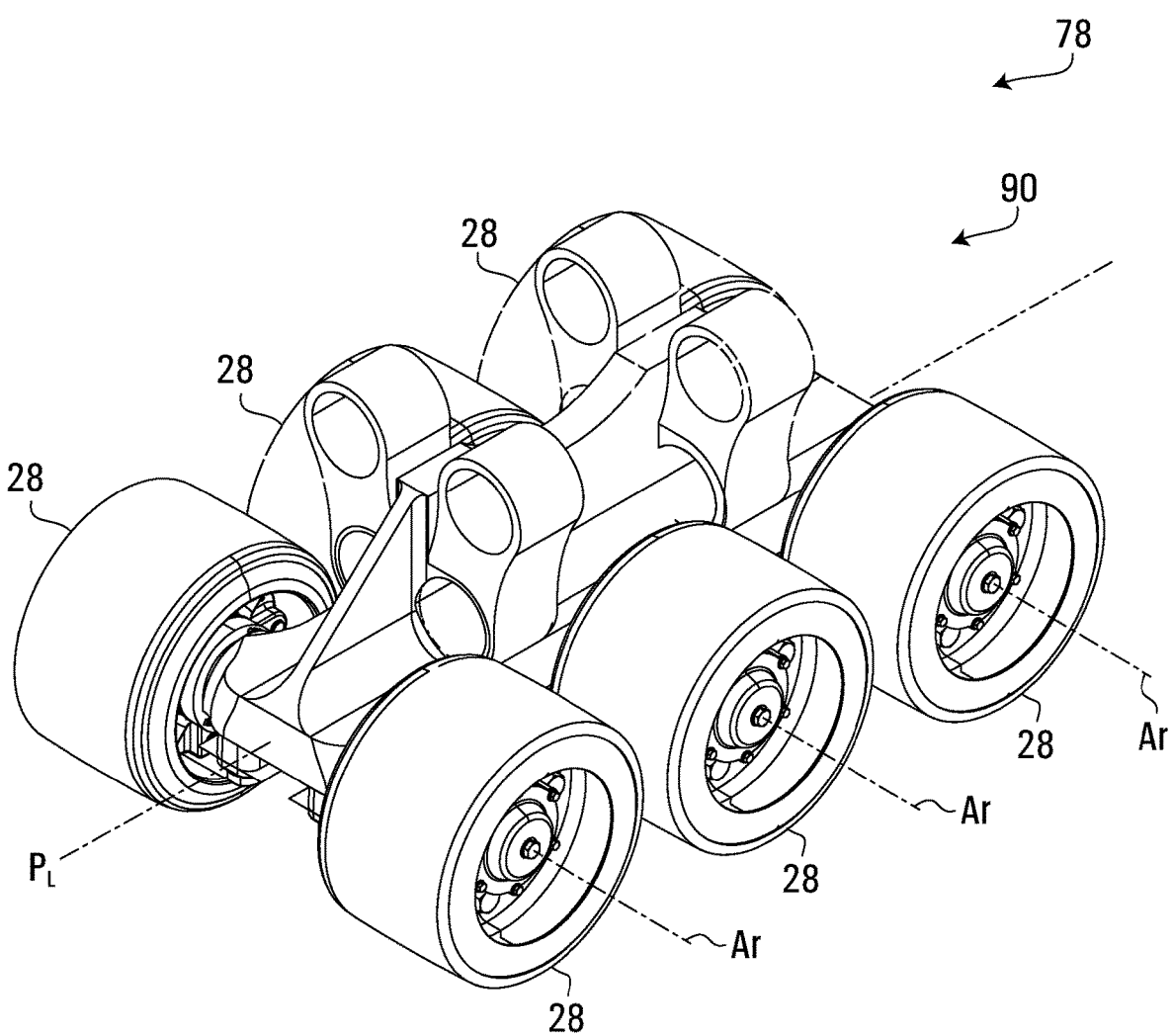
Figure 14:
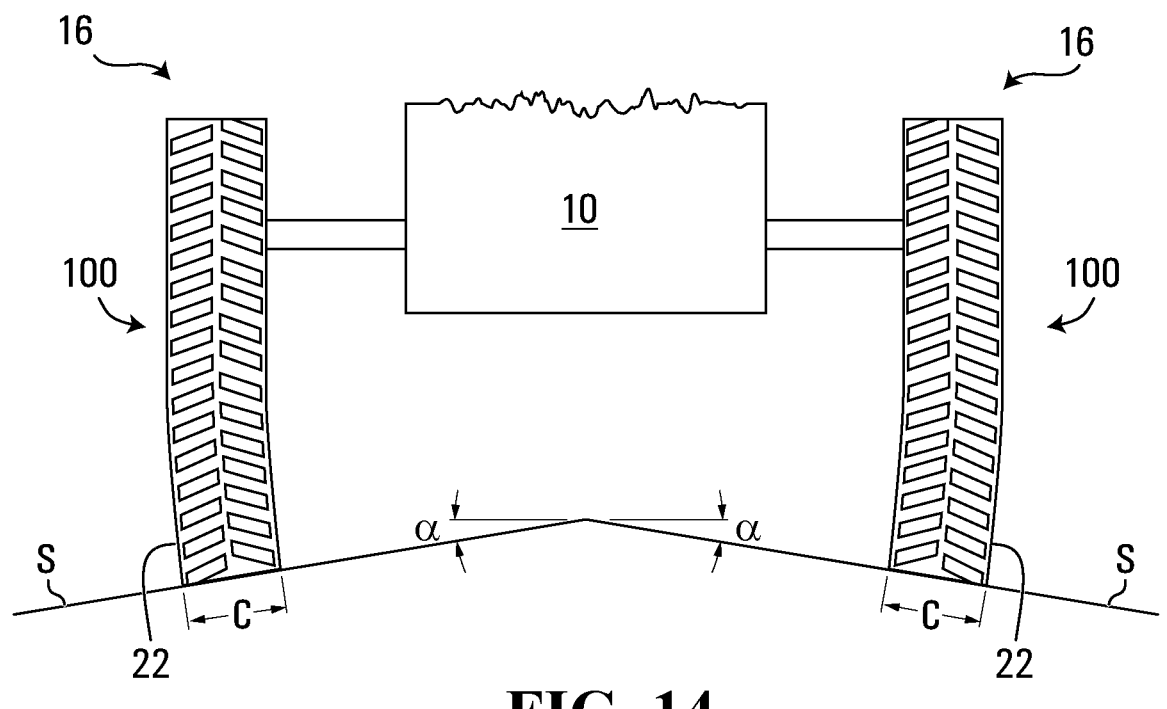
FIGS. 14 to 17 show behaviors of the track system and the mid-rollers on inclined ground.
Figure 15:
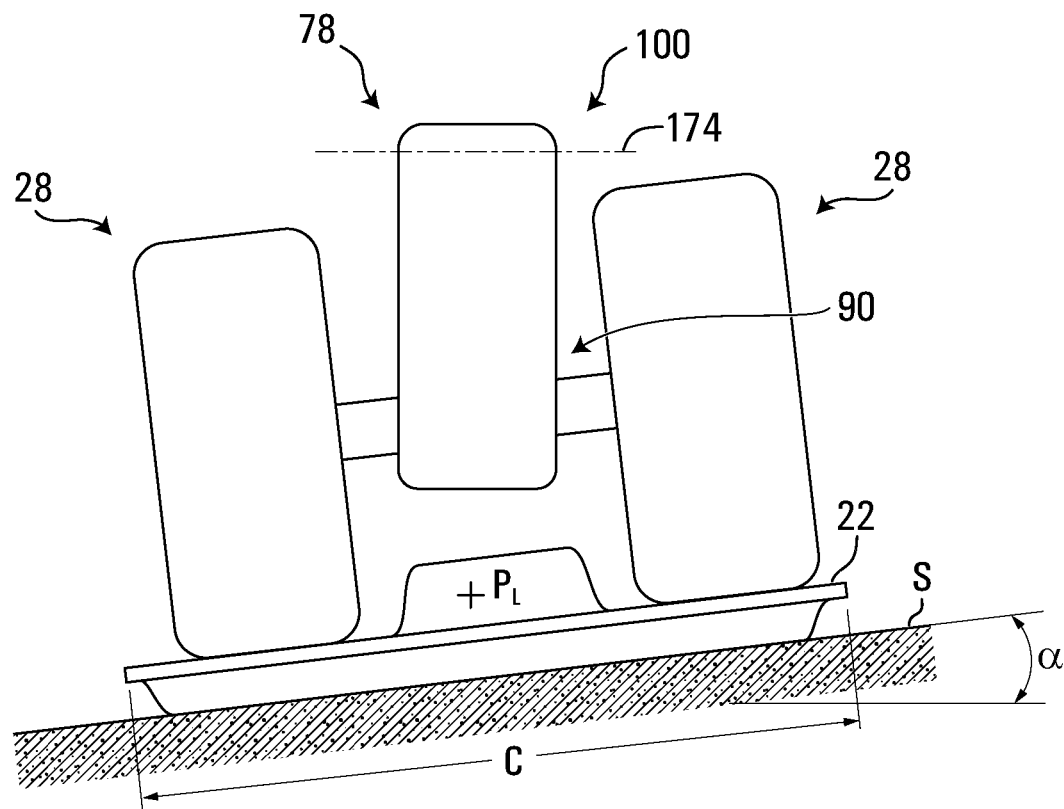
Figure 16:
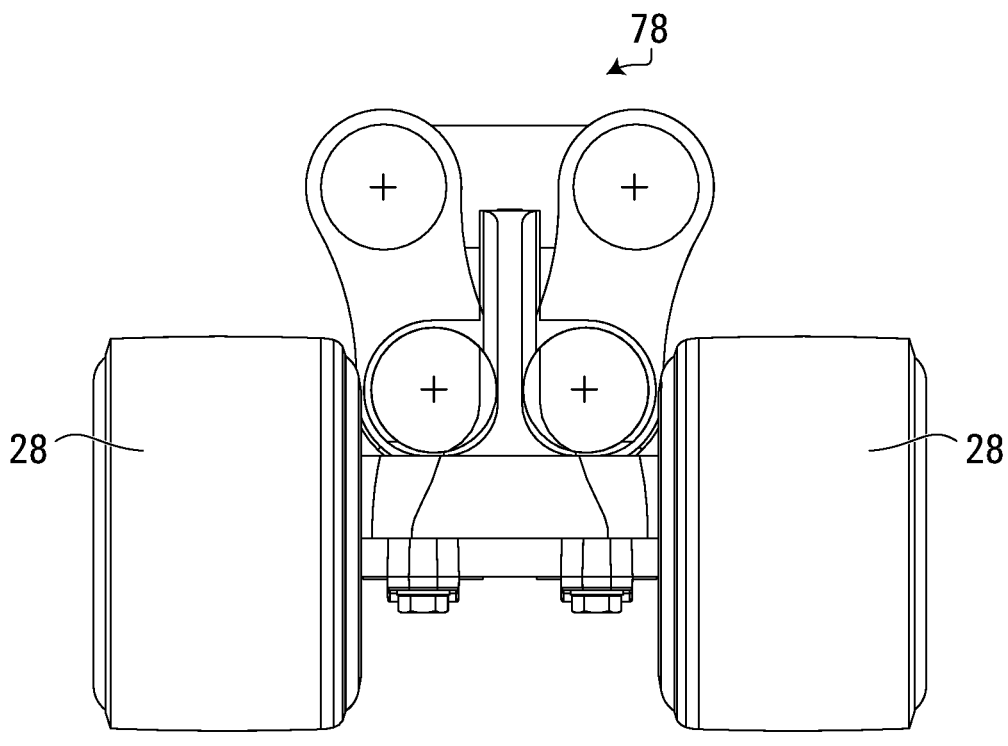
Figure 17:
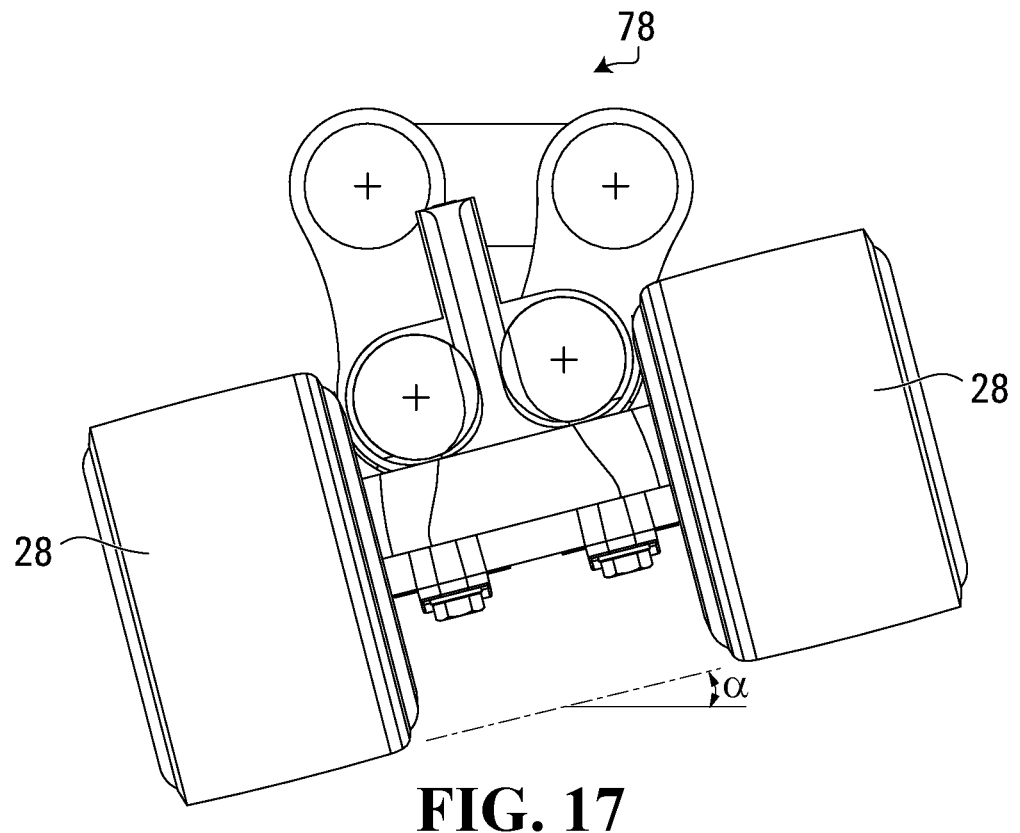

For example, in this embodiment, as shown in FIGS. 11 to 13, the bogie 78 is a wheel-carrying subassembly configured to carry and support respective ones of the mid-rollers 28 and is mounted to the frame 13 of the track system 16. The mid-rollers 28 may not be mounted to a bogie in other embodiments. For example, the mid-rollers 28 may be mounted directly to the frame 13 of the track system 16 in other embodiments.

In some embodiments, as shown in FIGS. 14 to 17, laterally-oscillating ones of the wheels 23, 26, 28 may be configured to laterally oscillate (e.g., pivot) about an oscillation (e.g., pivot) axis $P_L$ transverse to axes of rotation $A_R$ of these wheels (e.g., transverse to the widthwise direction of the track system 16) when the track system 16 moves on an uneven ground area. For example, in some embodiments, the oscillation axis $P_L$ may generally parallel to the longitudinal direction of the track system 16, so can be viewed as a "roll" axis for the laterally-oscillating ones of the wheels 23, 26, 28.

For instance, in this embodiment, the track-engaging assembly 21 of the track system 16, including its bogie 78, is configured such that given ones of the mid-rollers 28 are pivotable about the oscillation axis $P_L$ transverse to the axes of rotation $A_R$ of the given ones of the roller wheels 28 when the track system 16 moves on an uneven ground area. More particularly, in this embodiment, the oscillation axis $P_L$ is substantially parallel to the longitudinal direction of the track system 16, such that the given ones of the mid-rollers 28 may be viewed as having a lateral oscillation or "roll" capability that allows them to laterally oscillate or "roll" relative to the oscillation axis $P_L$.

Alternatively or additionally, in some embodiments, a movable joint 76 may include a resilient element 77 resiliently deformable to allow movement of respective ones of the wheels 23, 26, 28 and/or portions of the frame 13 to pivot relative to one another. The resilient element 77 may be a coil spring (e.g., a metallic or polymeric coil spring), a leaf spring, an elastomeric member (e.g., a rubber spring such as a single or double convolution rubber spring), a gas spring (i.e., gas contained in a cylinder and variably compressed by a piston), a damper, or any other elastic object that deforms under stress and recovers its original configuration when the stress is released.

Figure 18:
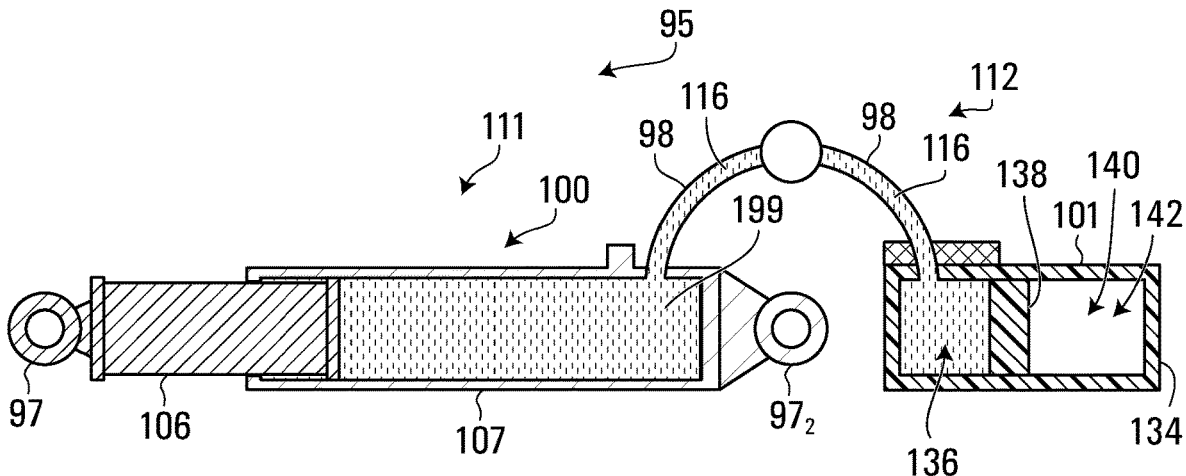
FIG. 18 shows a tensioner of the track-engaging assembly comprising a vibration controller.

In this embodiment, the track system 16 comprises a tensioner 95 configured to control a tension of the track 22. For instance, in this embodiment, the tensioner 95 comprises an actuator mounted at one end to the frame 13 of the track system 16 and at another end to a hub of the front idler wheels 23. This allows the tensioner 95 to modify a distance between the front idler wheels 23 and the rear idler wheels 26 in the longitudinal direction of the track system 16, thereby affecting the tension of the track 22. More specifically, in this embodiment, the tensioner 95 is a hydraulic tensioner. For example, with additional reference to FIG. 18, in this embodiment, the tensioner 95 comprises a first tensioning member 111 and a second tensioning member 112.

More specifically, in this embodiment, the first tensioning member 111 includes a hydraulic cylinder 100 which may comprise a plurality of hydraulic cylinder elements 106, 107. A first anchor $97_1$ of the tensioner 95 may be affixed to (e.g., by using a mechanical fastener, an adhesive, by being mechanically interlocked, etc.) or integral with (i.e., manufactured integrally with) the cylinder member 106, while a second anchor $97_2$ may be affixed to (e.g., by using a mechanical fastener, an adhesive, by being mechanically interlocked, etc.) or integral with (i.e., manufactured integrally with) the cylinder member 107.

In this embodiment, the hydraulic cylinder elements 106, 107 are moveable relative to one another to allow the tensioner 95 to retract and/or expand. Specifically, the hydraulic cylinder elements 106, 107 may be coaxial.

In this embodiment, the hydraulic cylinder element 107 is a bore and the hydraulic cylinder element 106 is a piston moveable within its bore 107.

In this embodiment, the second tensioning member 112 comprises a hydraulic accumulator 101, which is configured to accumulate hydraulic fluid of the hydraulic cylinder 100 in an accumulation chamber 136, and which may be fluid communication with the hydraulic cylinder 100 via a channel 98. More specifically, in this embodiment, the hydraulic accumulator 101 further comprises a housing 134 comprising the accumulation chamber 136, a piston 138 moveable relative to a housing 134 and a compressible chamber 140 formed by the housing 134 and the piston 138 and which may comprise a biasing element 142 (e.g., a spring or compressible fluid) to exert a force against the piston 138. In this embodiment, the biasing element 142 is compressible fluid, which in this example is a gas (e.g., nitrogen). The housing 134 and the piston 138 may create an hermetic joint which allows the compressible chamber 140 to hermetically contain the nitrogen at a relatively high pressure such that the nitrogen exerts a force on the piston 138 that is transferred to the hydraulic cylinder 100 via the fluid flowing in the channel 98.

The tensioner 95 may be configured to apply a tension on the track 22 at any suitable nominal tension value. For instance, in some embodiments, the vibration controller 82 may be configured to apply a nominal tension of at least 1500 psi, in some embodiments of at least 2000 psi, in some embodiments of at least 2500 psi, and in some embodiments of even more (e.g., of at least 2900 psi).

Figure 19:
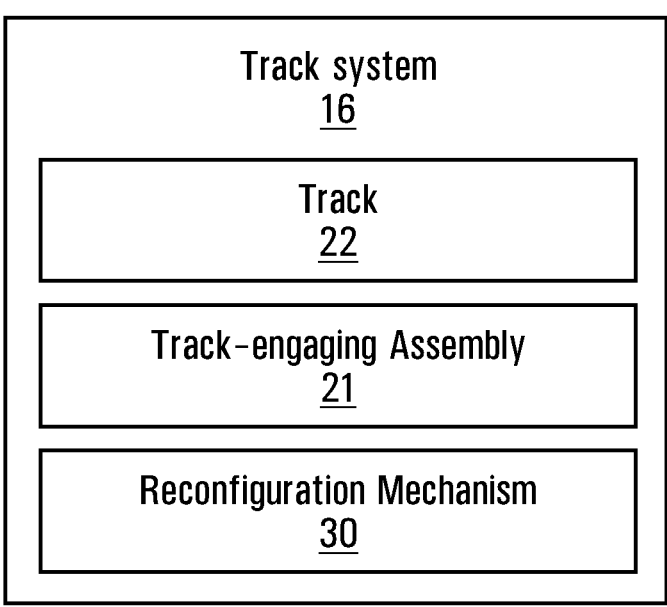
FIG. 19 to 23 are block diagrams of the track system including a reconfiguration mechanism.

In this embodiment, with additional reference to FIG. 19, the track system 16 comprises a reconfiguration mechanism 30 configured to reconfigure the track system 16, i.e., alter a configuration of the track system 16, such as by rearranging or otherwise altering one or more components of the track system 16 (e.g., respective ones of the wheels 23, 24, 26, 28, members of the frame 13, and/or one or more movable joints 76 of the suspension 74, such as by changing their position, movability, etc.) and/or by repositioning the track system 16 relative to the frame 12 of the vehicle 10. This may be useful for various purposes, such as, for instance, to enhance performance of the vehicle 10 (e.g., maximize or otherwise increase traction and/or pulling force (e.g., drawbar pull); improve steerability; etc.), ride quality (e.g., comfort), effects on the ground (e.g., minimize or otherwise reduce soil compaction and/or soil shear stress; provide headland protection; etc.), and/or other aspects of the track system 16 and/or the vehicle 10.

For example, in some embodiments, the reconfiguration mechanism 30 may be configured to reconfigure the track system 16 based on: current use of the vehicle 10 (e.g., a current application for which the vehicle 10 is used, such as tilling, spraying, etc.; whether the vehicle 10 is in the field or roading, etc.); a pulling force exerted by the vehicle 10 (e.g., at its drawbar); motion of the vehicle 10 such as a speed of the vehicle 10 and/or a direction of motion (e.g., turning) of the vehicle 10; a characteristic of the ground (e.g., a compliance such as a hardness or softness of the ground, a condition of soil, whether the ground is a field or a road, etc.); and/or various other parameters.

In some cases, the reconfiguration mechanism 30 may be configured to reconfigure the track system 16 while the vehicle 10 is stationary (e.g., before the vehicle 10 starts working in the field, goes on the road, or otherwise while the vehicle 10 is paused or idle).

In other cases, the reconfiguration mechanism 30 may be configured to reconfigure the track system 16 while the vehicle 10 is moving on the ground (e.g., travelling in the field and/or roading).

In some embodiments, the reconfiguration mechanism 30 may be configured to reconfigure the track-engaging assembly 21 of the track system 16, i.e., alter a configuration of the track-engaging assembly 21, such as by rearranging or otherwise altering one or more components of the track-engaging assembly 21 (e.g., respective ones of the wheels 23, 24, 26, 28, members of the frame 13, and/or one or more movable joints 76 of the suspension 74, such as by changing their position, movability, etc.).

For example, in some embodiments, the reconfiguration mechanism 30 may be configured to vary a geometry of the track-engaging assembly 21. For instance, in some cases, the reconfiguration mechanism 30 may reposition respective ones of the wheels 23, 24, 26, 28, members of the frame 13, and/or one or more movable joints 76 of the suspension 74 to vary the geometry of the track-engaging assembly 21. In some embodiments, this may vary a shape of the track 22 around the track-engaging assembly 21 (e.g., reduce or increase the contact patch 63 of the track 22 with the ground; increase or reduce an angle of attack of a leading segment of the track 22, etc.). The reconfiguration mechanism 30 may be configured to vary the geometry of the track-engaging assembly 21 while maintaining a perimeter length of the track system 16 defined by the length of the track 22 (e.g., in order to maintain the tension of the track 22).

Figure 20:
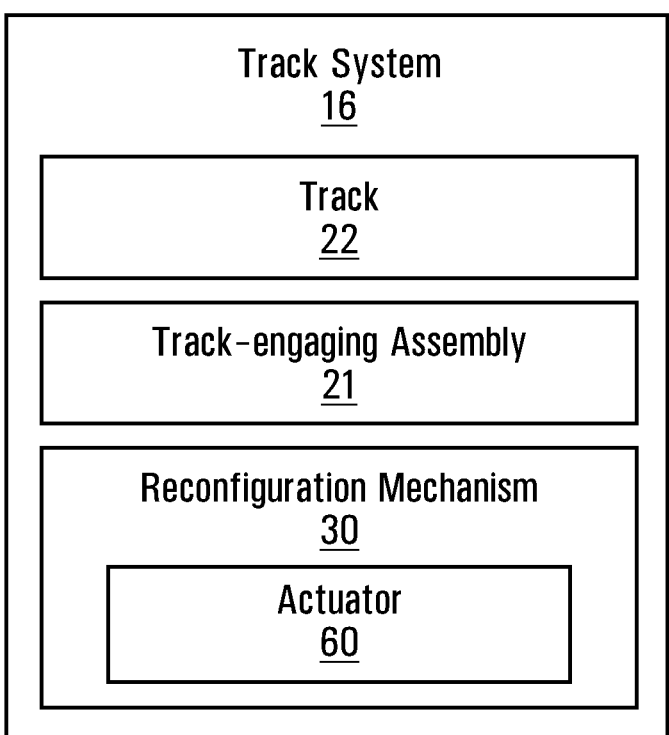
Figure 21:
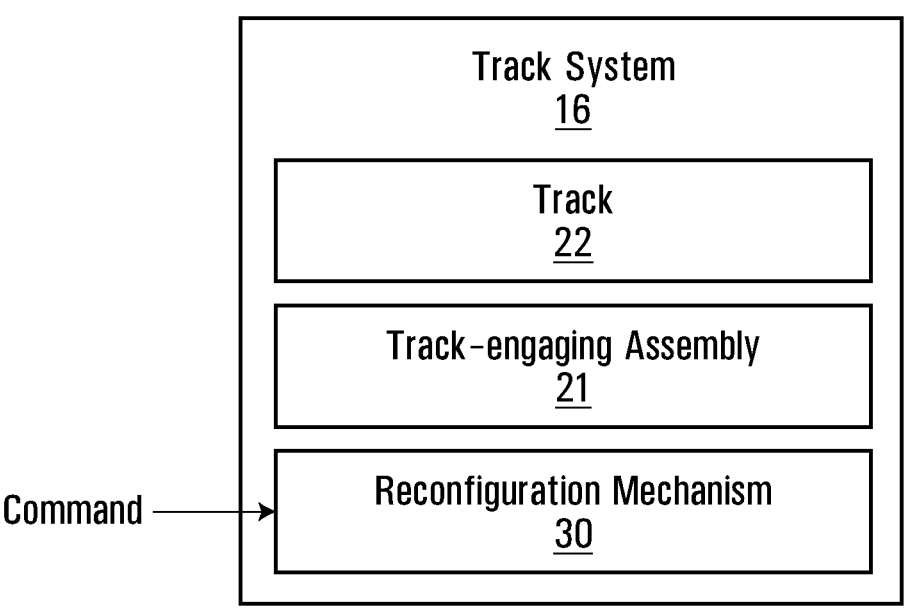

In some embodiments, as shown in FIGS. 20 and 21, the reconfiguration mechanism 30 may comprise an actuation apparatus 69 including one or more actuators 60 configured to alter the configuration of the track system 16. For example, in various embodiments, the actuation apparatus 69 may be configured to affect movement, i.e., move and/or enable, disable or restrict movement, of a given portion 62 of the track-engaging assembly 21 relative to an adjacent portion 64 of the track-engaging assembly 21.

The one or more actuators 60 of the reconfiguration mechanism 30 may be implemented in any suitable way. For instance, in some embodiments, an actuator 60 may comprise a fluidic element (e.g., a hydraulic or pneumatic element, such as a hydraulic or pneumatic cylinder), an electromechanical element, etc, and in some embodiments, the actuators 60 may be purely mechanical. In some examples, actuators 60 may be spaced apart from one another to act upon different parts of the track system 16 and/or may be actuatable independently from one another.

In some embodiments, the reconfiguration mechanism 30 may be configured to reconfigure the track system 16 in response to a command. For instance, in some embodiments, this command, which may be referred to as a "reconfiguration command", may be applied to the one or more actuators 60 of the reconfiguration mechanism 30 to control the one or more actuators 60. The reconfiguration command may be implemented in various ways in various embodiments.

Figure 22:
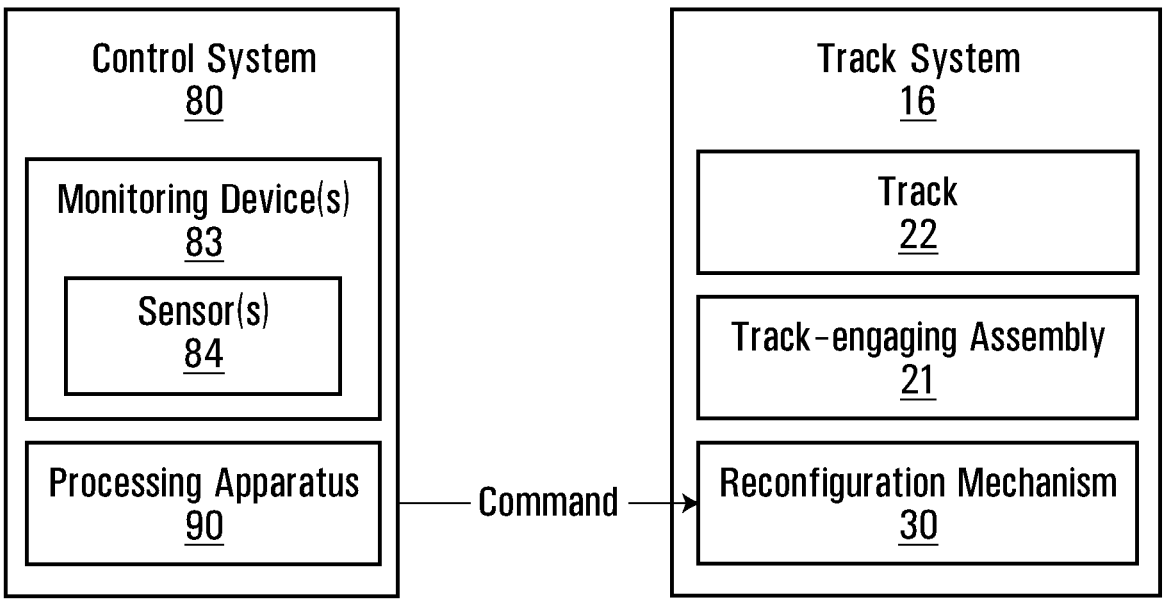
Figure 23:
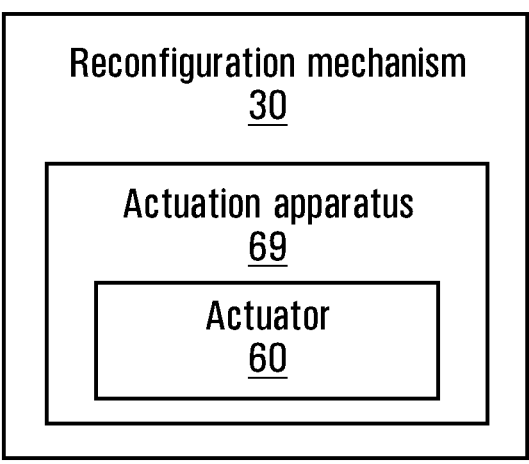

For example, in some embodiments, as shown in FIGS. 22 and 23, the reconfiguration command may be generated (e.g., automatically) by a control system 80 of the vehicle 10. The control system 80 may generate the reconfiguration command based on various information. For instance, in some embodiments, this may include:

information regarding a state of the vehicle 10, such as, for example: the speed of the vehicle 10; the acceleration of the vehicle 10, the direction of motion of the vehicle 10; a parameter of the steering mechanism 17 (e.g., a steering angle of the track system 16); a parameter of the powertrain 15 of the vehicle 10 (e.g., a speed of the prime mover 12, a ratio of the transmission, etc.); a load distribution on the vehicle 10 (e.g., loads on respective ones of the track systems 16); and/or any other parameter that pertains to the state of the vehicle 10;

information regarding an environment of the vehicle 10, such as, for example: a profile (e.g., a slope or steepness or levelness) of the ground; the compliance (e.g., softness or hardness) of the ground; and/or any other parameter that pertains to the environment of the vehicle;

information regarding a state of the track system 16, such as, for example: a speed of the track 22 around the track-engaging assembly 21; a direction of motion of the track 22 around the track-engaging assembly 21; an orientation of the track system 16; (e.g., its steering angle 8 and/or its angle of attack); loading on the track system 16; the tension of the track 22; a physical characteristic (e.g., a temperature, etc.) of the track 22; and/or any other parameter that pertains to the state of the track system 16; and/or any other information that may be relevant.

In some embodiments, the control system 80 may comprise monitoring devices 83, such as sensors 84 and/or other monitoring devices (e.g., cameras), for sensing and/or otherwise monitoring parameters of the vehicle 10 and/or its environment (e.g., the ground) and a processing apparatus 90 to generate the reconfiguration command based on output of the monitoring devices 83. For example, in some embodiments, the parameters of the vehicle 10 and/or its environment that can be sensed by the monitoring devices 83 may include:

the speed of the vehicle 10;

the acceleration of the vehicle 10;

the direction of motion of the vehicle 10;

a parameter of the steering mechanism 17 (e.g., a steering angle of the track system 16);

a parameter of the powertrain 15 of the vehicle 10 (e.g., a speed of the prime mover 12, a ratio of the transmission, etc.);

a load distribution on the vehicle 10 (e.g., loads on respective ones of the track systems 16);

the speed of the prime mover 12;

the suspension travel and/or stroke position of a suspension of the vehicle 10;

the loading on the track system 16;

the profile (e.g., the slope or steepness or the levelness) of the ground beneath the track system 16;

the compliance (e.g., softness or hardness) of the ground beneath the track system 16;

the type (e.g., a road or a field) of the of the ground beneath the track system 16;

the speed of motion of the track 22 around the track-engaging assembly 21;

the direction of motion of the track 22 around the track-engaging assembly 21;

the orientation of the track system 16; (e.g., its steering angle 8 and/or its angle of attack a relative to the pivot axis 51);

the loading on the track system 16;

a physical characteristic (e.g., a temperature, etc.) of the track 22 of the track system 16;

the tension of the track 22;

etc.

Figure 26:
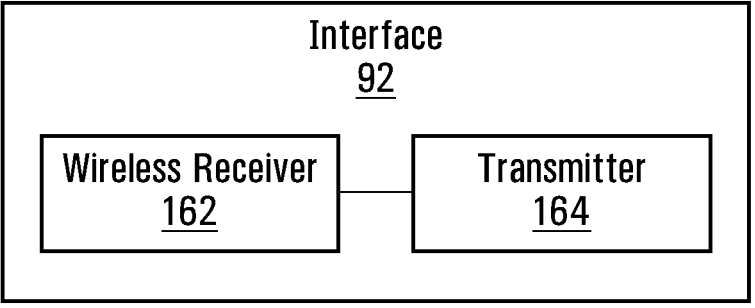
FIG. 26 is a block diagram of an interface of the processing apparatus.

Each sensor 84 may be configured to sense a parameter of the vehicle 10 and issue a signal indicative of that parameter. To that end, with additional reference to FIG. 26, the sensor 84 may comprise a sensing element 86 configured to sense the parameter of the vehicle 10 to be sensed. For example, in some embodiments, the sensor 84 may comprise the sensing element 86 to sense:

the speed of the vehicle 10, e.g., the sensing element 86 may comprise a speedometer of the vehicle 10;

the acceleration of the vehicle 10, e.g., the sensing element 86 may comprise an accelerometer;

the direction of motion of the vehicle 10, e.g., the sensing element 86 may comprise a gyroscope;

the steering angle 8 of the track system 16 about the steering axis 19, e.g., the sensing element 86 may comprise part of a steering angle sensor (e.g. potentiometer or linear ruler on a part of the steering mechanism 18);

the angle of attack a of the track system 16 relative to the pivot axis 51, e.g., the sensing element 86 may comprise a gyroscope;

the speed of the prime mover 12, e.g., the sensing element 86 may comprise part of a primer mover speed sensor (e.g., engine speed sensor);

the suspension travel and/or stroke position of the suspension 24, e.g., the sensing element 86 may comprise any suitable linear transducers (e.g. one or more linear ruler, one or more linear encoder) and/or any suitable proximity sensors (e.g. one or more proximity switch) and/or any suitable photoelectric sensors (e.g. one or more photocell, one or more laser/light transmitter/receiver);

the loading on the track system 16, e.g., the sensing element 86 may comprise one or more load cell (e.g. tension and/or compression load cell) or one or more strain gage;

the profile (e.g., the slope or steepness or the levelness) of the ground beneath the track system 16, e.g., the sensing element 86 may comprise a gyroscope;

the compliance (e.g., softness or hardness) of the ground beneath the track system 16, e.g., the sensing element 86 may comprise part of a laser sensor or an ultrasound sensor;

the speed of motion of the track 22 around the track-engaging assembly 17, e.g., the sensing element 86 may comprise a tachometer (e.g., a wheel speed sensor) configured to sense a rotational speed of the drive wheel 24;

the temperature or another physical characteristic of the track 22 of the track system 16, e.g., the sensing element 86 may comprise a temperature sensor or another sensor for sensing that physical characteristic;

the tension of the track 22;

etc.

In this embodiment, the sensor 84 is configured to communicate the signal indicative of the parameter it senses to the processing apparatus 90 via a communication link 254. To that end, the sensor 84 comprises a transmitter 87 for transmitting the signal indicative of the parameter it senses to the processing apparatus 90, which comprises a receiver 162 to receive the signal from the sensor 84. The transmitter 87 of the sensor 84, and the receiver 162 of the processing apparatus 90 may establish the link 254 between one another in any suitable way.

In some embodiments, the link 254 may be a wireless link such that the sensor 84 and the processing apparatus 90 are connected wirelessly. Thus, in such embodiments, the transmitter 87 of the sensor 84 is a wireless transmitter that can wirelessly transmit the signal from the sensor 84 and the receiver 162 of the processing apparatus 90 is a wireless receiver that can wirelessly receive the signal.

For example, the transmitter 87 and the receiver 162 may implement radio-frequency identification (RFID) technology. In such an example, the transmitter 87 may be an RFID tag while the receiver 162 may be an RFID reader (e.g., active, passive or battery-assisted passive (BAP) RFID technology). Any other wireless communication technology may be used in other examples (e.g., WiFi, dedicated short-range communication (DSRC), etc.). In other embodiments, the link 254 may be a wired link such that the sensor 84 and the processing apparatus 90 are connected by a wire.

The signal indicative of the parameter of the vehicle 10 sensed by the sensor 84 may be issued by the sensor 84 in any suitable manner. In some embodiments, the sensor 84 is configured to issue the signal autonomously. For instance, the transmitter 87 of the sensor 84 may issue the signal repeatedly (e.g., periodically or at some other predetermined instants). In other embodiments, the processing apparatus 90 may be configured to issue an interrogation signal directed to the sensor 84, which is configured to issue the signal indicative of the parameter of the vehicle 10 that it senses to the processing apparatus 90 in response to the interrogation signal. In such embodiments, the processing apparatus 90 may comprise a transmitter 164 to transmit the interrogation signal to the sensor 84, which comprises a receiver 88 to receive the interrogation signal.

The sensors 84 may be located at various locations on the vehicle 10 in various embodiments.

For instance, in some embodiments, one or more of the sensors 84 may be part of the track system 16. For example, in some embodiments, one or more of the sensors 84, may be part of the track 22. For instance, in some embodiments, one or more of the sensors 84, may be embedded in the elastomeric material of the track 22. As an example, in some embodiments, one or more of the sensors 84, may be arranged as discussed in International Application Publication WO/2017/000068, which is hereby incorporated by reference herein. As another example, in some embodiments, one or more of the sensors 84 may be part of the track-engaging assembly 21. For instance, in some embodiments, one or more of the sensors 84, may be affixed to a given one of the wheels 23, 24, 26, 28 and/or to the frame 13 of the track system 16. As another example, in some embodiments, one or more of the sensors 84 may be part of the reconfiguration mechanism 30 of the track system 16. As another example, in some embodiments, one or more of the sensors 84 may be located outside from the track systems 16. For instance, in some embodiments, one or more of the sensors 84 may be located in the powertrain 15 of the vehicle 10 and/or in the prime mover 12 of the vehicle 10 and/or on the frame 12 of the vehicle 10 and/or in the steering mechanism 17 of the vehicle and/or etc.

The processing apparatus 90 is configured to generate the reconfiguration command based on information derived from the monitoring devices 83 and possibly other information (e.g., provided by the operator, via the user interface 70). For instance, in some embodiments, the processing apparatus 90 may issue the reconfiguration command as a signal directed to the actuation apparatus 69 of the reconfiguration mechanism 30 to control the one or more actuators 60.

Figure 24:
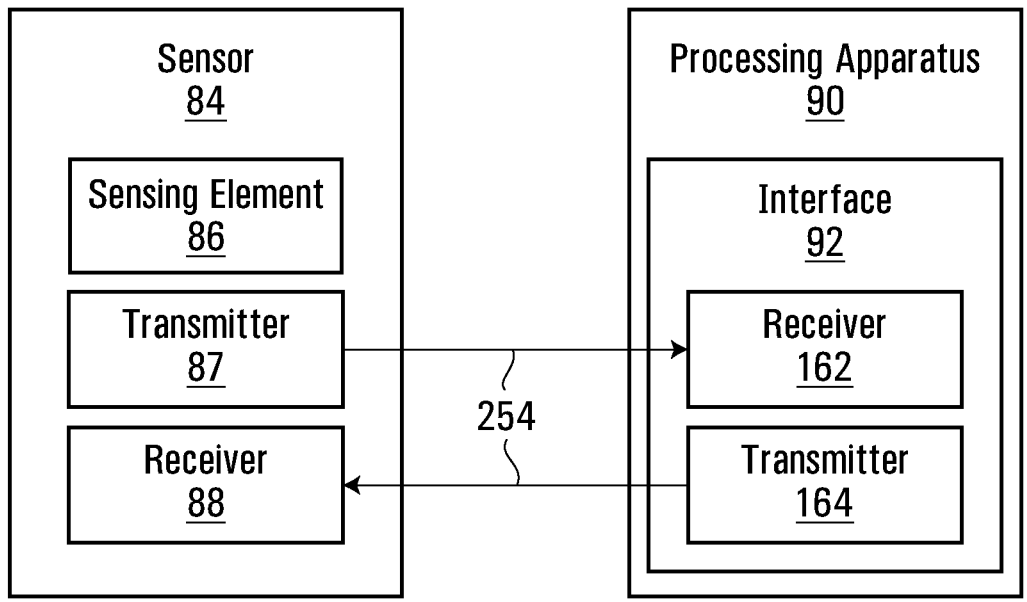
FIG. 24 is a block diagram of processing apparatus in relationship with a sensor.
Figure 25:
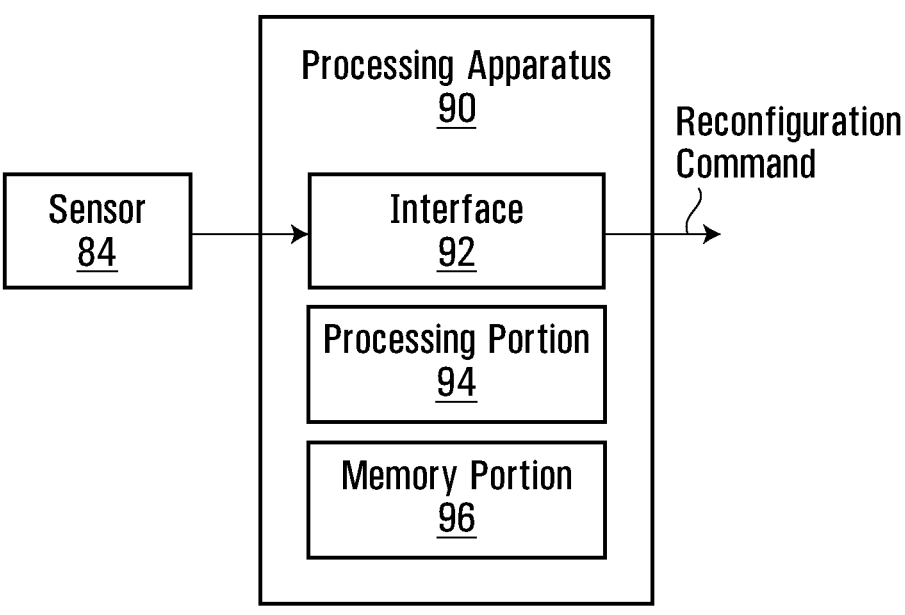
FIG. 25 is a block diagram of the reconfiguration mechanism.

In this embodiment, as shown in FIG. 24, the processing apparatus 90 comprises an interface 92, a processing portion 94, and a memory portion 96, which are implemented by suitable hardware and/or software.

The interface 92 may comprise one or more inputs and outputs allowing the processing apparatus 90 to receive input signals from and send output signals to other components to which the processing apparatus 90 is connected (i.e., directly or indirectly connected). For example, in this embodiment, an input of the interface 92 is implemented by the receiver 162 to receive the signal from the sensor 84. An output of the interface 92 is implemented by a transmitter 164 to transmit the reconfiguration command to the actuator 60. In some embodiments, another output of the interface 92 is implemented by the transmitter 164 to transmit the interrogation signal to the sensor 84 if applicable.

The processing portion 94 may comprise one or more processors for performing processing operations that implement functionality of the processing apparatus 90. A processor of the processing portion 94 may be a general-purpose processor executing program code stored in the memory portion 96. Alternatively, a processor of the processing portion 94 may be a specific-purpose processor comprising one or more preprogrammed hardware or firmware elements (e.g., application-specific integrated circuits (ASICs), electrically erasable programmable read-only memories (EEPROMs), etc.) or other related elements.

The memory portion 96 may comprise one or more memories for storing program code executed by the processing portion 94 and/or data used during operation of the processing portion 94. A memory of the memory portion 96 may be a semiconductor medium (including, e.g., a solid-state memory), a magnetic storage medium, an optical storage medium, and/or any other suitable type of memory. A memory of the memory portion 96 may be read-only memory (ROM) and/or random-access memory (RAM), for example.

In some embodiments, the processing apparatus 90 may determine the reconfiguration command based on information contained in the memory portion 96. For instance, the memory portion 96 may contain information associating different values of a parameter relating to the vehicle 10, to the track system 16 and/or to an environment of the vehicle 10, with different values of a given parameter to be controlled in respect of the reconfiguration mechanism 30.

For example, in some embodiments, the memory portion 96 may associate different values of a given one of the speed of the vehicle 10, the direction of motion of the vehicle 10, the orientation of the track system 16; (e.g., its steering angle 8 and/or its angle of attack a relative to the pivot axis 51), the suspension travel and/or stroke position of the suspension 24, the loading on the track system 16, the profile (e.g., the slope or steepness or the levelness) or the compliance of the ground beneath the track system 16, etc. with a particular value of a parameter (e.g., the length) of the actuator 60 for controlling the reconfiguration mechanism 30.

Thus, the processing apparatus 90 may consult its memory portion 96 in generating the reconfiguration command.

For example, in some embodiments, one or more mode of operations may be preprogrammed, e.g. in the memory portion 96 of the processing apparatus 90, based on information associating different values of a parameter relating to the vehicle 10 with different values of a given parameter to be controlled in respect of the reconfiguration mechanism 30. For instance, one or more preprogrammed mode of operations may be configured such that the operation and/or behavior of the reconfiguration mechanism 30 of the track systems (and/or the vehicle 10) is optimized for running over a given profile or type of ground (e.g. "mud mode", "road mode", "sidehill mode"). As another example, one or more preprogrammed mode of operations may be configured to optimize the ride quality (e.g. "comfort mode"), when the vehicle 10 (and thus the track systems 16) rides over rough terrain (e.g. bumpy road/ground). Other preprogrammed mode of operations may be configured for effecting the operation of the reconfiguration mechanism 30 based on any one or more parameters of the vehicle 10, as discussed above.

Alternatively or additionally, in some embodiments, the processing apparatus 90 may comprise a computing module implementing artificial intelligence (AI) configured to control the reconfiguration mechanism 30. This "AI module" of the processing apparatus 90 may use any suitable implementation of artificial intelligence (sometimes also referred to as machine intelligence or machine learning), such as neural networks (e.g., artificial, convolutional, and/or recurrent neural networks, etc.), heuristics, support vector machines, etc., in software, hardware and/or a combination thereof.

The AI module of the processing apparatus 90 is configured to make determinations about how to reconfigure the track system 16 with the reconfiguration mechanism 30. In some embodiments, a machine-learning algorithm of the AI module of the processing apparatus 90 may be trained to identify reconfigurations of the track system 16 that are to be performed by the reconfiguration mechanism 30 based on events experienced by the vehicle 10 (e.g., using output from the sensors 84 and/or the user interface 70).

For example, in some embodiments, the AI module of the processing apparatus 90 may initially be taught how to identify parameters in a training mode (sometimes referred to as "supervised learning mode"). This may be achieved by analyzing a given set of values, making quantitative comparisons, and cross-referencing conclusions with known results. Iterative refinement of these analyses and comparisons allows an algorithm to achieve greater predictive certainty. This process is continued iteratively until solutions converge or reach a desired accuracy.

The AI module of the processing apparatus 90 may be configured to compare data obtained by the processing apparatus 90, such as from the sensors 84 and/or the user interface 70, under given circumstances of the vehicle 10 to a previously-analyzed collection of known data associated with specified configurations of the track system 16 (e.g., which may be deemed optimal for different circumstances). Based on this comparison, the AI module of the processing apparatus 90 may determine a specific configuration of the track system 16 that is to be implemented and proceed to control the reconfiguration mechanism 30 to reconfigure the track system 16 in order to implement that specific configuration, and in some embodiments, the AI module may record data of a behavior of the vehicle 10 (e.g. indicative of its performance) after the reconfiguration and add this data to the collection of known data.

In some embodiments, two or more elements of the processing apparatus 90 may be implemented by devices that are physically distinct from one another and may be connected to one another via a bus (e.g., one or more electrical conductors or any other suitable bus) or via a communication link which may be wired, wireless, or both. In other embodiments, two or more elements of the processing apparatus 90 may be implemented by a single integrated device.

In other embodiments, the reconfiguration command may be provided by a user, such as the operator of the vehicle 10.

Figure 28:
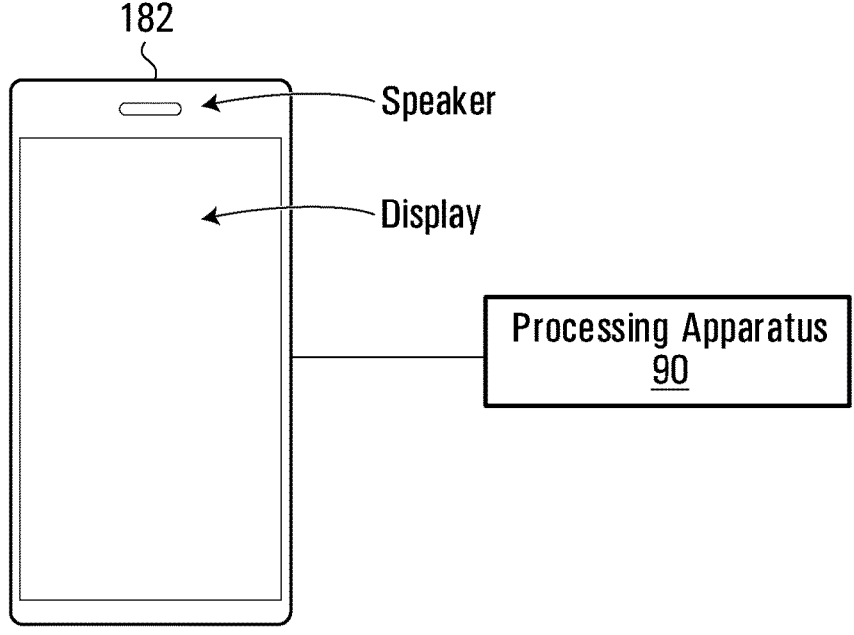
FIGS. 28 to 30 show a communication device in accordance with an embodiment.
Figure 29:
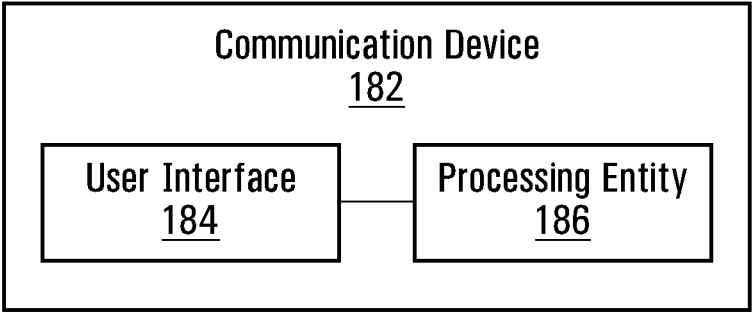
Figure 30:
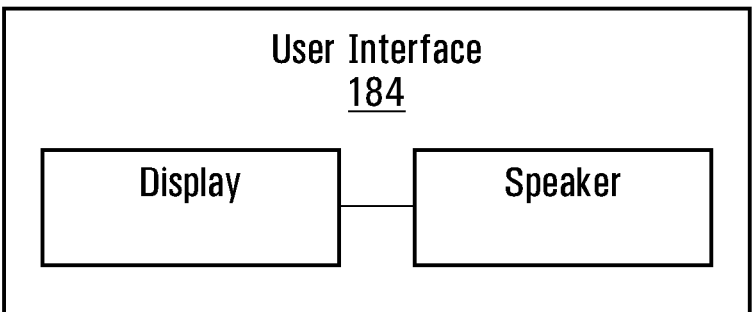

In some embodiments, as shown in FIGS. 28 to 30, the signal issued by the processing apparatus 90 may be directed to a communication device 182 for conveying information to a user of the communication device 182. More specifically, in this example, the communication device 182 may comprise a user interface 184 for interacting with a user and a processing apparatus 186 for processing the signal and generate a suitable user interaction depending on the signal. In this embodiment, the user interface 184 comprises a display for displaying the information to the user and a speaker for alerting the user of a notification or an alert.

Figure 27:
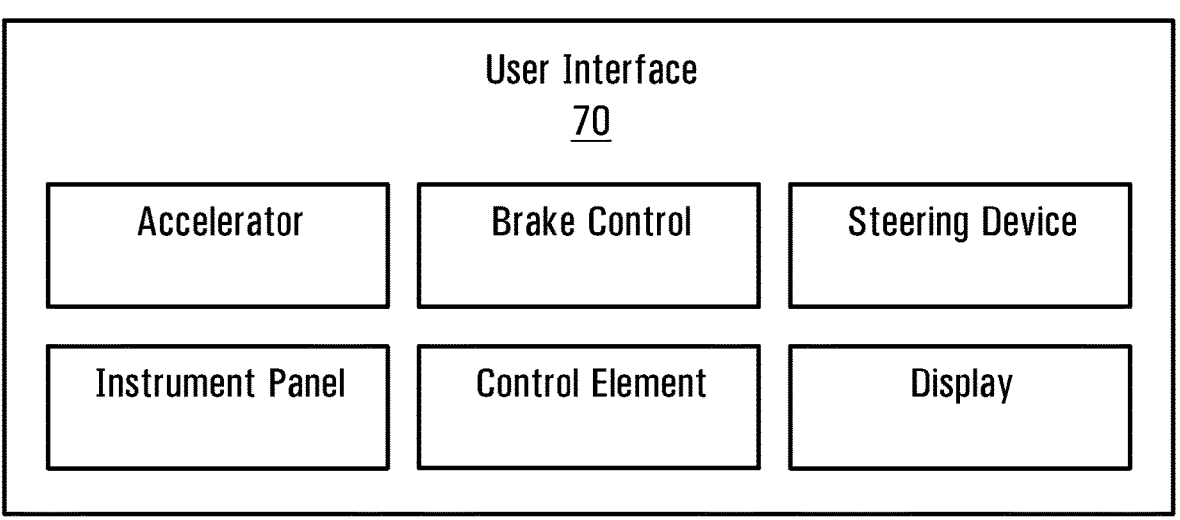
FIG. 27 is a block diagram of a user interface of the agricultural vehicle.

In some embodiments, the communication device 182 including the user interface 184 may be part of the user interface 70 of the operator cabin 20 of the vehicle 10, as shown in FIG. 27, and may also comprise buttons, levers, etc. to facilitate interaction with the user.

In other embodiments, the communication device 182 may be a smartphone or other user device separate from the vehicle 10, as shown in FIG. 28. For example, in some embodiments, the communication device 182 may be a smartphone on which an app has been downloaded so as to interact with the control system 80.

In some embodiments, the reconfiguration mechanism 30 may be configured to reconfigure the track system 16 in response to an external force applied onto the track system 16, without there necessarily being any command like the reconfiguration command (e.g., without any sensor 84 or other monitoring device 83). In that sense, the reconfiguration mechanism 30 may be considered to be "passive".

Figure 31:
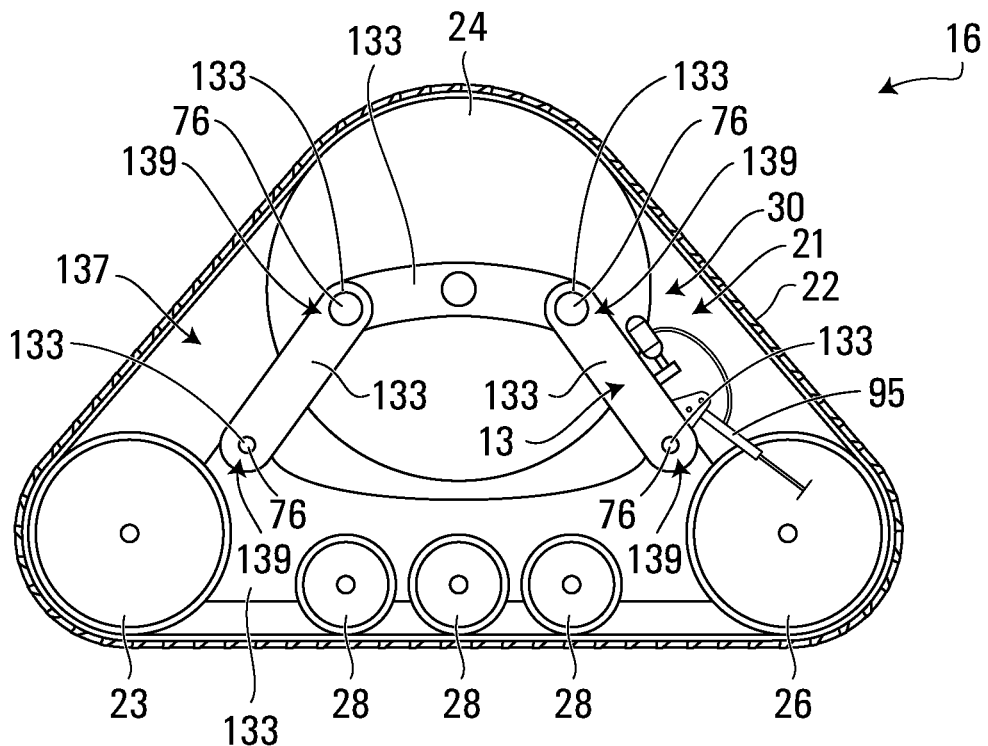
FIGS. 31 to 33 show variants of the track system.

For instance, in some embodiments, as shown in FIGS. 31, the reconfiguration mechanism 30 may comprise frame elements 133 of the frame 13 of the track system 16. In this example, the frame elements 133 of the frame 13 may comprise a four-bar mechanism 137 and springs 139 (e.g., rotational springs) connecting parts of the four-bar mechanism 137 to one another. In this embodiment, when a load applied to the track system 16 varies, the reconfiguration mechanism 30 changes the configuration of the frame 13 of the track system 16.

As another example, in some embodiments, the reconfiguration mechanism 30 may comprise an orifice in the tensioner 95. The orifice may create a dampening effect in the tensioner 95, which may reduce track tension decrease during braking events.

In some embodiments, the actuation apparatus 69 of the reconfiguration mechanism may be configured to be manually operated by a user, such as the operator. For instance, in some cases, an actuator 60 may comprise a lever or other manually-operable control member to engage and operate the actuator 60.

Figure 32:
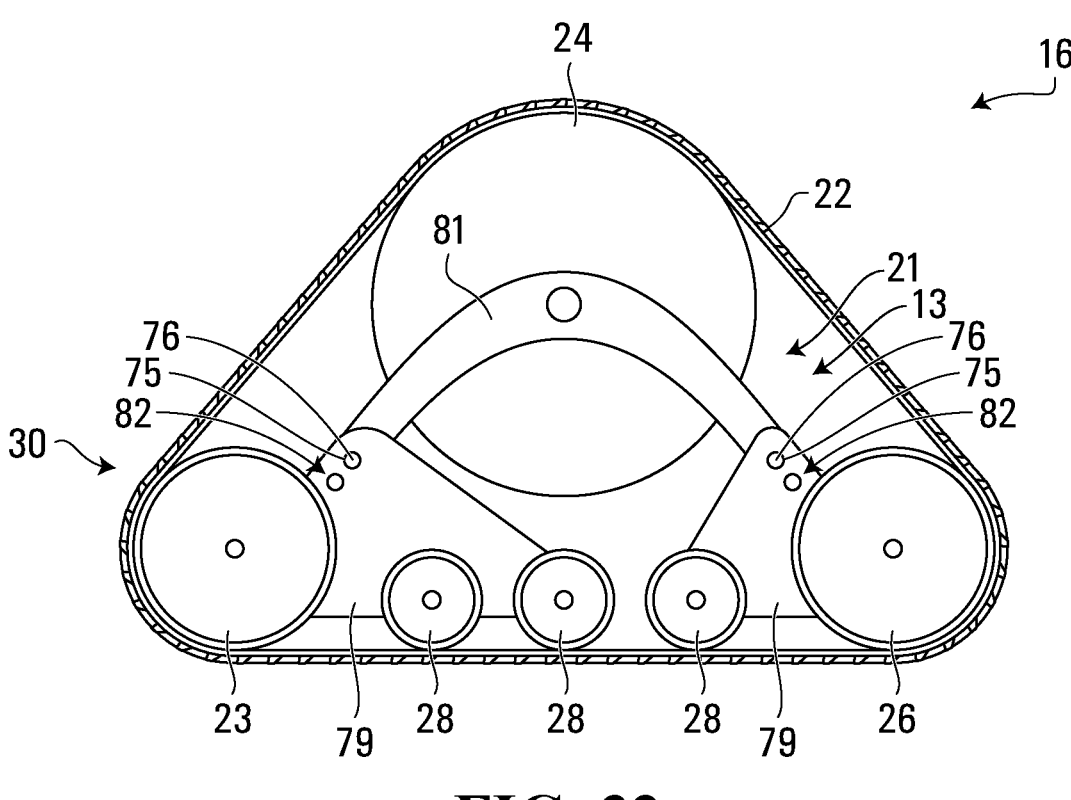
Figure 33:
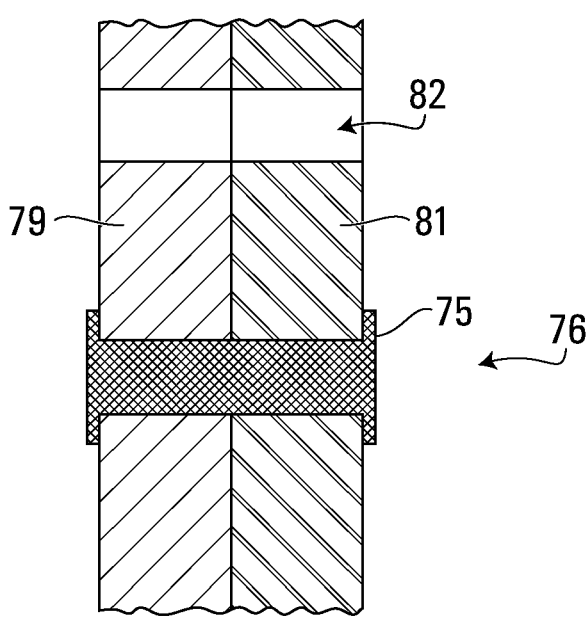

In other embodiments, as shown in FIGS. 32 and 33, in addition to or instead of comprising the actuation apparatus 69, the reconfiguration mechanism 30 may be configured to allow one or more reconfiguration elements 79 to be selectively connected to and disconnected from an adjacent portion 81 of the track system 16. For example, in some embodiments, a reconfiguration element 79 may comprise an insert (e.g., a shim) and the reconfiguration mechanism 30 may comprise an insert-receiving void 82 that is part of the adjacent portion 81 of the track system 16 and dedicated to receiving that insert to alter the configuration of the track system 16. For instance, in some embodiments, the opening 82 may be located adjacent to one of the pivots 75 and may allow the insert, which may be manually inserted into the opening 82, to lock the pivot 75.

Examples of how the reconfiguration mechanism 30 may reconfigure track system 16 in various embodiments are described below.

1. Movement of Part of Track-Engaging Assembly Relative to Another Part Thereof

Figure 34:
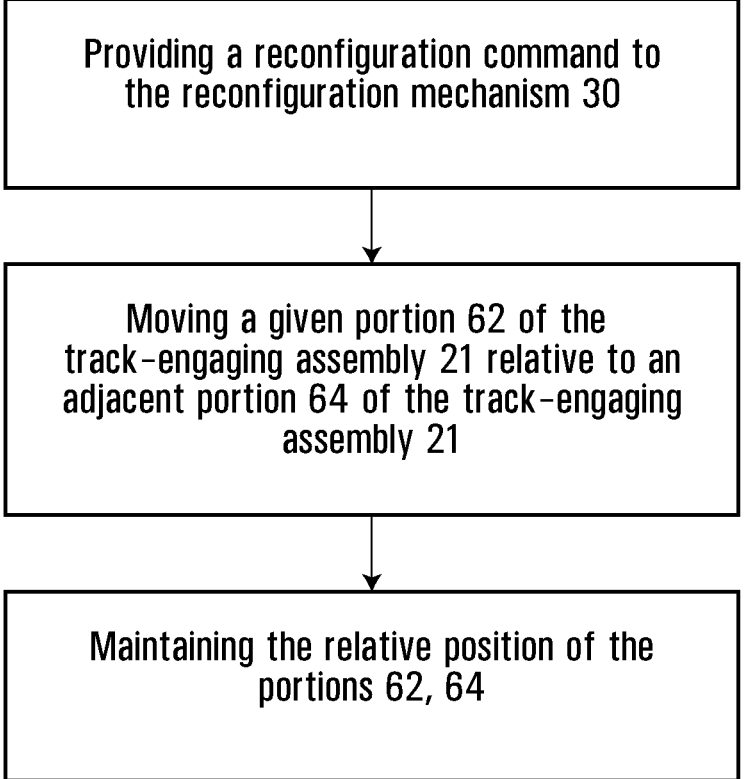
FIGS. 34 and 35 show methods of implementing the track system.

In some embodiments, as shown in FIG. 34, the reconfiguration mechanism 30 may be configured to move a given portion 62 of the track-engaging assembly 21 relative to an adjacent portion 64 of the track-engaging assembly 21 to reconfigure the track system 16. Once so moved, the given portion 62 of the track-engaging assembly 21 remains in its new position relative to the adjacent portion 64 of the track-engaging assembly 21 until and unless the reconfiguration mechanism 30 moves it again.

Thus, in such embodiments, the reconfiguration mechanism 30 may be configured to move the given portion 62 of the track-engaging assembly 21 relative to the adjacent portion 64 of the track-engaging assembly 21 (e.g., in response to a reconfiguration command) such that the track-engaging assembly 21 changes from an initial configuration to a modified configuration different from its initial configuration and is maintained (e.g., "locked") in its modified configuration by the reconfiguration mechanism 30, even if operating conditions (e.g., the speed of the vehicle 10, the profile or compliance of the ground, the loading on the track system 16, etc.) change while the track-engaging assembly 21 is in its modified configuration, until and unless the reconfiguration mechanism 30 once again moves the given portion 62 of the track-engaging assembly 21 relative to the adjacent portion 64 of the track-engaging assembly 21 (e.g., in response to another reconfiguration command) to change the track-engaging assembly 21 from its modified configuration to another configuration (e.g., which may be its initial configuration or yet another different configuration) that is then maintained.

For example, in some embodiments, the reconfiguration mechanism 30 may be configured to move one or more of the wheels 23, 24, 26, 28, one or more members of the frame 13, and/or one or more movable joints 76 of the suspension 74 relative to one another so that they are repositioned and change the geometry of the track-engaging assembly 21.

In some embodiments, the reconfiguration mechanism 30 may be configured to move the given portion 62 of the track-engaging assembly 21 relative to the adjacent portion 64 of the track-engaging assembly 21 in the longitudinal direction of the track system 16 (e.g., horizontally).

Alternatively or additionally, in some embodiments, the reconfiguration mechanism 30 may be configured to move the given portion 62 of the track-engaging assembly 21 relative to the adjacent portion 64 of the track-engaging assembly 21 in the heightwise direction of the track system 16 (e.g., vertically).

As yet another alternative or addition, in some embodiments, the reconfiguration mechanism 30 may be configured to move the given portion 62 of the track-engaging assembly 21 relative to the adjacent portion 64 of the track-engaging assembly 21 in the widthwise direction of the track system 16 (e.g., laterally).

In some embodiments, the reconfiguration mechanism 30 may be configured to translate (e.g., cause a translation of) the given portion 62 of the track-engaging assembly 21 relative to the adjacent portion 64 of the track-engaging assembly 21. For instance, the reconfiguration mechanism 30 may be configured to translate the given portion 62 of the track-engaging assembly 21 relative to the adjacent portion 64 of the track-engaging assembly 21 in the longitudinal direction, the heightwise direction, and/or the widthwise direction of the track system 16.

Alternatively, in some embodiments, the reconfiguration mechanism 30 is configured to rotate (e.g., cause a pivoting or other rotation of) the given portion 62 of the track-engaging assembly 21 relative to the adjacent portion 64 of the track-engaging assembly 21. For instance, the reconfiguration mechanism 30 may be configured to rotate the given portion 62 of the track-engaging assembly 21 relative to the adjacent portion 64 of the track-engaging assembly 21 about an axis generally parallel to the widthwise direction of the track system 16, an axis generally parallel to the longitudinal direction of the track system 16, and/or an axis generally parallel to the heightwise direction of the track system 16.

As another alternative, in some embodiments, the reconfiguration mechanism 30 is configured to translate and rotate (e.g., cause a translation of and a pivoting or other rotation of) the given portion 62 of the track-engaging assembly 21 relative to the adjacent portion 64 of the track-engaging assembly 21.

In some embodiments, the reconfiguration mechanism 30 may be configured to move the given portion 62 of the track-engaging assembly 21 relative to the adjacent portion 64 of the track-engaging assembly 21 to vary the contact patch 63 of the track 22 with the ground.

For example, in some embodiments, the reconfiguration mechanism 30 may be configured to increase the contact patch 63 of the track 22 with the ground for generating more traction (e.g., when a greater pulling force is exerted by the vehicle 10; when the ground is softer, such as in an agricultural field with soft soil; etc.) and/or reduce the contact patch 63 of the track 22 with the ground for facilitating turning of the vehicle 10 and/or when roading.

1.1. Movement of One or More Track-Contacting Wheels

Figure 35:
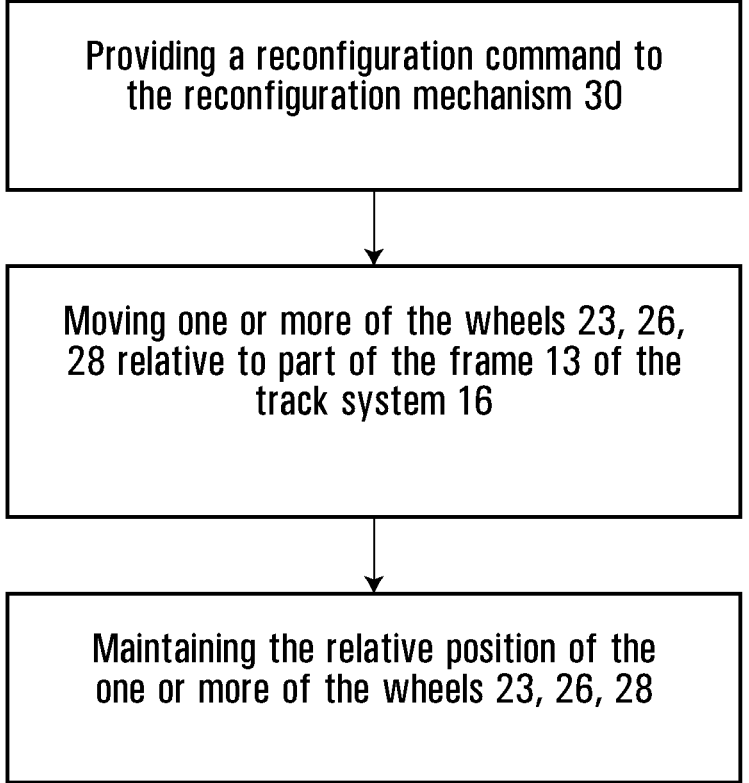

In some embodiments, as shown in FIG. 35, the reconfiguration mechanism 30 may be configured to move one or more of the wheels 23, 24, 26, 28 relative to part of the frame 13 of the track system 16.

Figure 36:
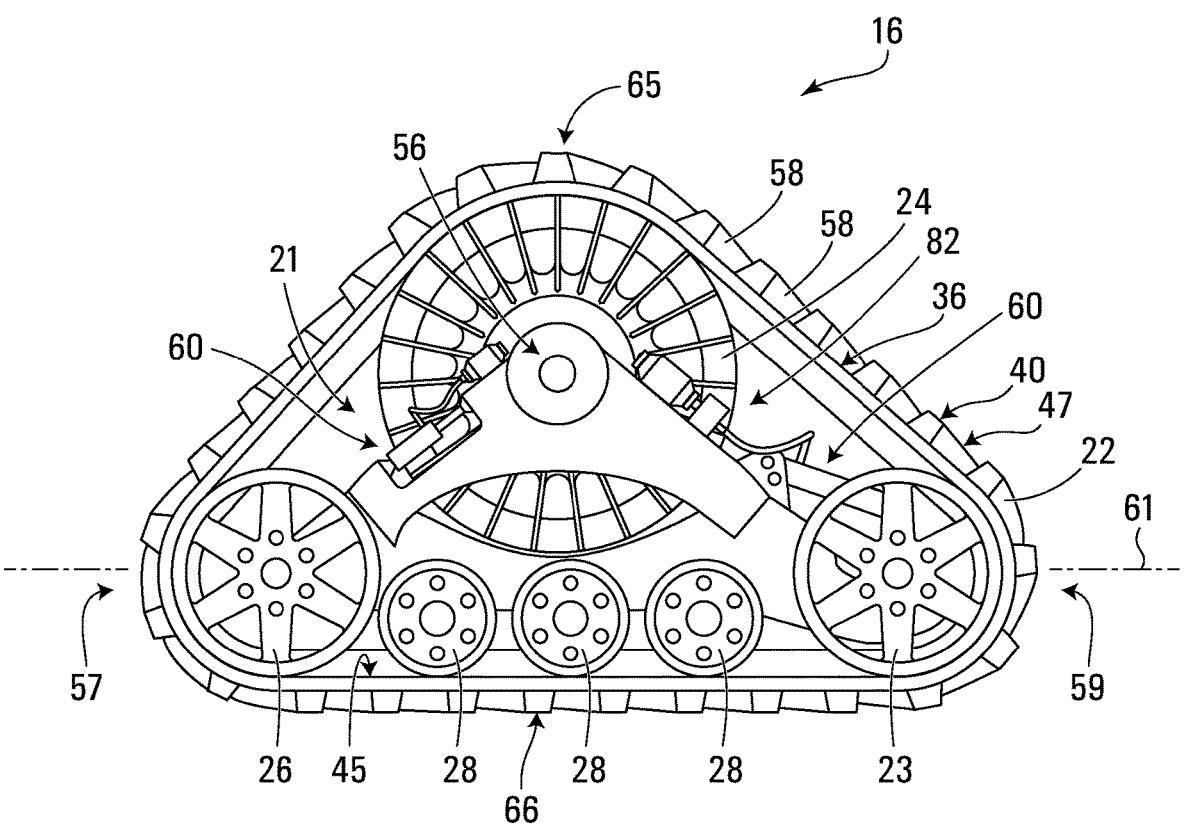
FIGS. 36 to 43 show variants of the track system.
Figure 37:
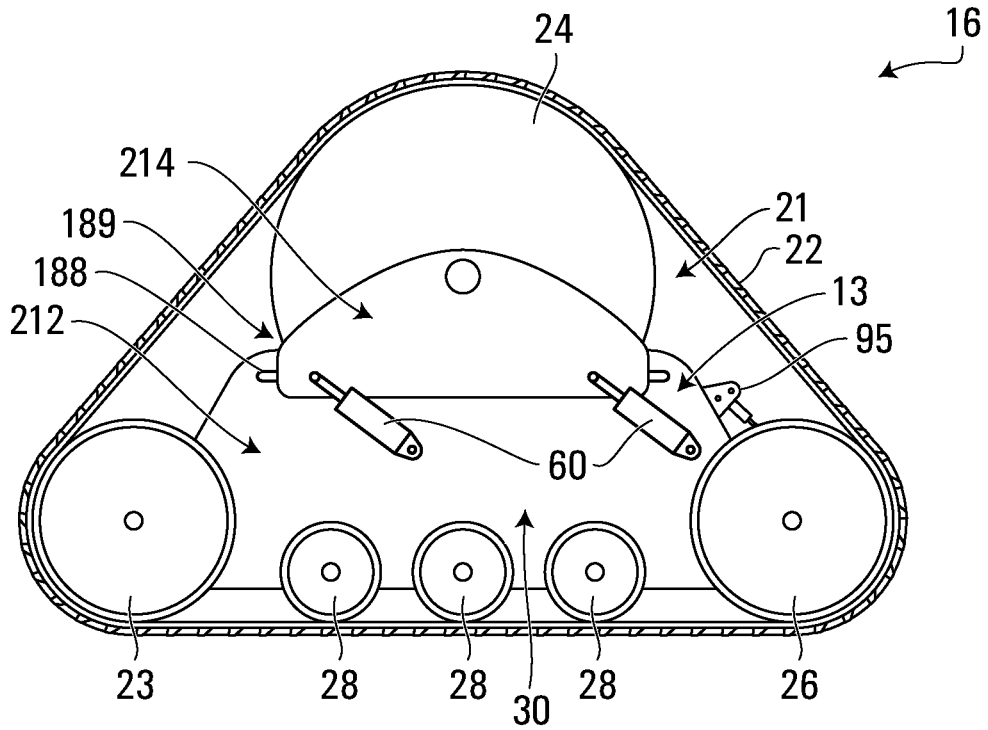

For example, in some embodiments, as shown in FIGS. 36 and 37, the idler wheels 23, 26 and the mid-rollers 28 may be moveable in the longitudinal direction of the track system 16 relative to the frame 13 and the drive wheel 24 of the track system 16. In this example, the wheels 23, 26, 28 are moveable relative to the frame 13 and the drive wheel 24 of the track system 16, but not relative to one another. That is, in this example, when one of the wheels 23, 26, 28 moves longitudinally relative to the frame 13 and the drive wheel 24, the other ones of the wheels 23, 26, 28 also move longitudinally relative to the frame 13 and the drive wheel 24. For instance, in some embodiments, as shown in FIG. 36 this may be achieved by having at least two actuators 60. In some embodiments, as shown in FIG. 37, the frame 13 may comprise lower frame portion 212 and an upper frame portion 214, and the lower frame portion 212 may be slidably engaged with the upper frame portion 214. In particular, in this example, a given one of the portions 212, 214 may comprise the elongate opening 188 and the other one of the portions 212, 214 may comprise a part 189 configured to extend in the elongate opening to slidably engage the given one of the portions 212, 214 of the frame 13.

In a variant, the wheels 23, 26, 28 may be moveable in the longitudinal direction of the track system 16 relative to the frame 13, relative to the drive wheel 24, and relative to one another. That is, in this example, each of the wheels 23, 26, 28 may move longitudinally relative to the frame 13 and the drive wheel 24 irrespective of whether the other ones of the wheels 23, 26, 28 move longitudinally relative to the frame 13 and the drive wheel 24.

Figure 38A:
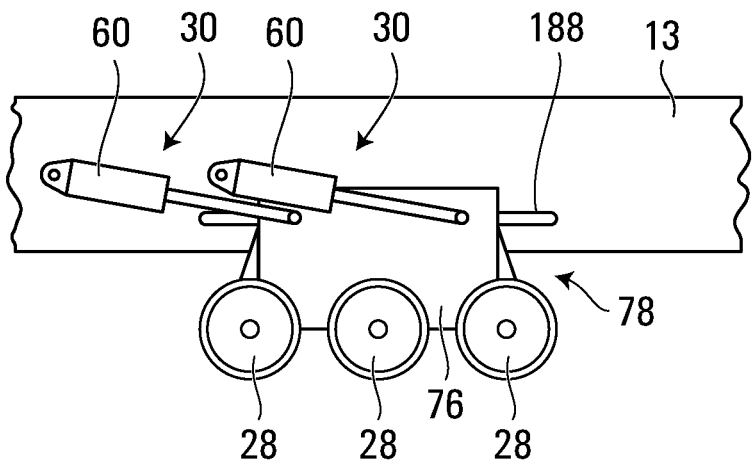
Figure 38B:
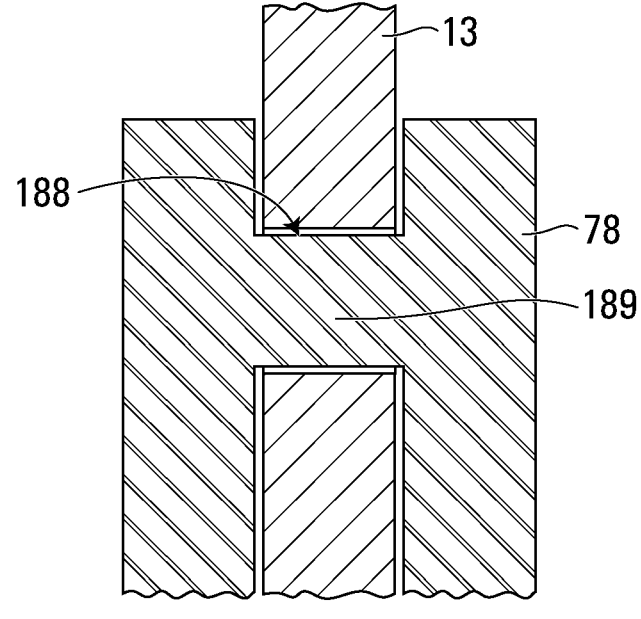

In a variant, a set including some, but not all, of the wheels 23, 26, 28 may be moveable in the longitudinal direction of the track system 16 relative to the frame 13, relative to the drive wheel 24, and relative to remaining ones of the wheels 23, 26, 28 that are not part of the set, while the wheels of the set may not be moveable relative to one another. For instance, in some embodiments, as shown in FIGS. 38A and 38B, the bogie 78 may be slidably engaged to the frame 13. In this example, the frame 13 may comprise the elongate opening 188 and the bogie 78 may comprise the part 189 configured extend in the elongate opening to slidably engage the bogie 78 and the frame 13. In some cases, the longitudinal movement of the set of wheels may also change a height of the track system 16.

Figure 39:
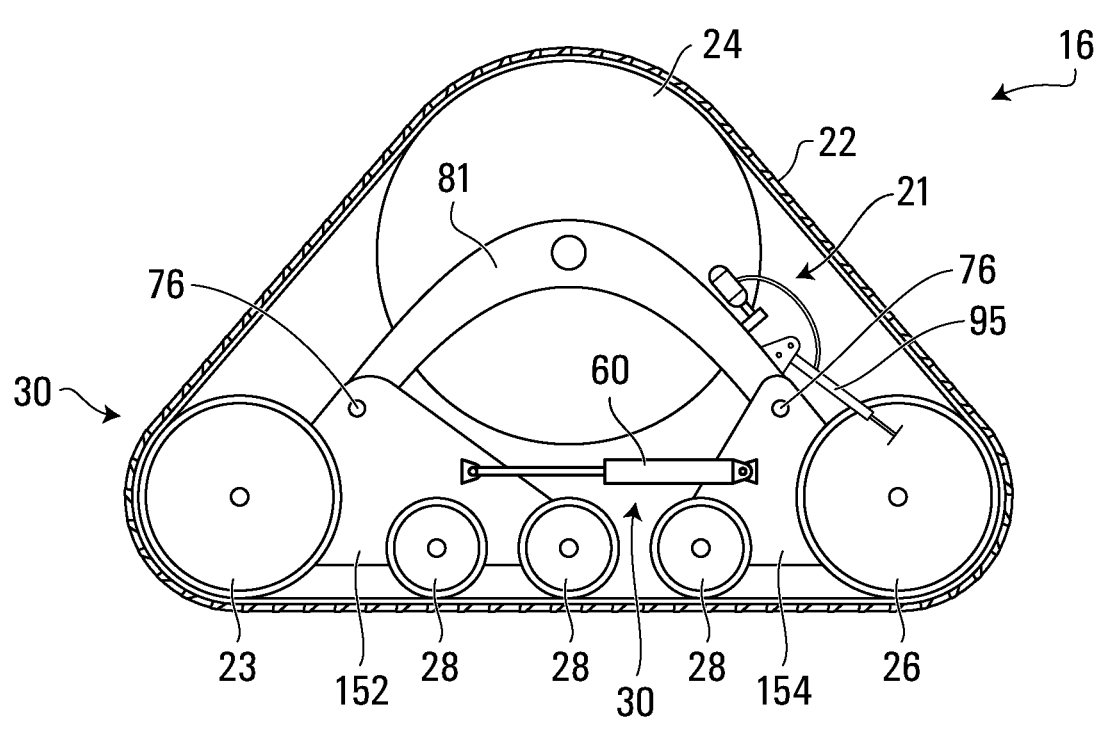

As another example, in some embodiments, as shown in FIG. 39, the idler wheels 23, 26 and the mid-rollers 28 may be moveable in a heightwise direction of the track system 16 relative to the frame 13 and the drive wheel 24 of the track system 16. In this example, the wheels 23, 26, 28 are moveable relative to the frame 13, relative to the drive wheel 24 of the track system 16, and also relative to one another. For instance, in this embodiment, the reconfiguration mechanism 30 may comprise a front link 152 that connects the front idler wheels 23 and the front mid-rollers 28 to one another, and a rear link 154 that connects the rear idler wheels 26 and the rear mid-rollers 28 to one another. The front and rear links 152, 154 may be pivotably coupled to the frame 13. The reconfiguration mechanism 30 may comprise a single actuator 60 and the front and rear links 152, 154 may be pivotably coupled to the actuator 60 of the reconfiguration mechanism 30 (e.g., the front link 152 may be connected to a first longitudinal end of the actuator 60 and the rear link 154 may be connected to a second longitudinal end of the actuator 60 opposite to the first longitudinal end of the actuator 60). In this example, the actuator 60 comprises a linear actuator, more specifically a hydraulic cylinder, and when the actuator retracts or extends, the links 152, 154 may pivot about their respective movable joints 156 and the wheels 23, 28, 26 may effectively elevate or come down in the heightwise direction of the track system 16 relative to the drive wheel 24. More specifically, in this example, the idler wheels 23, 26 and the mid-rollers 28 may be moveable in both the heightwise direction of the track system 16 and the longitudinal direction of track system relative to the frame 13 and the drive wheel 24 of the track system 16. More specifically, in this embodiment, the reconfiguration mechanism 30 is configured to rotate the axes of rotation of the wheels 23, 28, 26 relative to the frame 13 and the drive wheel 24 of the track system 16.

Figure 40:
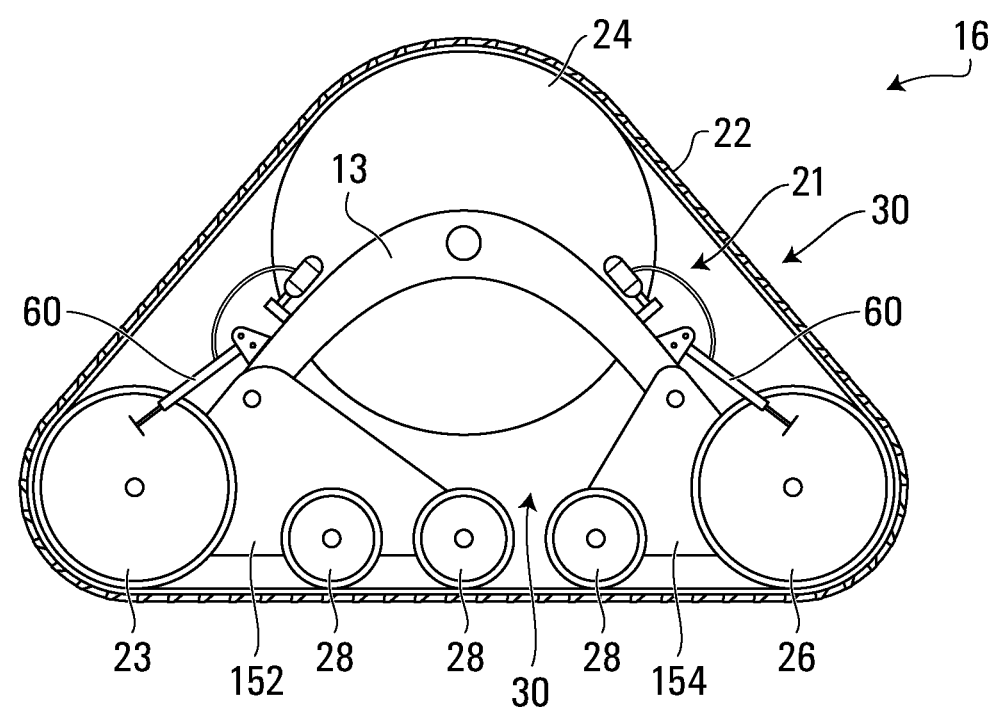

In a variant, as shown in FIGS. 40, the reconfiguration mechanism 30 may comprise at least two actuators 60, each of the actuators 60 being pivotably connected to the frame 13 of the track system and to each of the front and rear links 152, 154 (e.g., each actuator 60 may be pivotably connected to the front link 152 at a first longitudinal end, to the rear link 154 at a second longitudinal end opposite the first longitudinal end, and to the frame 13 between the first and second longitudinal ends).

Figure 41:
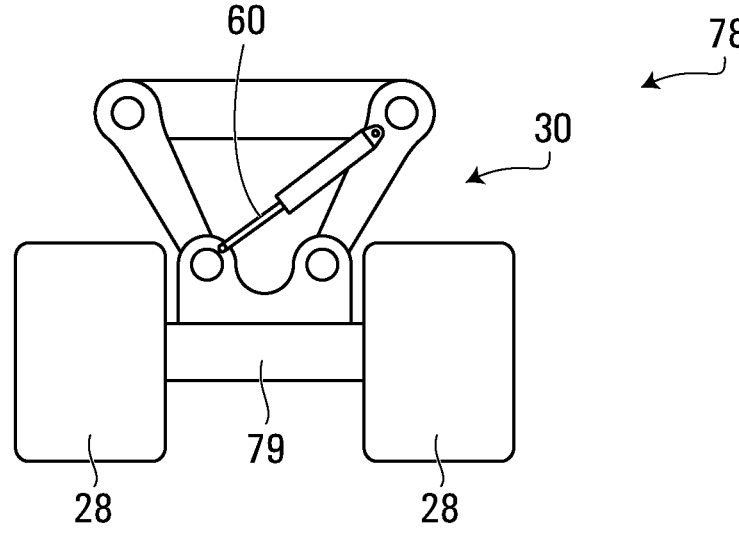
Figure 42:
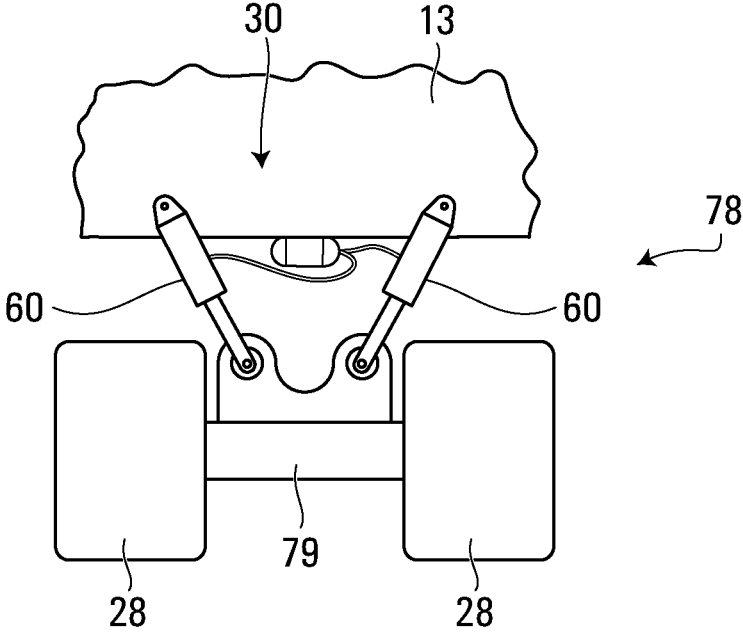
Figure 43:
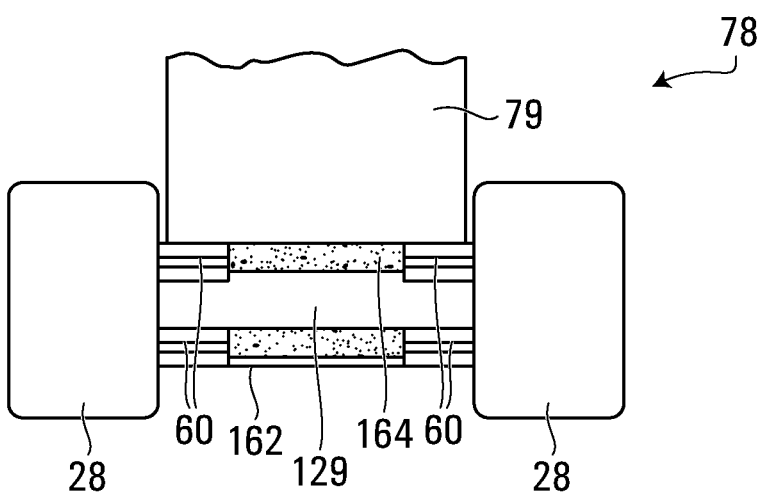

As another example, in some embodiments, as shown in FIGS. 41 to 43, the reconfiguration mechanism 30 may change a "roll" position (i.e. a position about the oscillation (e.g., pivot) axis $P_L$ relative to the frame 13) of the wheels 28 of the bogie 78. For instance, in variants, as shown in FIG. 41, the actuator 60 of the reconfiguration mechanism 30 may be disposed between two opposite pivots of a four-bar mechanism of the bogie 78 which allows lateral oscillation of the wheels 28. Therefore, the actuator 60 may control a lateral oscillation and the roll position of the wheels 28. In variants, as shown in FIG. 43, two actuators 60 may connect the wheel-carrying member 79 of the bogie 78 to the frame 13 of the track system, allowing the reconfiguration mechanism 30 to control a height, the lateral oscillation and the roll position of each of the wheels 28. In variants, as shown in FIG. 43, an axle 129 of the mid-rollers 28 may be encased in a casing 162 comprising a resilient material 164 and the actuators 60 may be disposed between the casing 162 and the axle 129 of each wheel 28, adjacent to lateral surfaces of the bogie 78, in order to control the lateral oscillation and the roll position of the wheels 28.

1.2. Movement of One or More Movable Joints

Figure 44:
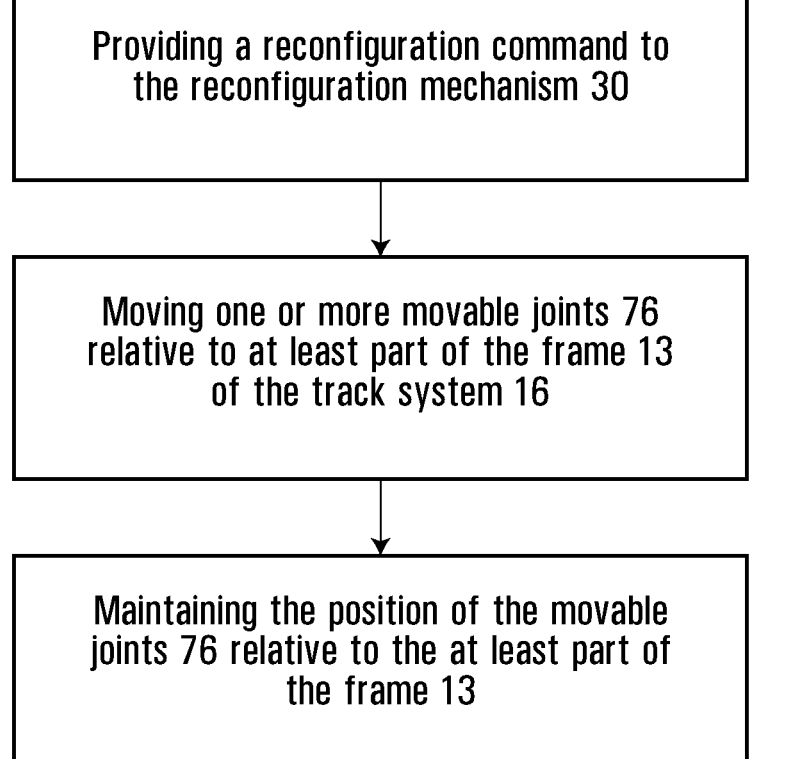
FIG. 44 shows a method of implementing the track system.

In some embodiments, as shown in FIG. 44, the reconfiguration mechanism 30 may be configured to move one or more movable joints 76 (e.g., including pivots and/or resilient elements) relative to part of the frame 13 of the track system 16.

Figure 45:
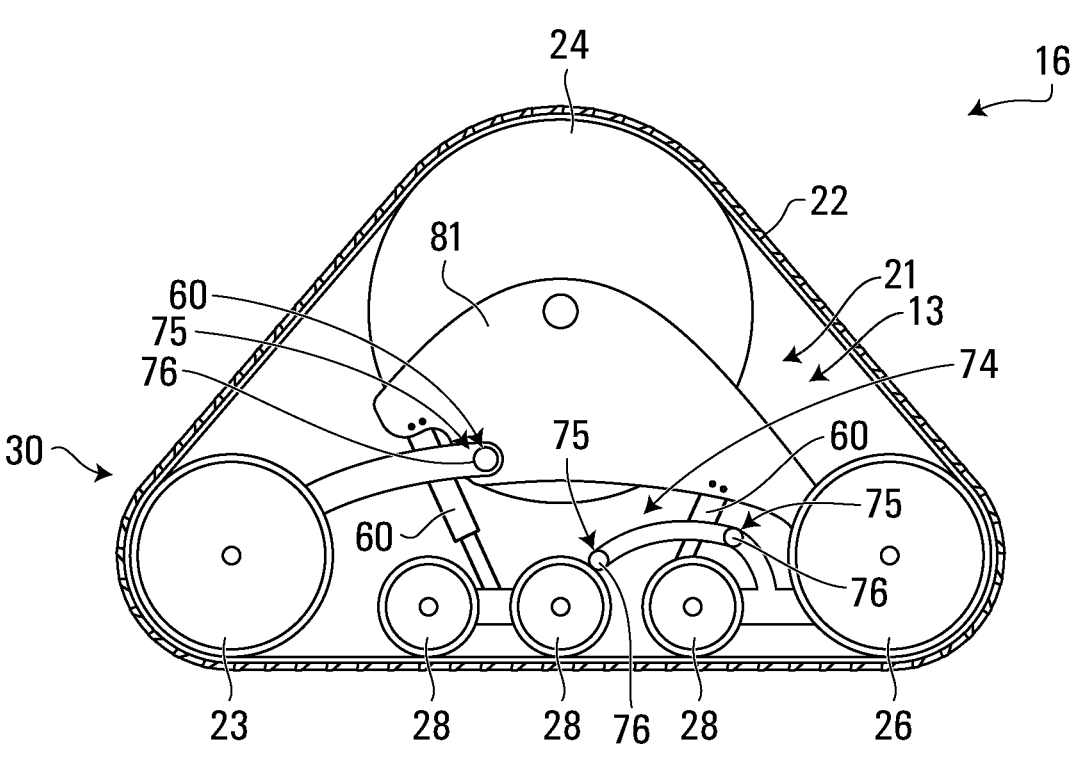
FIGS. 45 and 46 show variants of the track system.

For example, in some embodiments, as shown in FIG. 45, the movable joints 76 may be located:

- on slide rails/slots of the track-engaging assembly 21;
- on screw jacks of the track-engaging assembly 21;
- on hydraulics of the track-engaging assembly 21;
- on re-boltable connections of the track-engaging assembly 21;
- on a compliant mechanism of the track-engaging assembly 21; and/or
- with a flexible stopper or a stopper driven by load.

Each configuration of the movable joints 76 may impart properties to the track system 16, e.g., create a suspension of a certain stiffness, impart certain vibrational properties, and so on. In this embodiment, the actuators 60 of the configuration mechanism 30 are pivotably connected to the frame 13 of the track system 60 and to the movable joints 76 of the track system 16.

Figure 46:
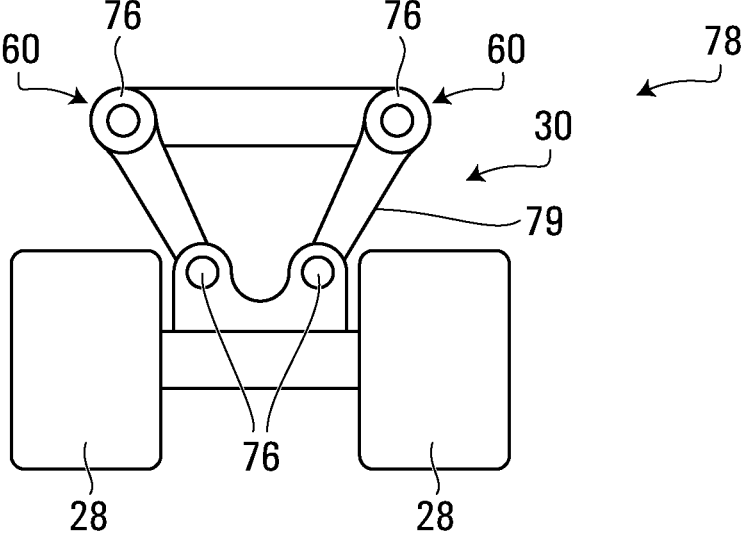

As another example, in some embodiments, as shown in FIG. 46, the movable joints may be located in the bogie 78 and may thus have an influence on a "rolling" capability of the mid-rollers 28. In this embodiment, the reconfiguration mechanism 30 may change the configuration of the movable joints of the bogie 78, thus controlling the roll position (i.e. a position about the pivot axis $P_L$ relative to the frame 13) of the wheels 28 of the bogie 78. This may be achieved using the actuators 60 which are, in this example, rotational actuators, in the movable joints 76 of the bogie 78, allowing the reconfiguration mechanism 30 to control a height, the lateral oscillation and the roll position of each of the wheels 28.

1.3. Movement of Frame Structure

In some embodiments, as shown in FIG. 47, the reconfiguration mechanism 30 may be configured to move a given structure 82 of the frame 13 of the track system 16 relative to another part of the track system 16, such as the drive wheel 24 and/or an adjacent structure 89 of the frame 13 of the track system 16.

Figure 48:
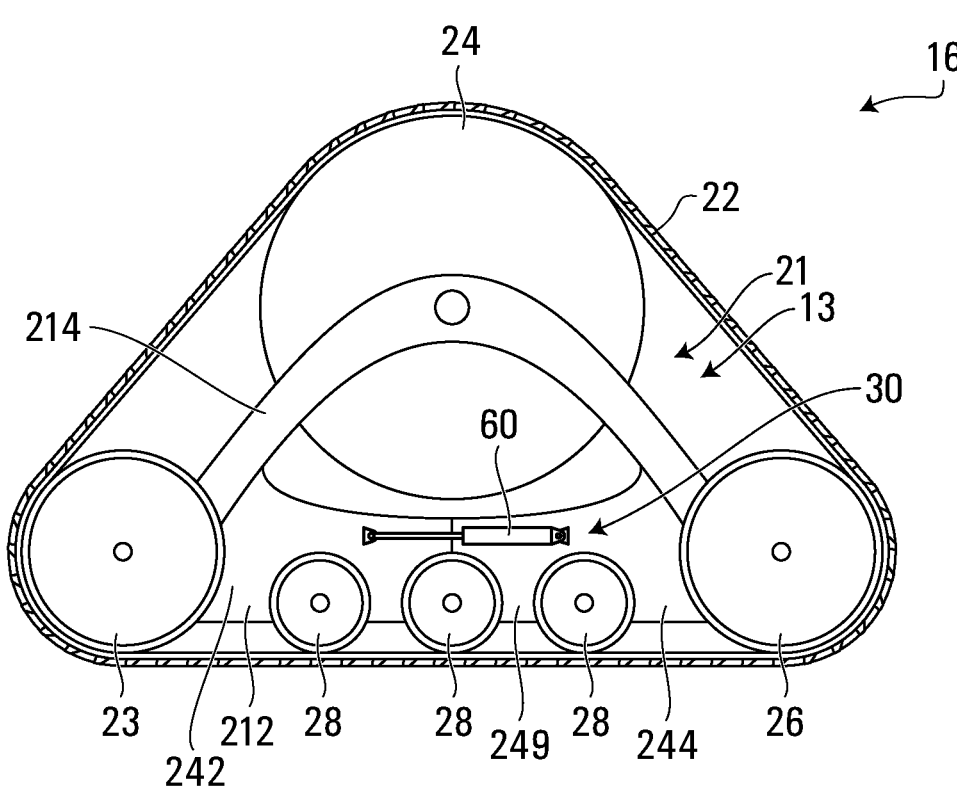
FIGS. 48 to 53 show variants of the track system.
Figure 49:
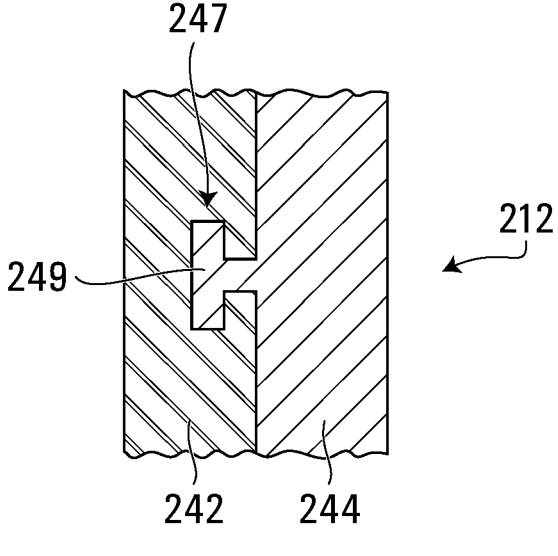

For example, in some embodiments, as shown in FIGS. 48 and 49, the frame 13 of the track system 16 may comprise a lower frame portion 212 and an upper frame portion 214. The lower frame portion 212 may be connected to the wheels 23, 26, 28 while the upper frame portion 214 may be connected to the drive wheel 24. The lower frame portion 212 may be moveable relative to upper frame portion 214. The lower frame portion 212 may comprise a front frame member 242 and a rear frame member 244. The front frame member 242 may be connected to the front idler wheels 23 and to front ones of the midrollers 28, and the rear frame member 244 may be connected to the rear idler wheels 26 and to rear ones of the midrollers 28. The front frame member 242 may be slidably connected to the rear frame member 244 such that the front frame member 242 is slideable relative to the rear frame member 244, effectively forming a lower frame portion 212 having a variable longitudinal span. For instance, a given one of the members 242, 244 may comprise a rail structure 247 and the other one of the members 242, 244 may comprise an interlocking projection 249 configured to interlock slidably into the rail structure 247. In this example, the actuator 60 of the reconfiguration mechanism may be disposed between the front frame member 242 and the rear frame member 244, e.g., a first longitudinal end of the actuator 60 may be connected to the front frame member 242 and a second longitudinal end of the actuator 60 opposite to the first longitudinal end of the actuator 60 may be connected to the rear frame member 244. In this embodiment, a longitudinal axis of the actuator 60 may be substantially parallel to the longitudinal direction of the track system 16.

As another example, in some embodiments, one or more of the idler wheels 23, 26 and the roller wheels 28 may comprise a motor to drive the wheel (or the plurality of wheels) in question. For instance, the motor may be devoted for power assist capabilities. The motor may also be part of the reconfiguration mechanism 30. For instance, for reconfiguring the track system 16, the motor may rotate the wheel (or the plurality of wheels) in question such that it rotates a different linear speed than the drive wheel 24 such as to displace the members 242, 244 (i.e., retract or expand) relative to one another.

Figure 50:
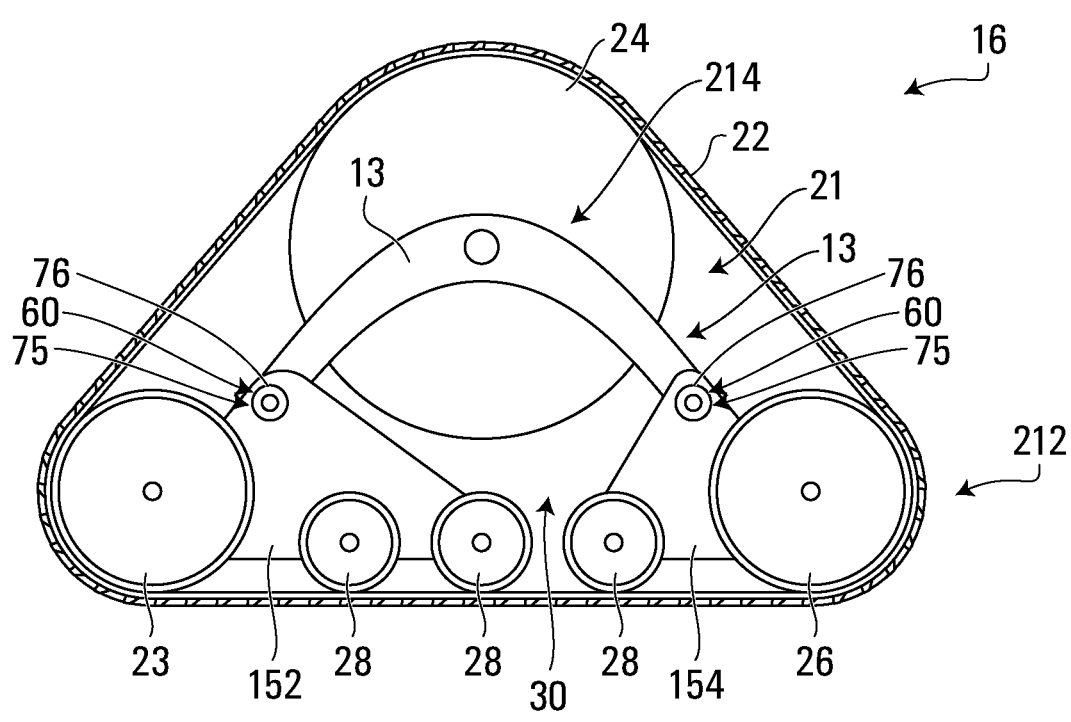

As another example, in some embodiments, as shown in FIG. 50, at least some of the movable joints 76 may connect the lower frame portion 212 to the upper frame portion 214 such that the lower frame portion 212 is pivotable relative to the upper frame portion 214 about the respective pivots 75.

In this embodiment, the actuator 60 may comprise a rotational motor disposed on the pivot 75. The actuator 60 may be configured to adjust a pivot position of the pivot 75, i.e., control (e.g., limit) the position of the lower frame portion 212 relative to the upper frame portion 214, e.g., to control diving or climbing under traction forces. In particular, in this embodiment, the pivot 75 may comprise rotation stops, e.g., rubber bumpers, which may be used to limit the rotational position of the lower frame portion 212 relative to the upper frame portion 214. The actuator 60 may be configured to displace the rotation stops in order to control the position of the lower frame portion 212 relative to the upper frame portion 214.

Figure 51:
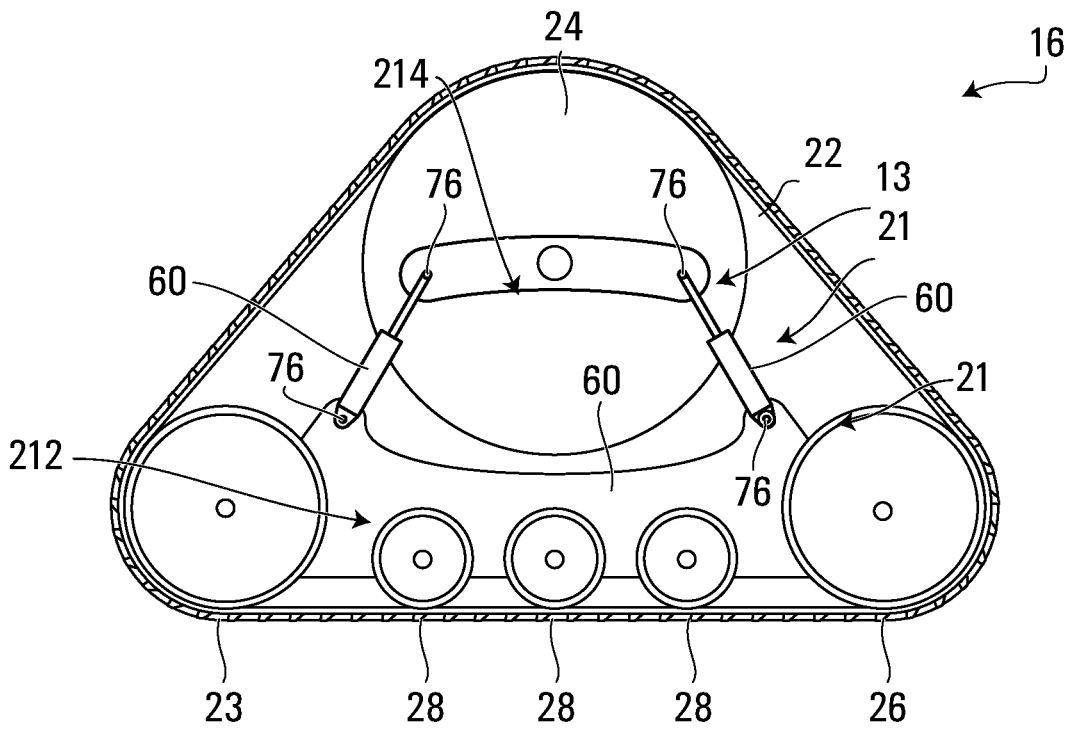

As another example, in some embodiments, as shown in FIG. 51, the lower frame portion 212 may be connected to upper frame portion 214 by two actuators 60 of the reconfiguration mechanism 30. In this example, the actuators 60 of the actuating system 69 comprise a front hydraulic cylinder pivotably connecting a front of the upper frame portion 214 to a front of the lower frame portion 212 and a rear hydraulic cylinder pivotably connecting a rear of the upper frame portion 214 to a rear of the lower frame portion 212. To increase stability, the front and rear piston cylinders may not be parallel relative to one another (e.g., the front and rear piston cylinders may be transversal). For instance, in some embodiments, an angle between the front and rear piston cylinders 60 may be between 15° and 75°, in some embodiments between 30° and 60°, and in some embodiments may be about 45°. The reconfiguration mechanism may simultaneously allow a control of the rotational and translational positions of the lower frame portion 212 relative to upper frame portion 214. In particular, the extension and/or compression of the front and rear piston cylinders may allow a control of the position of the lower frame portion 212 relative to upper frame portion 214. For instance, if a given one of the front and rear piston cylinders compresses or expands, while the other one of the front and rear piston cylinders remains of a constant length, the lower frame portion 212 may rotate relative to upper frame portion 214. If the front and rear piston cylinders compress or expand by a same length, the lower frame portion 212 may translate relative to upper frame portion 214. If front and rear piston cylinders compress or expand by different lengths, the lower frame portion 212 may translate and rotate relative to upper frame portion 214.

Figure 52:
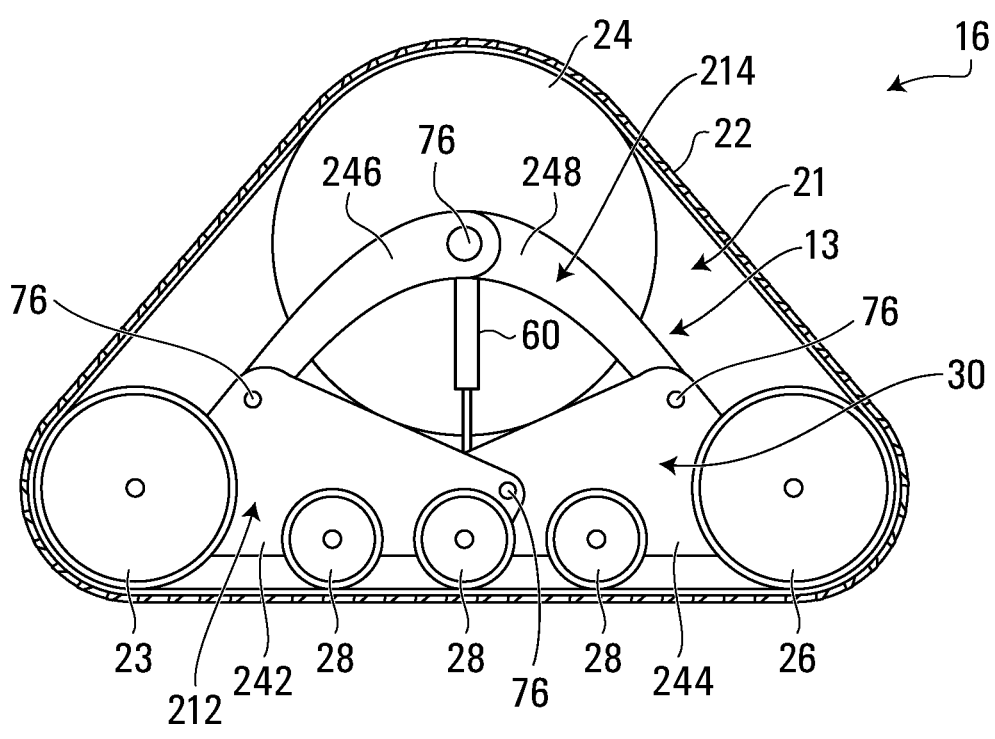
Figure 53:
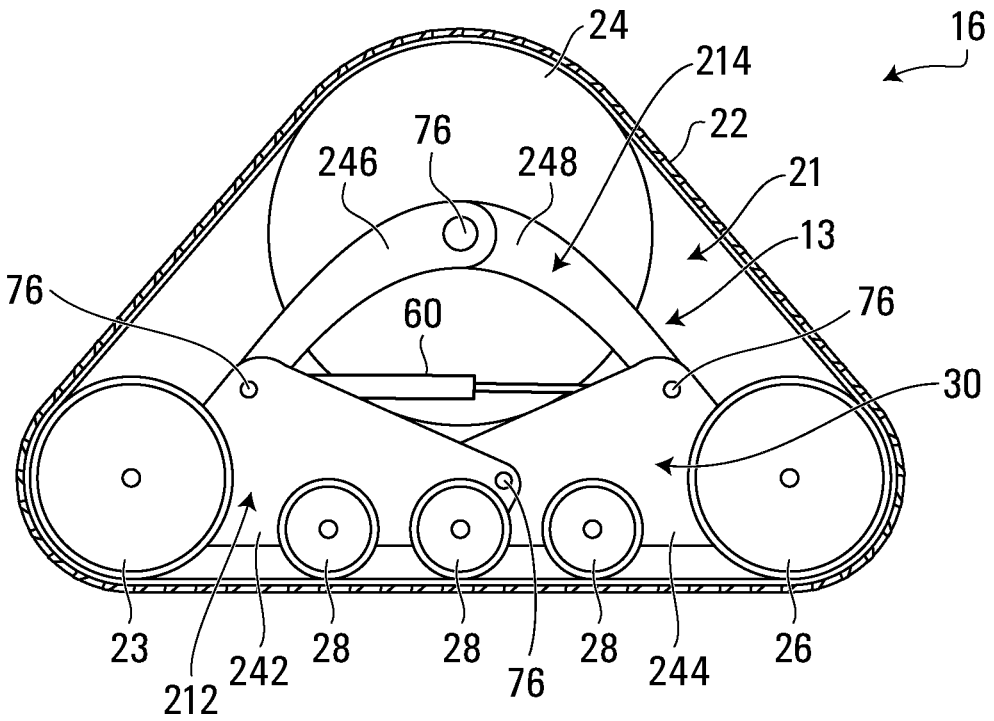

As another example, in some embodiments, as shown in FIGS. 52 and 53, the lower frame portion 212 may be moveable relative to upper frame portion 214 in the heightwise direction of the track system 16. For instance, in this embodiment, the upper frame portion 214 may comprise a front upper frame member 246 and a rear upper frame member 248. In this example, the front upper frame member 246 may be pivotably connected to the front lower frame member 242 and to the rear upper frame member 248; the rear upper frame member 248 may be pivotably connected to the rear lower frame member 244 and to the front upper frame member 246; the front lower frame member 242 may be pivotably connected to the front upper frame member 246 and to the rear lower frame member 244; and the rear lower frame member 244 may be pivotably connected to the rear upper frame member 248 and to the front lower frame member 242. The actuator 60 of the reconfiguration mechanism 30 may be configured to influence the relative position of the frame members 242, 244, 246, 248. For instance, the actuator 60 may comprise a piston cylinder connecting two opposite pivotable joints connecting the frame members 242, 244, 246, 248. By changing its length, the actuator 60 may increase or decrease a distance between the drive wheel 24 and the wheels 23, 26, 28, thus increasing or decreasing a height of the track system 16. Consequently, the actuator 60 may also increase or decrease a longitudinal span of the track system 16. For instance, in this embodiment, as shown in FIG. 52, a longitudinal axis of the actuator 60 may be substantially parallel to the heightwise direction of the track system 16. In other embodiments, as shown in FIG. 53, the longitudinal axis of the actuator 60 may be substantially parallel to the longitudinal direction of the track system 16.

In variants, the longitudinal axis of the actuator 60 may be substantially parallel to the longitudinal direction of the track system 16.

2. Restricting Movement of Movable Joints

In some embodiments, as shown in FIG. 54, the reconfiguration mechanism 30 may be configured to restrict (e.g., block or reduce) movement of one or more movable joints 76 (e.g., including pivots and/or resilient elements).

For instance, in some embodiments, the reconfiguration mechanism 30 may be configured to change a movable joint 76 between an unlocked state, in which the movable joint 76 is movable to allow relative movement of parts of the track-engaging assembly 21 that are interconnected by the movable joint 76 and moveable relative to one another at the movable joint 76, and a locked state, in which the movable joint 76 is locked to prevent relative movement of these parts of the track-engaging assembly 21.

Figure 56A:
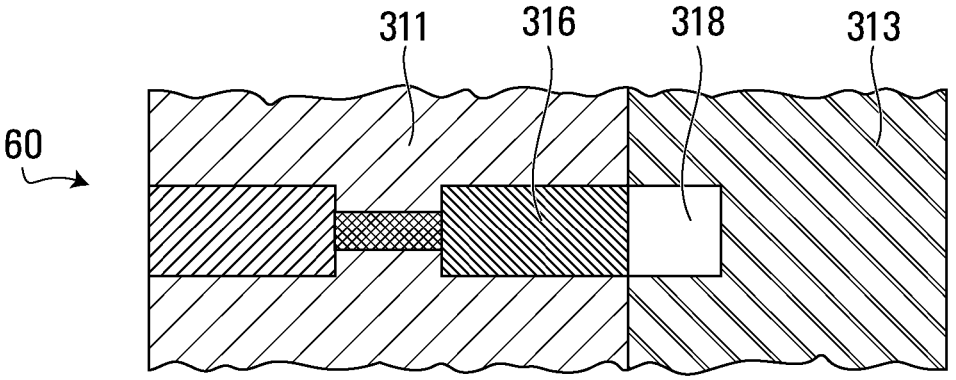
Figure 56B:
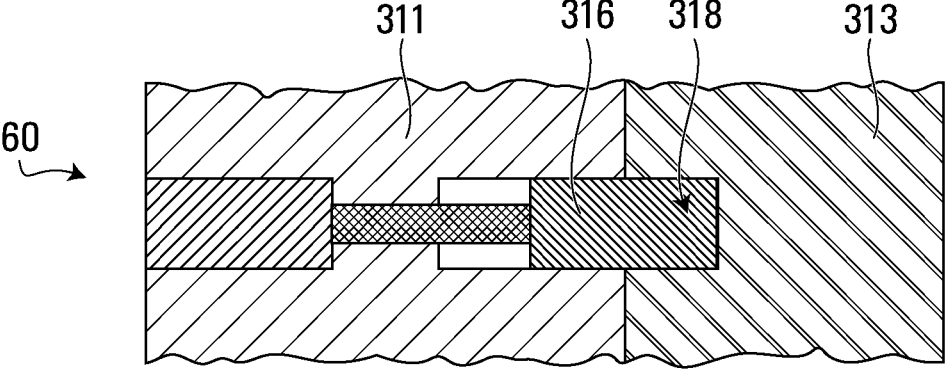
Figure 57:
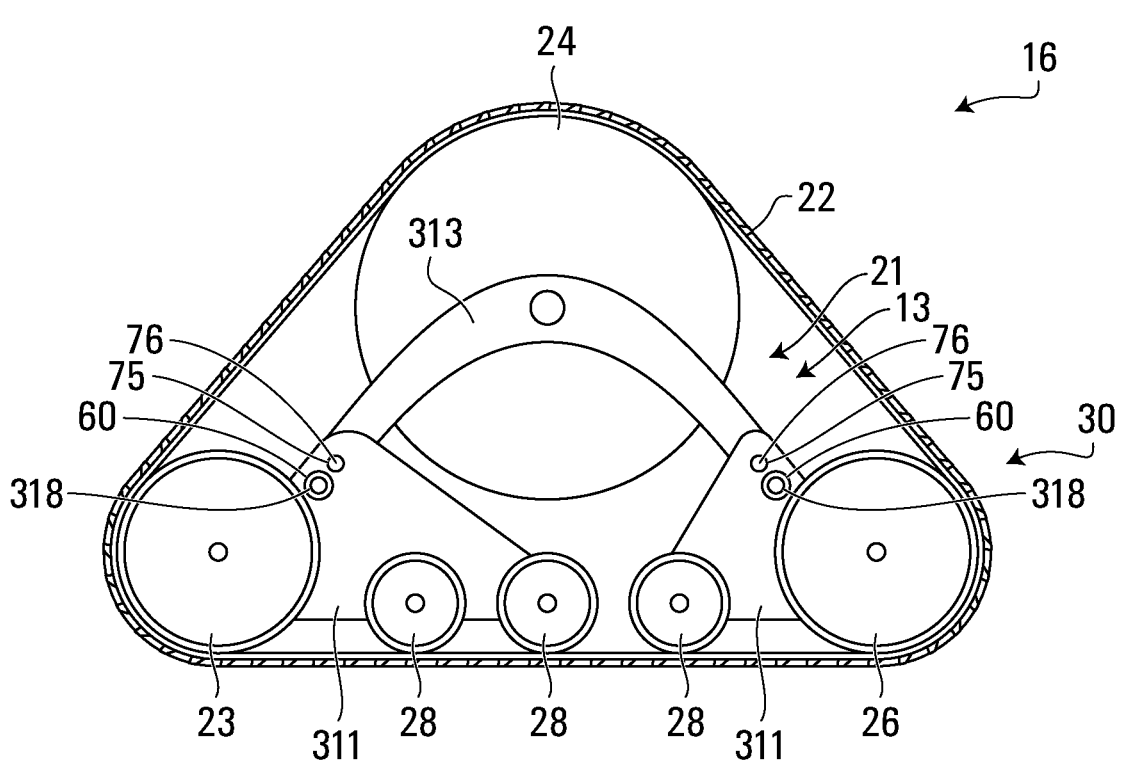

For example, in some embodiments, as shown in FIGS. 56A to 57, each movable joint 76 comprises two adjacent frame elements 311, 313 that are configured to move relative to one another when an angle of the movable joint 76 changes. A given one of the two elements 311, 313 may comprise one or more openings 318, and the actuator 60 of the reconfiguration mechanism 30 may be located on the other one of the two elements 311, 313. The reconfiguration mechanism 30 may be configured to activate or disactivate the actuator 60 which, in response, may engage or disengage a blocking device 316 (e.g., a cam, a block, etc.) in the opening 316 in order to lock or unlock the movable joint 76. For instance, the actuator 60 may comprise a hydraulic cylinder on which the blocking device 316 is affixed.

Figure 58:
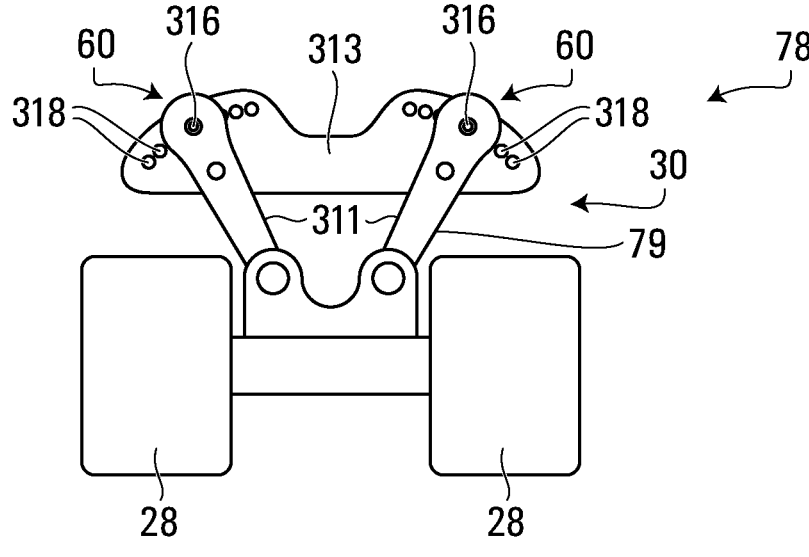

As another example, in some embodiments, as shown in FIG. 58, the movable joints 76 of the bogie 78 may comprise the frame elements 311, 313, the opening 318 and may implement the actuator 60 and the blocking device 316 in order to selectively lock the roll position of the mid-rollers 28 and thus restraining lateral oscillation of the mid-rollers 28.

3. Alteration of Internal Loading

Figure 59:
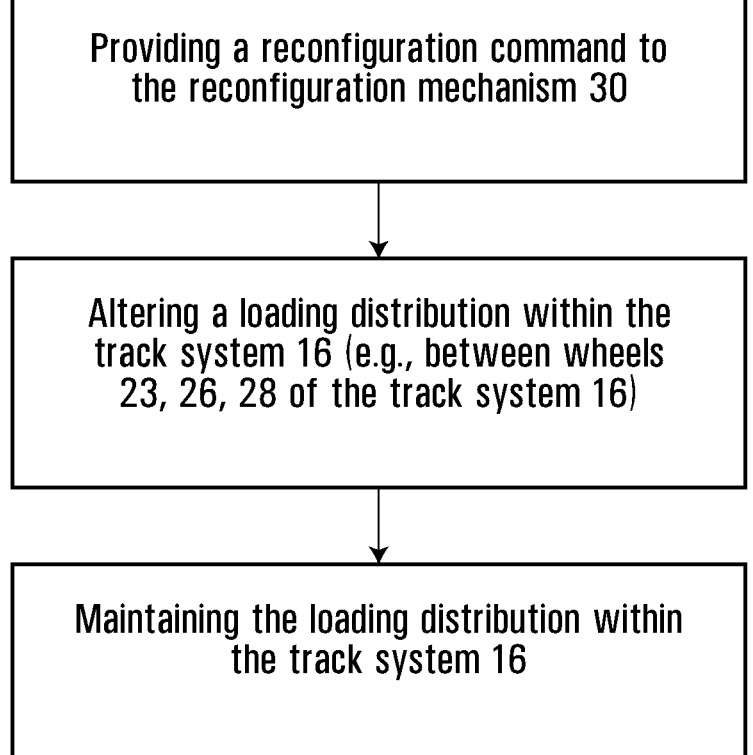
FIGS. 59 and 60 show methods of implementing the track system.

In some embodiments, as shown in FIG. 59, the reconfiguration mechanism 30 may be configured to alter internal loading within the track system 16, i.e., one or more internal loads applied to one or more components of the track system 16, such as one or more of the wheels 23, 26, 28, one or more parts of the frame 13, one or more movable joints 76, and/or the track 22.

For instance, in some embodiments, these one or more internal loads may include a load applied by the tensioner 95 to control the tension of the track 22 and/or one or more loads applied by the one or more actuators 60 of the reconfiguration mechanism 30 on one or more of the front idler wheels 23, the rear idler wheels 26, and/or the mid-rollers 28 (e.g., via one or more actuating members 68 associated with respective ones of these wheels). In some embodiments, this may be achieved in any track system configuration discussed above. For instance, with additional reference to FIG. 50, the actuators 60 may be configured to control (e.g., limit) rotational positions of the lower frame members 152, 154 relative to the upper frame portion 214. For instance, in some cases, each actuator 60 may comprise a rotational motor disposed in the respective movable pivot 76. During use, rotation of the actuators 60 towards an outside may promote high load on the mid-rollers 28 and less load on the idler wheels 23, 26, while rotation of the actuators 60 in an inside may promote high load on the idler wheels 23, 26 and less load on the mid-rollers 28.

For example, in some embodiments, the reconfiguration mechanism 30 may comprise at least one actuator 60 located between each laterally adjacent pair of wheels 23, 26, 28 and the frame 13 of the track system 16. In this embodiment, each actuator 60 may be controlled so that each laterally-adjacent pair of wheels 23, 26, 28 applies a desired pressure on the track 22, thereby affecting the distribution of the load of the vehicle 10 amongst the wheels 23, 26, 28. For instance, each actuator 60 may comprise a piston cylinder. Each actuator 60 may have a longitudinal axis that is substantially parallel to the heightwise direction of the track system 16, or that forms an angle with the heightwise direction of the track system 16 of no more than 45°, in some embodiments of no more than 30°, and in some embodiments of no more than 15°.

In variants, rather than comprising one actuator 60 located between each laterally adjacent pair of mid-rollers 28, the reconfiguration mechanism 30 may comprise an actuator 60 between the bogie 78 and the frame 13.

In variants, each laterally of the adjacent pair of wheels 23, 26 and the bogie 78 may comprise a laterally adjacent pair of actuators 60. That is, in addition to controlling load distribution between each pair of wheels 23, 26, 28, the reconfiguration mechanism may be configured to control load distribution between the laterally adjacent wheels 23, 26, 28. In this example, the wheels 23, 26, 28 may have laterally oscillating capacities, i.e., each laterally adjacent pair of wheel may be rotatable about an axis that us substantially parallel to the longitudinal axis of the track system 16.

As another example, in some embodiments, the tensioner 95 may comprise the actuator 60 or one of the actuators 60 of the reconfiguration mechanism 30. In particular, in this example, the actuator 60 may control the tension of the tensioner 95 in order to keep the track under a constant tension regardless of the behavior of the vehicle 10 (e.g., during sudden braking events, during accelerations, etc.). For instance, the actuator 60 may be a hydraulic actuator configured to control the pressure of the biasing element 142 in the compression chamber 140 (thus increasing tension in the track 22) during braking events, which usually tends to cause a compression of the tensioner 95 and a reduction in the track tension. In this embodiment, the sensor 84 comprises an accelerometer, and when a deceleration of the vehicle 10 above a pre-determined threshold is detected and/or when a braking command is detected, the actuator 60 may be configured to activate and apply a tensioner-extending load.

Internal loading alteration of the track system 16 by the reconfiguration mechanism 30 may allow the track-system 16 to increase its maximal pulling force (i.e. maximal traction) significantly. For instance, in some embodiments, the internal loading alteration of the track system 16 by the reconfiguration mechanism 30 may allow the track-system 16 its maximal pulling force by at least 50%, in some embodiments by at least 100%, in some embodiments by at least 135% in some embodiments by at least 160%, and in some embodiments by even more, compared to when the reconfiguration mechanism 30 is not activated (i.e. without internal loading alteration of the track system 16 by the reconfiguration mechanism 30).

4. Alteration of Suspension Behavior

Figure 60:
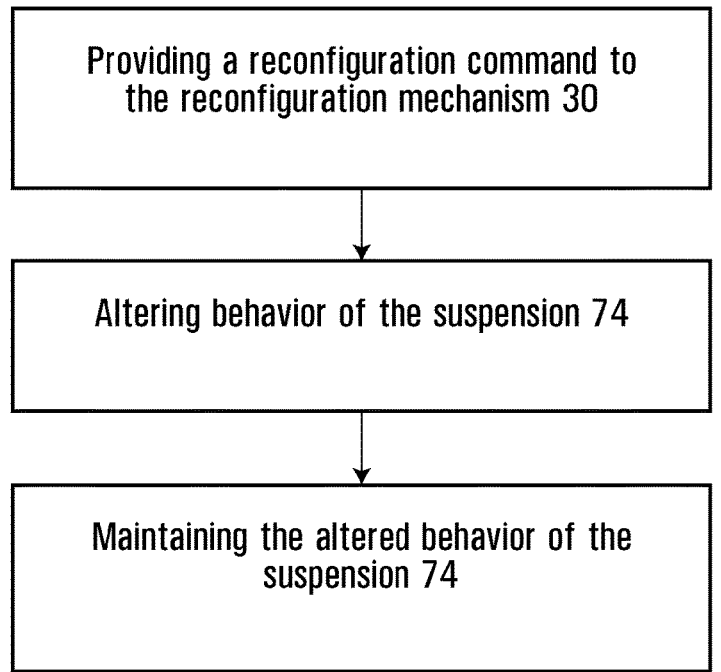

In some embodiments, as shown in FIG. 60, the reconfiguration mechanism 30 may be configured to alter a behavior (e.g., resiliency) of the suspension 74 of the track system 16, such as by altering stiffness (e.g., spring rate), damping, and/or one or more other parameters of the suspension 74 (e.g., of one or more springs, dampers, and/or other resilient elements 77 of the suspension 74).

For example, in some embodiments, the reconfiguration command may relate to the adjustment of different parameters of the suspension 74. For instance, in this embodiment, the resilient element 77 of the suspension 74 may comprise a spring 396 and the reconfiguration command is configured to cause the actuator 60 to adjust the preload of the spring 396. For instance, the reconfiguration command may cause the suspension 74 to increase and/or decrease the preload of the spring 396 based on one or more sensed parameters of the track system 16. For example, in this particular embodiment, the actuator 60 is configured to adjust the preload of the spring 396 based at least in part on the speed of motion of the track 22. In some embodiments, the actuator 60 may alternatively or additionally adjust the preload of the spring 396 based on the direction of motion of the track 22, on the compliance of the ground beneath the track system 16, and/or any other suitable parameters relating to the track system 16.

More specifically, in this embodiment, as will be described in more detail below, the actuator 60 is configured to displace the first end of the spring 396 relative to the second end of the spring 396 in the longitudinal direction of the suspension 74 to modify the preload of the spring 396.

In this example, the actuator 60 may be an electromechanical actuator. In other embodiments, the actuator 60 may be any other suitable type of actuator such as a mechanical actuator or a fluidic actuator (e.g., a hydraulic or pneumatic actuator).

Figure 61:
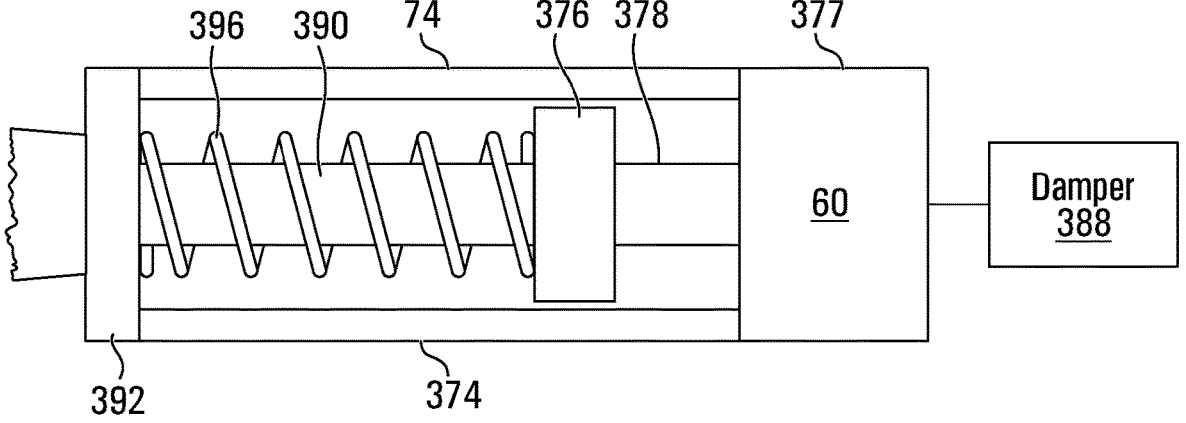
FIG. 61 shows a variant of the track system.

In this embodiment, as shown in FIG. 61, the actuator 60 is a linear actuator that is capable of inducing linear motion. The actuator 60 comprises a base 377 including a motor (not shown) that is responsive to the adjustment command transmitted by the processing apparatus 90. The actuator 60 further comprises a shaft 378 that is driven by the motor of the actuator 60. Such linear actuators are well known in the art and their operation will thus not be further described here. The base 377 of the actuator 60 is mounted to the mounting bracket 392 of the suspension 74 for support via a plurality of support members 374 that are affixed to the mounting bracket 392 (e.g., via fasteners). An end of the shaft 378 of is connected to a support bushing 376 of the suspension 74 which abuts the first end of the spring 396 and is mounted to the stabilizing rod 90.

The shaft 378 is operable to displace the support bushing 376 along the longitudinal direction of the suspension 74 away from or towards the mounting bracket 392 as determined by the reconfiguration command transmitted by the processing apparatus 90. Displacing the support bushing 372 towards the mounting bracket 392 increases the preload of the spring 396 while displacing the support bushing 372 away from the mounting bracket 392 reduces the preload of the spring 396.

In this embodiment, the actuator 60 offers a continuous range of adjustment of the preload of the spring 396. In other words, the support bushing 376 may occupy an infinite number of distinct positions within its range of displacement. As such, the preload of the spring 396 may have one of an infinite number of different values in accordance to the position of the support bushing 376.

In one example of implementation, an elevated speed of the track 22 sensed by the sensor 84 and transmitted to the processing apparatus 90 may cause the processing apparatus 90 to effect an increase of the preload of the spring 396 by signaling the actuator 60 to actuate its shaft 178 to displace the support bushing 176 towards the mounting bracket 92. This may help improve the stability of the track system 16. In another example, a low speed of the track 22 sensed by the sensor 84 and transmitted to the processing apparatus 90 may cause the processing apparatus 90 to effect a reduction of the preload of the spring 396 by signaling the actuator 60 to actuate its drive shaft 378 to displace the support bushing 376 away from the mounting bracket 92. This may help the track system 16 gain traction and/or avoid generating feedback at the steering device of the vehicle 10 (i.e., vibrations at the steering device).

The reconfiguration command issued by the processing apparatus 90 may also relate to the adjustment of other parameters of the suspension 74.

For instance, in some embodiments, the reconfiguration command may be related to the adjustment of the length $L_A$ of the suspension 74 based on the one or more sensed parameters. To that end, in some embodiments, the reconfiguration command may cause the actuator 60 to displace the rod end along the longitudinal direction of the suspension 74 thus increasing or decreasing the length $L_A$ of the suspension 74. For example, the actuator 60 may be operable to selectively increase and decrease the threaded engagement of the rod end with the stabilizing rod 90.

In some embodiments, the reconfiguration command may be related to the adjustment of a stiffness $K_t$ of the spring 396 based on one or more sensed parameters relating to the track system 16 and/or the vehicle 10. For instance, in some embodiments, the reconfiguration mechanism 30 may be configured to vary (e.g., decrease or increase) $K_t$ by at least 5%, in some embodiments at least 8%, in some embodiments at least 10%, when the speed of the vehicle 10 reaches a pre-determined speed threshold.

In some embodiments, the reconfiguration command may be related to the adjustment of a stiffness $K_d$ of the damper 388 based on one or more sensed parameters relating to the track system 16 and/or the vehicle 10.

In some embodiments, the adjustment command may be related to the adjustment of the preload of the damper 388 based on one or more sensed parameters relating to the track system 16 and/or the vehicle 10. In particular, in this embodiment, the reconfiguration mechanism 30 may be configured to increase pre-loading of dampening at a pre-determined speed of the vehicle at which the track 22 and/or the track system 16 may be susceptible to resonate at its respective natural frequency. For instance, in some embodiments, the reconfiguration mechanism 30 may be configured to vary (e.g., increase) dampening by at least 2%, in some embodiments at least 5%, in some embodiments at least 8%, when the speed of the vehicle 10 reaches the pre-determined speed.

Figure 55:
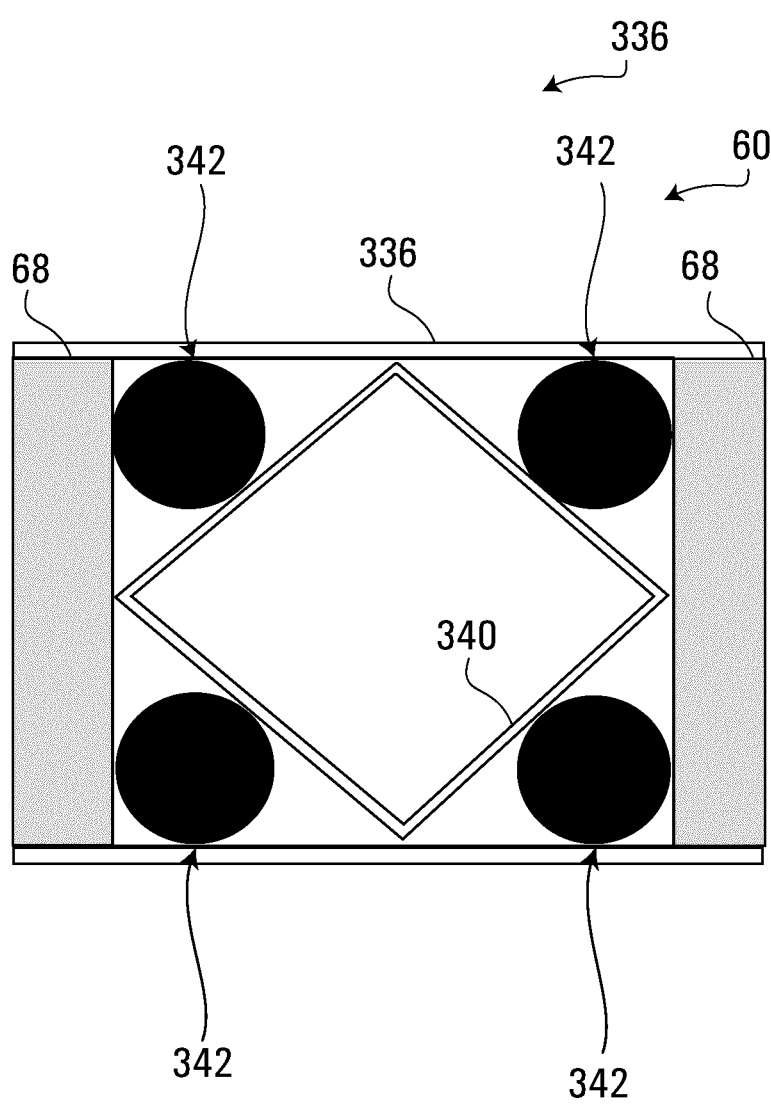
FIGS. 55 to 58 show variants of the track system.

As another example, in some embodiments, with additional reference to FIGS. 50 and 55, the actuators 60 of the reconfiguration mechanism 30 may be disposed at the movable joints 76, and may be configured to control a rotational spring rate and/or damping of the pivots 78. In this example, each actuator 60 of the reconfiguration mechanism 30 may comprise a tuneable rotational damper 336 located in the movable joints 76. The tuneable rotational damper 336 may be lockable and may have adjustable rotational spring rate and damping parameters. For instance, the tuneable rotational damper 336 may be a torsional bushing located at the movable joint. More specifically, the tuneable rotational damper 336 may comprise a first member 338 and a second member 340 that is housed in the first member 338 and that is rotatable relative to the first member 338. The tuneable rotational damper 336 may comprise resilient cords 342 (e.g., rubber cords) disposed between the members 338, 340 to apply a resistance and dampening against rotation motion and vibration. In this example, the actuator may comprise actuating members 68 forming at least part of the first member 338 and the actuator 60 may be configured to change the shape of the first member 338 to selectively compress or release the resilient cords 340 and affect rotational spring rate and damping parameters of the tuneable rotational damper 336. In other examples, the tuneable rotational damper 336 may be any other suitable type of tuneable rotational damper, e.g., a rheo-magnetic tuneable rotational damper.

5. Alteration of Orientation of at Least Part of Track System

Figure 62:
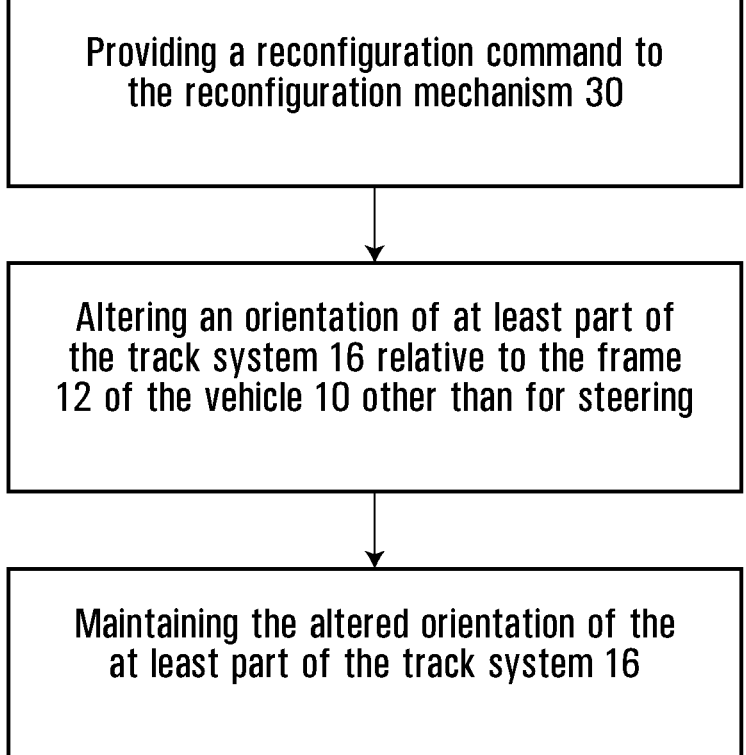
FIG. 62 shows a method of implementing the track system.

In some embodiments, as shown in FIG. 62, the reconfiguration mechanism 30 may be configured to alter an orientation of at least part of the track system 16 relative to the frame 12 of the vehicle 10 other than for steering, such as relative to a widthwise axis of the vehicle 10 (e.g. a "pitch" or an angle of attack of the track system 16) and/or relative to a longitudinal axis of the vehicle 10 (e.g., a "roll" or a camber of the track system 16).

Figure 63:
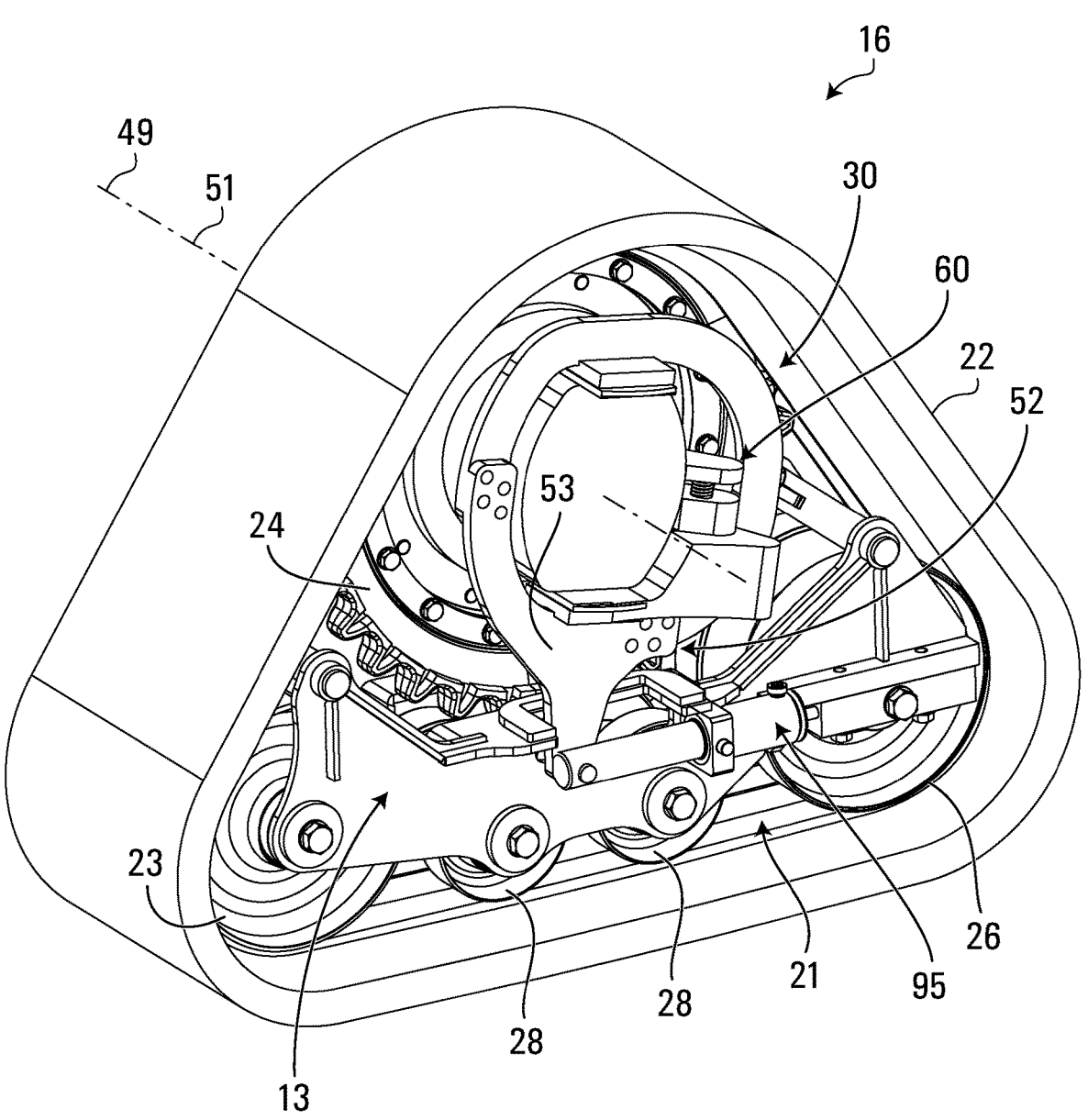
FIG. 63 shows a variant of the track system.

For instance, in this embodiment, as shown in FIG. 63, in view of its pivotability relative to the frame 12 of the vehicle 10 about a pivot axis, in this embodiment, the track system 16 comprises an anti-rotation device 52 to restrict the pivoting movement of the track system 16 about the pivot axis 51 relative to the frame 12 of the vehicle 10. More particularly, in this embodiment, the anti-rotation device 52 is connectable between the frame 13 of the track system 16 and the frame 13 of the vehicle 10 and configured to engage the frame 44 of the track system 16 in order to limit the pivoting movement of the track system 16 about the pivot axis.

A range of the pivoting movement of the track system 16 about the pivot axis is thus limited by the anti-rotation device 52. For example, in some embodiments, the anti-rotation device 52 may limit the range of the pivoting movement of the track system 16 about the pivot axis 51 to no more than 30°, in some cases no more than 20°, in some cases no more than 10°, and in some cases even less.

In this embodiment, the anti-rotation device 52 comprises an abutting member 53 nonrotatable about the pivot axis relative to the frame 12 of the vehicle 10 and configured to abut the frame 13 of the track system 16 to limit a pivoting movement of the frame 13 of the track system 16 about the pivot axis. The abutting member 53 is secured to a nonrotatable structure 54 that is nonrotatable about the pivot axis relative to the frame 11 of the vehicle 10. In this embodiment, the nonrotatable structure 54 comprises a portion of a housing 56 of a transmission (e.g., a planetary gearbox) for rotating the drive wheel 42. In other embodiments, the nonrotatable structure 54 may be a portion (e.g., a beam or other structural member) of the frame 12 of the vehicle 10. In this example, the abutting member 53 includes an abutment 62 extending into an opening 64 of a lower portion 50 the frame 13 of the track system 16 to abut against longitudinal extremities of the opening 64 in order to limit the pivoting movement of the track system 16 about the pivot axis 51.

In particular, in this embodiment, the actuator 60 of the reconfiguration mechanism may be disposed in the anti-rotation device 52 to control (e.g., limit) the range of the pivoting movement of the track system 16 about the pivot axis 51 and/or to control the pivoting movement of the track system 16 about the pivot axis 51 (e.g., by controlling a resistance to the pivoting movement, by blocking or unblocking the pivoting movement, by forcing a pivoting movement, by forcing a position of the track system relative to the frame 12 of the vehicle 10, etc.).

More specifically, in this embodiment, the actuator 60 of the reconfiguration mechanism may occupy the void in the opening 64 between the abutting member 53 and the non-rotatable structure 54. For instance, the actuator 60 of the reconfiguration mechanism 30 may be disposed on a given one of the abutting member 53 and the nonrotatable structure 54 to that effect. The actuator 60 may comprise piston cylinders engaging at one end the abutting member 53 and at the opposite end the nonrotatable structure 54.

Although in the examples illustrated above the reconfiguration mechanism 30 may be capable of adjusting the contact patch 63 of the track 22, and thus the length of the track system 16, in some embodiments, the reconfiguration mechanism 30 is capable of reconfiguring the track system 16 (e.g., the shape, position and/or properties of the track-engaging assembly 21) without changing the length and the contact patch 63 of the track system 16 and the contact patch 63 of the track 22.

Although in the examples illustrated above the track-engaging assembly 21 comprises a single drive wheel 24, in some embodiments the track-engaging assembly 21 comprises more than one drive wheel 24, e.g., two, three, four or more drive wheels 24.

Although the agricultural vehicle 10 illustrated in FIG. 1 is an agricultural tractor comprising four track systems 16, different types of agricultural vehicles configured differently (e.g., having a different number of track systems) may implement improvements based on principles disclosed herein.

Figure 64:
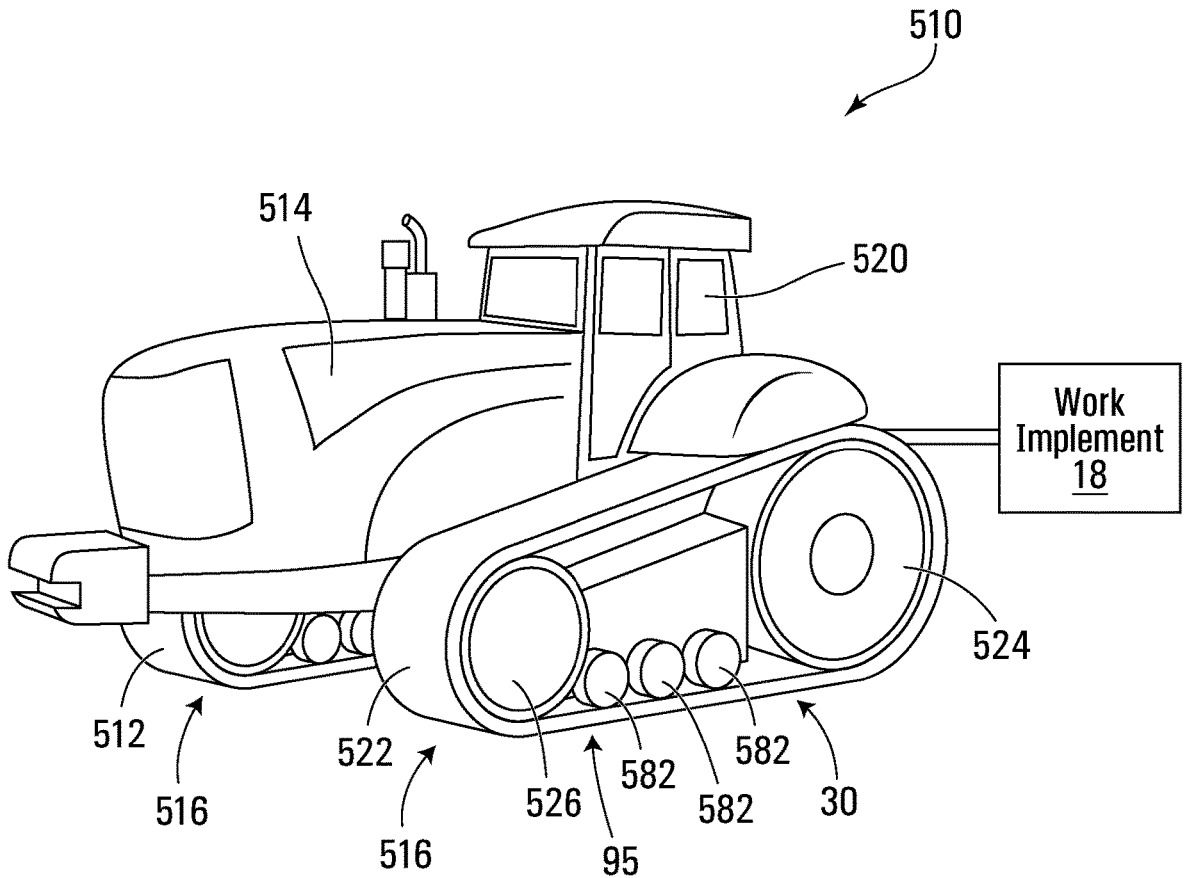
FIG. 64 shows an example of an agricultural vehicle comprising two track systems rather than four.

For instance, with additional reference to FIG. 64, an agricultural vehicle 510 may be provided comprising two track systems 516 rather than four (i.e., one track system 516 at each side of the agricultural vehicle 510). The agricultural vehicle 510 also comprises a frame 512, a prime mover 514, and an operator cabin 520 and can be equipped with the work implement 18 to perform agricultural work. Each track system 516 comprises a drive wheel 524 at a first longitudinal end portion of the track system 516, an idler wheel 526 at a second longitudinal end portion of the track system 516 opposite to the first longitudinal end portion, and a plurality of mid-rollers 528 intermediate the drive wheel 524 and the idler wheel 526. The track system 516 further comprises a track 522 disposed around the wheels 524, 526, 528 and driven by the drive wheel 524. The track system 516 may implement the reconfiguration mechanism as described above. Additionally or alternatively, the track 522 may be configured in a manner similar to the track 22 as described above.

Figure 65:
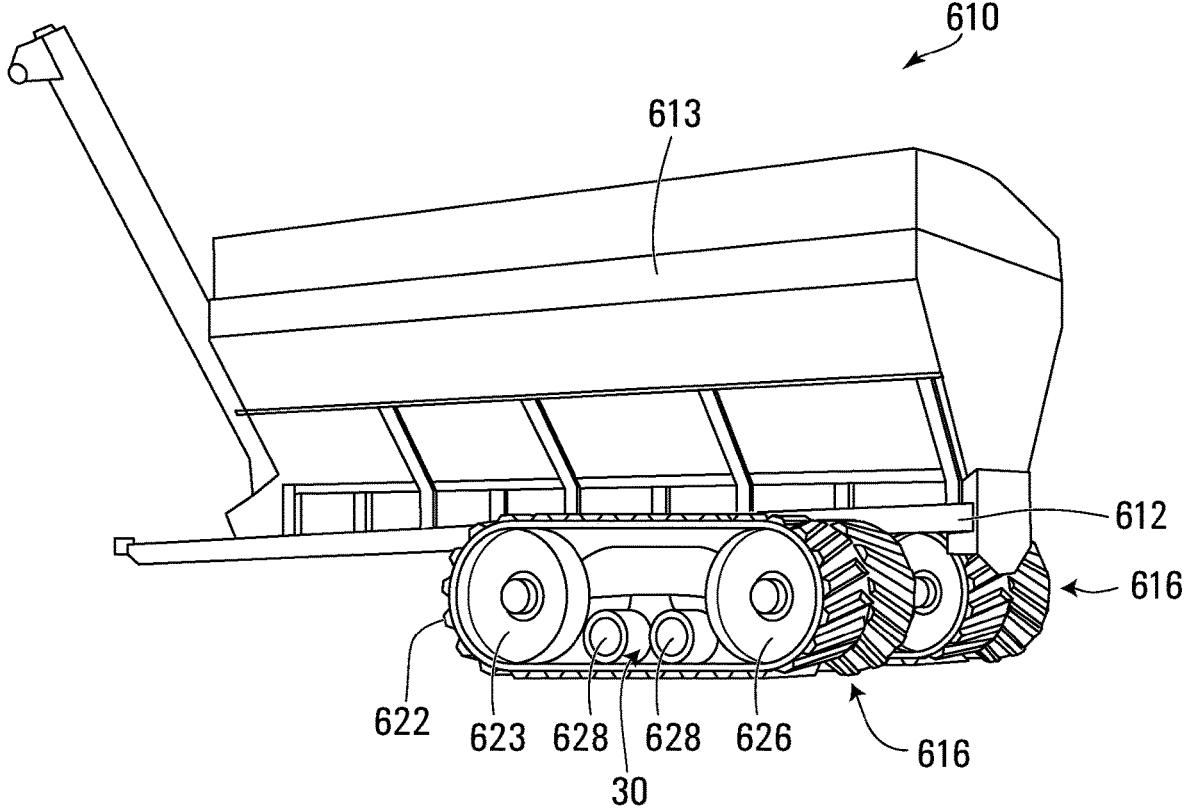
FIG. 65 shows an example of a trailed vehicle configured to be attached to the agricultural vehicle of FIG. 1 or 64.

Furthermore, the work implement 18 that is drawn by the agricultural vehicle 10 or the agricultural vehicle 510 may implement the improvements disclosed herein. For instance, with additional reference to FIG. 65, the work implement 18 may comprise a trailed vehicle 610 comprising a frame 612, a body 613 (e.g., a container) and track systems 616, 616. In this example, the trailed vehicle 610 is a harvest cart. In other examples, the trailed vehicle 610 may be a fertilizer cart, a sprayer, a planter or any other suitable type of trailed vehicle. Each track system 616 of the trailed vehicle 610 comprises front (i.e., leading) idler wheels 623 at a first longitudinal end portion of the track system 616, rear (i.e., trailing) idler wheels 626 at a second longitudinal end portion of the track system 616 opposite the first longitudinal end portion, and a plurality of mid-rollers 628 intermediate the front idler wheels 623 and the rear idler wheels 626. The track system 616 further comprises a track 622 disposed around the wheels 623, 626, 628. The track system 616 may implement the reconfiguration mechanism 30 as described above. Additionally or alternatively, the track 622 may be configured in a manner similar to the track 22 as described above.

In this example, the trailed vehicle 610 is not motorized in that it does not comprise a prime mover for driving the track systems 616. Rather, the trailed vehicle 610 is displaced by the agricultural vehicle 10 or the agricultural vehicle 510 to which the trailed vehicle 610 is attached. However, in some examples, the trailed vehicle 610 may be motorized. That is, the trailed vehicle 610 may comprise a prime mover for driving a drive wheel of each track system 616. For example, instead of comprising rear idler wheels 626, the track system 616 may comprise a drive wheel for driving the track 622. Also, in some examples, the trailed vehicle 610 is hybrid, i.e., has the capability of driving a drive wheel of each track system 616, but can also be on a neutral gear in order to be driven and displaced by the agricultural vehicle 10 or the agricultural vehicle 510 to which the trailed vehicle 610 is attached.

Although in embodiments considered above the vehicle 10 is an agricultural vehicle operable by a user from the operator cabin 20, in some embodiments, the vehicle 10 may be operable by a user remotely. In some embodiments, the vehicle 10 may comprise autonomy features, allowing the vehicle 10 to be semi-autonomous and/or entirely autonomous. In some embodiments, the vehicle 10 may be free of any operator cabin.

While in embodiments considered above the vehicle 10 is an agricultural vehicle, in other embodiments, the vehicle 10 may be an industrial vehicle such as a construction vehicle (e.g., a loader, a telehandler, a bulldozer, an excavator, etc.) for performing construction work or a forestry vehicle (e.g., a feller-buncher, a tree chipper, a knuckleboom loader, etc.) for performing forestry work, a military vehicle (e.g., a combat engineering vehicle (CEV), etc.) for performing military work, an all-terrain vehicle (ATV), a snowmobile, or any other vehicle operable off paved roads. Although operable off paved roads, the vehicle 10 may also be operable on paved roads in some cases.

In some examples of implementation, any feature of any embodiment described herein may be used in combination with any feature of any other embodiment described herein.

Certain additional elements that may be needed for operation of some embodiments have not been described or illustrated as they are assumed to be within the purview of those of ordinary skill in the art. Moreover, certain embodiments may be free of, may lack and/or may function without any element that is not specifically disclosed herein.

In case of any discrepancy, inconsistency, or other difference between terms used herein and terms used in any document incorporated by reference herein, meanings of the terms used herein are to prevail and be used.

Although various embodiments and examples have been presented, this was for purposes of description, but should not be limiting. Various modifications and enhancements will become apparent to those of ordinary skill in the art.

The invention claimed is:

1. A track system for a vehicle on a ground, the track system comprising:
   a track that is elastomeric and comprises a ground-engaging outer surface and an inner surface opposite to the ground-engaging outer surface;
   a track-engaging assembly configured to drive and guide the track around the track-engaging assembly and comprising a plurality of track-contacting wheels; and
   a reconfiguration mechanism configured to reconfigure the track system;
   wherein the reconfiguration mechanism is configured to reconfigure the track system based on a pulling force exerted by the vehicle at a drawbar of the vehicle.

2. The track system of claim 1, wherein the reconfiguration mechanism is configured to vary a geometry of the track-engaging assembly, while maintaining a perimeter length of the track system defined by a length of the track.

3. The track system of claim 1, wherein the reconfiguration mechanism is further configured to reconfigure the track system based on at least one of motion of the vehicle, a speed of the vehicle, a direction of motion of the vehicle and a characteristic of the ground.

4. The track system of claim 1, wherein the reconfiguration mechanism is configured to reconfigure the track system based on output of a sensor, the sensor being configured to sense at least one of a speed of the vehicle, the pulling force exerted by the vehicle and a characteristic of the ground.

5. The track system of claim 1, wherein the reconfiguration mechanism is configured to move a given portion of the track-engaging assembly relative to an adjacent portion of the track-engaging assembly to reconfigure the track system.

6. The track system of claim 5, wherein the reconfiguration mechanism is configured to move the given portion of the track-engaging assembly relative to the adjacent portion of the track-engaging assembly in at least one of a longitudinal direction of the track system and a heightwise direction of the track system.

7. The track system of claim 5, wherein the reconfiguration mechanism is configured to at least one of translate and rotate the given portion of the track-engaging assembly relative to the adjacent portion of the track-engaging assembly.

8. The track system of claim 5, wherein the track-engaging assembly comprises a frame, the given portion of the track-engaging assembly comprises a given one of the track-contacting wheels, and the adjacent portion of the track-engaging assembly comprises at least part of the frame of the track system.

9. The track system of claim 8, wherein the reconfiguration mechanism is configured to move the given one of the track-contacting wheels relative to the adjacent portion of the track-engaging assembly in at least one of a longitudinal direction of the track system and a heightwise direction of the track system.

10. The track system of claim 8, wherein the reconfiguration mechanism is configured to at least one of translate the given one of the track-contacting wheels relative to the adjacent portion of the track-engaging assembly and rotate an axis of rotation of the given one of the track-contacting wheels relative to the adjacent portion of the track-engaging assembly.

11. The track system of claim 8, wherein:
   the track system comprises a frame;
   the given portion of the track-engaging assembly comprises longitudinally-spaced ones of the track-contacting wheels that are spaced from one another in a longitudinal direction of the track system; and
   the adjacent portion of the track-engaging assembly comprises at least part of the frame of the track system, wherein:
      the track-contacting wheels include a drive wheel configured to drive the track, a front idler wheel and a rear idler wheel spaced apart in the longitudinal direction of the track system, and a plurality of roller wheels between the front idler wheel and the rear idler wheel in the longitudinal direction of the track system; and
      the longitudinally-spaced ones of the track-contacting wheels include longitudinally-spaced ones of the front idler wheel, the rear idler wheel, and the roller wheels.

12. The track system of claim 5, wherein: the track-engaging assembly comprises a frame; the track-engaging assembly comprises a suspension including a movable joint; the given portion of the track-engaging assembly comprises the movable joint; and the adjacent portion of the track-engaging assembly comprises at least part of the frame of the track system, the movable joint comprising at least one of a pivot and a resilient element.

13. The track system of claim 5, wherein: the track-engaging assembly comprises a frame; the track-engaging assembly comprises a suspension including a plurality of movable joints; the given portion of the track-engaging assembly comprises given ones of the movable joints; and the adjacent portion of the track-engaging assembly comprises at least part of the frame.

14. The track system of claim 5, wherein the reconfiguration mechanism comprises at least one actuator configured to move the given portion of the track-engaging assembly relative to the adjacent portion of the track-engaging assembly.

15. The track system of claim 14, wherein the at least one actuator comprises a plurality of actuators spaced apart from one another and actuatable independently from one another.

16. The track system of claim 1, wherein: the track-engaging assembly comprises a frame; the track-engaging assembly comprises a suspension including a movable joint; and the reconfiguration mechanism is configured to restrict movement of the movable joint relative to the frame of the track-engaging assembly.

17. The track system of claim 16, wherein the reconfiguration mechanism is configured to change the movable joint between an unlocked state, in which the movable joint is movable to allow relative movement of parts of the track-engaging assembly that are interconnected by the movable joint and moveable relative to one another at the movable joint, and a locked state, in which the movable joint is locked to prevent relative movement of the parts of the track-engaging assembly that are interconnected by the movable joint and moveable relative to one another at the movable joint.

18. The track system of claim 1, wherein: laterally-oscillating ones of the track-contacting wheels are configured to oscillate about an oscillation axis transverse to a widthwise direction of the track system; and the reconfiguration mechanism is configured to alter a configuration of the laterally-oscillating ones of the track-contacting wheels, wherein the oscillation axis is generally parallel to a longitudinal direction of the track system.

19. The track system of claim 18, wherein the reconfiguration mechanism is configured to move the laterally-oscillating ones of the track-contacting wheels in at least one of a longitudinal direction and a heightwise direction of the track system.

20. The track system of claim 18, wherein the reconfiguration mechanism is configured to prevent lateral oscillation of the laterally-oscillating ones of the track-contacting wheels about the oscillation axis.

* * * * *